US012807206B2

(12) United States Patent
Yuan

(10) Patent No.: US 12,807,206 B2
(45) Date of Patent: Nov. 24, 2026

(54) PASSENGER DEVICE

(71) Applicant: WONDERLAND SWITZERLAND AG, Steinhausen (CH)

(72) Inventor: Jialiang Yuan, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 205 days.

(21) Appl. No.: 18/703,407

(22) PCT Filed: Oct. 21, 2022

(86) PCT No.: PCT/EP2022/079451
§ 371 (c)(1),
(2) Date: Apr. 22, 2024

(87) PCT Pub. No.: WO2023/067177
PCT Pub. Date: Apr. 27, 2023

(65) Prior Publication Data

US 2025/0108849 A1 Apr. 3, 2025

(30) Foreign Application Priority Data

Oct. 22, 2021 (CN) ......................... 202111235244.4
Nov. 11, 2021 (CN) ......................... 202111331113.6
Dec. 3, 2021 (CN) ......................... 202111467694.6

(51) Int. Cl.
*B62B 7/06* (2006.01)
*B62B 7/10* (2006.01)
(Continued)

(52) U.S. Cl.
CPC ................ *B62B 7/062* (2013.01); *B62B 7/10* (2013.01); *B62B 9/12* (2013.01); *B62B 9/203* (2013.01);
(Continued)

(58) Field of Classification Search
CPC .. B62B 7/062; B62B 7/10; B62B 9/12; B62B 9/203; B62B 2205/003; B62B 2205/20; B62B 2301/0463; B62B 9/102; B62B 9/24
See application file for complete search history.

(56) References Cited

U.S. PATENT DOCUMENTS 7,798,500 B2 * 9/2010 Den Boer ............... B62B 7/142 280/47.38
8,256,833 B2 9/2012 Hu et al.
(Continued)

FOREIGN PATENT DOCUMENTS

CN 201056223 Y 5/2008
CN 101606801 A 12/2009
(Continued)

OTHER PUBLICATIONS

CN-211167051-U English Translation (Year: 2020).*
(Continued)

*Primary Examiner* — Michael T. Walsh
(74) *Attorney, Agent, or Firm* — Volpe Koenig

(57) ABSTRACT

A passenger device includes: a frame; a handlebar, the handlebar being pivotally connected to the frame; and a wheel member, the wheel member being pivotally connected to the frame, and the frame is capable of switching between a folded state and an unfolded state.

19 Claims, 47 Drawing Sheets

(51) Int. Cl.
*B62B 9/12* (2006.01)
*B62B 9/20* (2006.01)

(52) U.S. Cl.
CPC ..... *B62B 2205/003* (2013.01); *B62B 2205/20* (2013.01)

(56) References Cited

U.S. PATENT DOCUMENTS

| | | | | |
|---|---|---|---|---|
| 8,714,581 | B2 * | 5/2014 | Fritz | B62B 9/245 280/643 |
| 9,725,106 | B2 | 8/2017 | Pos | |
| 10,343,704 | B2 * | 7/2019 | Oakes | B62B 7/062 |
| 2006/0061066 | A1 * | 3/2006 | Tan | B62B 7/062 280/642 |
| 2017/0282952 | A1 | 10/2017 | Yi | |
| 2017/0297600 | A1 | 10/2017 | Zhong et al. | |

FOREIGN PATENT DOCUMENTS

| | | | | | |
|---|---|---|---|---|---|
| CN | 201646809 | U | | 11/2010 | |
| CN | 203111278 | U | | 8/2013 | |
| CN | 203111283 | U | | 8/2013 | |
| CN | 103754249 | A | | 4/2014 | |
| CN | 103754249 | B | | 1/2016 | |
| CN | 105857377 | A | * | 8/2016 | B62B 7/062 |
| CN | 107235062 | A | | 10/2017 | |
| CN | 107284507 | A | | 10/2017 | |
| CN | 105984481 | B | | 5/2018 | |
| CN | 107985379 | A | * | 5/2018 | B62B 7/083 |
| CN | 207843022 | U | | 9/2018 | |
| CN | 208453074 | U | * | 2/2019 | B62B 7/142 |
| CN | 208463423 | U | | 2/2019 | |
| CN | 110509976 | A | | 11/2019 | |
| CN | 110606119 | A | * | 12/2019 | B62B 7/083 |
| CN | 209833734 | U | | 12/2019 | |
| CN | 110901746 | A | | 3/2020 | |
| CN | 210391282 | U | | 4/2020 | |
| CN | 210555065 | U | | 5/2020 | |
| CN | 211167051 | U | * | 8/2020 | |
| CN | 112477965 | A | | 3/2021 | |
| CN | 112519867 | A | | 3/2021 | |
| CN | 212921676 | U | | 4/2021 | |
| CN | 213008317 | U | | 4/2021 | |
| CN | 113335362 | A | | 9/2021 | |
| CN | 214524028 | U | | 10/2021 | |
| DE | 102015112332 | A1 | | 2/2017 | |
| EP | 2415651 | A1 | | 2/2012 | |
| GB | 2586842 | A | | 3/2021 | |
| JP | 2008-513287 | A | | 5/2008 | |
| JP | 2014129081 | A | | 7/2014 | |
| JP | 2014213856 | A | | 11/2014 | |
| JP | 2016-5951 | A | | 1/2016 | |
| TW | M312478 | U | | 5/2007 | |
| TW | 201028317 | A | | 8/2010 | |
| TW | 1526355 | B | | 3/2016 | |
| TW | M606710 | U | | 1/2021 | |
| TW | 202112596 | A | | 4/2021 | |
| TW | 202126522 | A | | 7/2021 | |
| TW | 202132150 | A | | 9/2021 | |
| WO | 2020051872 | A1 | | 3/2020 | |

OTHER PUBLICATIONS

CN-105857377-A English Translation (Year: 2016).*
CN-107985379-A English Translation (Year: 2018).*
CN-110606119-A English Translation (Year: 2019).*
CN-208453074-U English Translation (Year: 2019).*
Taiwan Intellectual Property Office. First Office Action for corresponding application TW 114116388 along with partial translation, mailed Oct. 13, 2025. 6 pages.
Office Action issued in corresponding Taiwanese Application No. 111140061 dated Jun. 20, 2022.
International Search Report and Written Opinion for Application No. PCT/EP2022/079451 dated Jun. 1, 2023.
"First Office Action Issued in Corresponding Japanese Patent Application No. 2024-523993", Mailed Date: Jun. 17, 2025, 8 pages.
Office Action issued in corresponding Chinese Application No. 202111235244.4 dated Aug. 13, 2024.
Office Action issued in corresponding Chinese Application No. 202111331113.6 dated Jul. 16, 2024.
Office Action issued in corresponding Chinese Application No. 202111467694.6 dated Aug. 15, 2024.
Notice of Allowance issued in corresponding Taiwanese Application No. 111140061 dated Aug. 19, 2024.
"Office Action Issued in Corresponding Chinese Patent Application No. 202111331113.6" along with Partial 1 Translation, Mailed Date: Jan. 23, 2025, 14 pages.
Taiwan Intellectual Property Office. Notice of Allowance for corresponding application TW 115114876, dated Jun. 30, 2026, along with partial translation. 5 pages.

* cited by examiner

PASSENGER DEVICE

CROSS-REFERENCE TO RELATED APPLICATIONS

This application is a National Stage application of PCT/EP2022/079451, filed on Oct. 21, 2022, which claims the benefit of Chinese Application Nos. 202111235244.4, filed on Oct. 22, 2021; 202111331113.6, filed Nov. 11, 2021; and 202111467694.6, filed Dec. 3, 2021, all of which are incorporated herein by reference in their entirety.

TECHNICAL FIELD

The present disclosure relates to the field of children's vehicles, and in particular, to a passenger device.

BACKGROUND

Passenger devices for children (e.g., strollers) are vehicles used by parents to carry infants or children when going out shopping or window-shopping. At present, a variety of foldable strollers are available on the market, which are easy to be stored or transported. In order to facilitate interaction between parents and infants in the strollers, the strollers may generally be provided with handlebar reversing mechanisms, and after reversing, handlebars may continue to rotate to drive frames to be folded simultaneously. Although such mechanisms enable an operation of folding the strollers to be more convenient, a risk of accidental folding may also be brought, bringing hidden dangers to children's safety.

Generally, a stroller includes a seat and a frame for carrying the seat. In a case that the seat and the frame are separable, the seat removed from the frame should be folded for easy storage. In this case, an armrest on the seat is also required to be folded synchronously. However, a locking structure of the armrest and a locking structure for seat folding are different structures, which leads to a more complex structure of the entire seat, resulting in more difficult manufacturing and operation of the stroller.

In addition, the stroller is generally further provided with a handlebar reversing mechanism, so that a direction of an infant in the stroller can be adjusted as required. For example, the infant may face the parent for interaction or the infant may face away from the parent to enjoy a scenery along a road. In order to facilitate travel of the passenger device, generally, when the handlebar is on a side of rear wheels, the rear wheels are oriented while front wheels are disoriented, and when the handlebar is on a side of the front wheels, the front wheels are oriented while the rear wheels are disoriented. However, a structure to achieve such functions is generally more complex and difficult to manufacture, and has high manufacturing costs.

SUMMARY

In view of the above, for addressing the above technical problems, it is necessary to provide a passenger device including a frame and a handlebar that can be folded independently of each other.

An embodiment of the present disclosure provides a passenger device, including: a frame; a handlebar pivotally connected to the frame; and a wheel member pivotally connected to the frame. The frame is capable of switching between a folded state and an unfolded state.

In an embodiment, the frame includes a first support member and a second support member, the first support member is pivotally connected to the second support member, and the handlebar is pivotally connected to the first support member, and the passenger device further includes: a first locking member arranged between the first support member and the second support member and configured to lock the first support member and the second support member; a second locking member arranged between the first support member and the handlebar and configured to lock the handlebar; a fixed seat pivotally connected to the first support member; a third locking member arranged between the first support member and the fixed seat and configured to lock the fixed seat; and a linkage member pivotally connected to the second support member and the fixed seat. When the second locking member unlocks the handlebar, the second locking member drives the third locking member to unlock the fixed seat; when the third locking member unlocks the fixed seat and the first locking member unlocks the first support member and the second support member, the first support member and the second support member are foldable relative to each other, so that the second support member drives the linkage member to drive the fixed seat to be rotated relative to the frame and folded.

In an embodiment, the first support member is provided with a first slot, the second support member is provided with a second slot, the first locking member is provided with a first clamping portion, and the first clamping portion is clamped in the first slot and the second slot to lock the first support member and the second support member.

In an embodiment, the second support member is provided with a first driving structure, and the passenger device further includes: a first driving member abutted against the first locking member and the first driving structure; and a pulling member connected to the first driving member; when the pulling member is pulled, the pulling member drives the first driving member, the first driving structure pushes the first driving member towards the first locking member, and the first driving member pushes the first locking member towards the first support member, so that the first locking member unlocks the first support member and the second support member.

In an embodiment, the passenger device further includes a first elastic member abutted against the first support member and the first locking member.

In an embodiment, the first driving member and the first driving structure have inclined planes abutted against each other.

In an embodiment, the first support member is provided with a third slot, the handlebar is provided with a fourth slot, the second locking member is provided with a second clamping portion, and the second clamping portion is clamped in the third slot and the fourth slot to lock the handlebar.

In an embodiment, the handlebar is provided with a second driving structure, and the passenger device further includes: a second driving member abutted against the second locking member and the second driving structure; and a drawing member connected to the second driving member; when the drawing member is pulled, the drawing member drives the second driving member, the second driving structure pushes the second driving member towards the second locking member, and the second driving member pushes the second locking member towards the first support member, so that the second locking member unlocks the handlebar.

In an embodiment, the passenger device further includes a second elastic member abutted against the first support member and the second locking member.

In an embodiment, the second driving member and the second driving structure have inclined planes abutted against each other.

In an embodiment, the passenger device further includes an operating member movably arranged on the handlebar, the drawing member is connected to the operating member, and when the operating member is pressed, the operating member pulls the drawing member.

In an embodiment, the passenger device further includes an operating member, a pushing member, and a rotating member, the handlebar includes an upper handlebar and a lower handlebar, a lower end of the upper handlebar is telescopically inserted in the lower handlebar, the pushing member is arranged at the lower end of the upper handlebar, the operating member is slidably arranged on the upper handlebar, the rotating member is rotatably arranged in the lower handlebar, the drawing member is connected to the rotating member, the lower handlebar is pivotally connected to the first support member, the operating member is operable to drive the upper handlebar to slide relative to the lower handlebar, and when the upper handlebar slides to a lowest position relative to the lower handlebar, the pushing member pushes the rotating member to rotate, so that the rotating member pulls the drawing member.

In an embodiment, the passenger device further includes a connecting member and a clamping member, the lower handlebar has a plurality of clamping holes, two ends of the connecting member are respectively connected to the operating member and the clamping member, the clamping member is clamped in one of the plurality of clamping holes to lock the upper handlebar, and the operating member is operable to drive, through the connecting member, the clamping member to be detached from the clamping hole, so that the upper handlebar is slidable relative to the lower handlebar.

In an embodiment, the second locking member and the third locking member are located on two sides of the first support member, the first support member has a through hole, and the second locking member has a push rod, the push rod is inserted into the through hole, and when the second driving member pushes the second locking member towards the first support member, the push rod pushes the third locking member towards the fixed seat to unlock the fixed seat.

In an embodiment, the first support member is provided with a fifth slot, the fixed seat is provided with a sixth slot, the third locking member is provided with a third clamping portion, and the third clamping portion is clamped in the fifth slot and the sixth slot to lock the fixed seat.

In an embodiment, the passenger device further includes a third elastic member abutted against the third locking member and the fixed seat.

In an embodiment, the passenger device further includes a seat, the seat is arranged on the fixed seat, and when the fixed seat is rotated relative to the frame and folded, the seat is rotated with the fixed seat and folded.

In an embodiment, the passenger device further includes an adapter, the adapter includes a first seat body, a second seat body, a first unlocking member, and a locking member, the first seat body is connected to the second seat body, the first seat body is configured to connect a vehicle, the locking member is rotatably arranged in the second seat body, the first unlocking member is movably arranged on the second seat body, the first unlocking member is provided with a guide portion, the locking member is provided with a skewed slot and a hook, the guide portion is arranged in the skewed slot, when the second seat body is arranged on the fixed seat, the hook is engaged with the fixed seat, and when the first unlocking member is pressed, the guide portion pushes the skewed slot to drive the locking member to rotate, so that the hook is disengaged from the fixed seat.

In an embodiment, the vehicle is a safety seat or a carrycot.

In an embodiment, the passenger device further includes: a seat including an upper framework, a lower framework, and an armrest; and an armrest folding mechanism, wherein the upper framework, the lower framework, and the armrest are pivotally connected together through the armrest folding mechanism. The armrest folding mechanism includes: a first connecting member connected to the upper framework; a second connecting member connected to the lower framework; and a third connecting member connected to the armrest. The first connecting member, the second connecting member, and the third connecting member are connected through a connecting shaft to be rotatable relative to one another about a central axis. The first connecting member is provided with a clamping member capable of shifting, and the clamping member includes a protruding portion. The second connecting member is provided with a first chute bending and extending around the central axis and a clamping hole communicated with an end of the first chute, the third connecting member is provided with a second chute bending and extending around the central axis and a positioning hole communicated with an end of the second chute, radial positions of the first chute and the second chute correspond to each other, radial positions of the clamping hole and the positioning hole correspond to each other, and the protruding portion is capable of being inserted into the clamping hole and the positioning hole and being slid along the first chute and the second chute. Radial widths of the clamping hole and the positioning hole are configured to be greater than radial widths of the first chute and the second chute, and to allow the clamping member to shift radially between a lock position and an unlock position.

In an embodiment, the passenger device further includes: a seat including an upper framework, a lower framework, and an armrest; and an armrest folding mechanism, wherein the upper framework, the lower framework, and the armrest are pivotally connected together through the armrest folding mechanism. The armrest folding mechanism includes: a first connecting member connected to the upper framework; a second connecting member connected to the lower framework; and a third connecting member connected to the armrest. The first connecting member, the second connecting member, and the third connecting member are connected through a connecting shaft to be rotatable relative to one another about a central axis. The second connecting member is provided with a clamping member capable of shifting, the clamping member includes a protruding portion protruding towards two sides of the second connecting member, and the second connecting member is provided with a via hole for the protruding portion to pass through. The first connecting member is provided with a first connecting member chute bending and extending around the central axis and a first connecting member clamping hole communicated with an end of the first connecting member chute, the third connecting member is provided with a second chute bending and extending around the central axis and a positioning hole communicated with an end of the second chute, radial positions of the first connecting member chute and the second chute correspond to each other, radial positions of the first connecting member clamping hole, the via hole, and the positioning hole correspond to one another, and the protruding portion is capable of being inserted into the first connecting member clamping hole and the positioning hole and being slid along the first connecting member chute and the second chute. Radial widths of the first connecting member clamping hole, the via hole, and the positioning hole are configured to be greater than radial widths of the first connecting member chute and the second chute, and to allow the clamping member to shift radially between a lock position and an unlock position.

In an embodiment, the armrest folding mechanism is further provided with a fourth elastic member, and the fourth elastic member drives the clamping member to shift to the lock position.

In an embodiment, the armrest folding mechanism is further provided with a second unlocking member, the second unlocking member is operable to drive the clamping member to shift to the unlock position.

In an embodiment, the second unlocking member is a steel wire, the steel wire has an end connected to the clamping member and the other end connected to an operating portion of the upper framework.

In an embodiment, a reinforcing bulge is arranged on a periphery of the third connecting member, and an abutment surface is arranged at a corresponding position of a periphery of the second connecting member, the reinforcing bulge is capable of being abutted against the abutment surface to restrict rotation of the third connecting member relative to the second connecting member.

In an embodiment, the armrest folding mechanism is further provided with an adapter, the adapter is fixed to the first connecting member and capable of being engaged with the fixed seat arranged on the frame, so as to enable the seat to be detachably arranged on the frame.

In an embodiment, the adapter is provided with a hook, and the fixed seat is provided with a clamping bulge, the hook is capable of being engaged with or disengaged from the clamping bulge to prevent the adapter from being detached from the fixed seat or allow the adapter to be detached from the fixed seat.

In an embodiment, the adapter is further provided with a button, and the button is capable of being pressed to drive the hook to be disengaged from the clamping bulge.

In an embodiment, the passenger device further includes: a first travel assembly; a second travel assembly; and an orientation adjustment mechanism including a first driving block and a second driving block. The wheel member includes a first wheel member and a second wheel member, the first travel assembly includes the second travel assembly, the second travel assembly includes a second wheel member, and the handlebar is rotatable relative to the first travel assembly or the second travel assembly. When the handlebar is rotated to a same side as the first travel assembly, the first driving block drives the first wheel member to be oriented, and the second driving block drives the second wheel member to be disoriented; and when the handlebar is rotated to a same side as the second travel assembly, the second driving block drives the second wheel member to be oriented, and the first driving block drives the first wheel member to be disoriented.

In an embodiment, the orientation adjustment mechanism further includes a first driving rib and a second driving rib that are arranged on the handlebar, and the handlebar is rotated to the first driving rib to push against the first driving block to orient or disorient the first wheel member; or the handlebar is rotated to the second driving rib to push against the second driving block to orient or disorient the second wheel member.

In an embodiment, the orientation adjustment mechanism further includes a first reset member and a second reset member, the first reset member constantly drives the first driving block to move in a direction of driving the first wheel member to be oriented or disoriented, and the second reset member constantly drives the second driving block to move in a direction of driving the second wheel member to be oriented or disoriented.

In an embodiment, the orientation adjustment mechanism further includes a first connecting seat base and a first connecting seat housing, an accommodating space is formed between the first connecting seat base and the first connecting seat housing, the first driving block and the second driving block are arranged in the accommodating space, the first connecting seat housing is provided with a track, the first driving rib is capable of moving along the track to be abutted against the first driving block, and the second driving rib is capable of moving along the track to be abutted against the second driving block.

In an embodiment, the first connecting seat housing is provided with a penetration hole communicated with the accommodating space, the first driving rib releases the push against the first driving block, and the first driving block is moved to expose from the penetration hole, so that the first wheel member is oriented or disoriented; and the second driving rib releases the push against the second driving block, and the second driving block is moved to expose from the penetration hole, so that the first wheel member is oriented or disoriented.

In an embodiment, the first connecting seat base is fixed to the first travel assembly, the first connecting seat housing is fixed to the second travel assembly, and the handlebar is pivotally connected to the first connecting seat housing.

In an embodiment, the first connecting seat base or the first connecting seat housing is provided with a first guide pillar and a second guide pillar, the first driving block is located between the first driving rib and the first travel assembly, the first driving block is provided with an elongated first guide groove, the first guide pillar is inserted into the first guide groove, and the first driving rib pushes against the first driving block, so that the first driving block is moved along an extension direction of the first guide groove; the second driving block is located between the second driving rib and the second travel assembly, the second driving block is provided with an elongated second guide groove, the second guide pillar is inserted into the second guide groove, and the second driving rib pushes against the second driving block, so that the second driving block is moved along an extension direction of the second guide groove.

In an embodiment, the first travel assembly further includes a first orientation mechanism, and the orientation adjustment mechanism drives the first orientation mechanism to switch between a locked state and an unlocked state to orient or disorient the first wheel member; the second travel assembly further includes a second orientation mechanism, and the orientation adjustment mechanism drives the second orientation mechanism to switch between the locked state and the unlocked state to orient or disorient the second wheel member.

In an embodiment, the orientation adjustment mechanism further includes a first traction member and a second traction member, two ends of the first traction member are connected to the first driving block and the first orientation mechanism, respectively, and two ends of the second traction member are connected to the second driving block and the second orientation mechanism, respectively.

In an embodiment, the first travel assembly further includes a second support member, the second support member is pivotally connected to the first wheel member, and the first orientation mechanism includes a first orientation pin movably arranged on the second support member and a first orientation groove arranged on the first wheel member, the first orientation pin is inserted into the first orientation groove to lock the first orientation mechanism, the first orientation pin is detached from the first orientation groove to unlock the first orientation mechanism; the second travel assembly further includes a first support member, the first support member is pivotally connected to the second wheel member, and the second orientation mechanism includes a second orientation pin movably arranged on the first support member and a second orientation groove arranged on the second wheel member, the second orientation pin is inserted into the second orientation groove to lock the second orientation mechanism, and the second orientation pin is detached from the second orientation groove to unlock the second orientation mechanism.

In an embodiment, the handlebar is rotated to the same side as the first travel assembly, and the first driving rib pushes against the first driving block to lock the first orientation mechanism; the handlebar is rotated to the same side as the second travel assembly, and the second driving rib pushes against the second driving block to lock the second orientation mechanism.

In an embodiment, the first driving block is located between the first driving rib and the first orientation mechanism, the first driving rib releases the push against the first driving block, and the first driving block is moved and drives the first orientation mechanism to be unlocked through the first traction member; the second driving block is located between the second driving rib and the second orientation mechanism, the second driving rib releases the push against the second driving block, and the second driving block is moved and drives the second orientation mechanism to be unlocked through the second traction member.

In an embodiment, the first traction member is extended along a direction from the first driving block to the first orientation mechanism; and the second traction member is extended along a direction from the second driving block to the second orientation mechanism.

In an embodiment, the orientation adjustment mechanism further includes a first reset member and a second reset member, the first reset member constantly drives the first driving block to move in a direction of driving the first orientation mechanism to be unlocked, the second reset member constantly drives the second driving block to move in a direction of driving the second orientation mechanism to be unlocked, and the orientation adjustment mechanism further includes a third reset member and a fourth reset member, the third reset member constantly drives the first orientation mechanism to be locked, an elastic coefficient of the third reset member is less than that of the first reset member, the fourth reset member constantly drives the second orientation mechanism to be locked, and an elastic coefficient of the fourth reset member is less than that of the second reset member.

In an embodiment, the handlebar is rotated to the same side as the first travel assembly, and the second driving rib pushes against the second driving block to unlock the second orientation mechanism; the handlebar is rotated to the same side as the second travel assembly, and the first driving rib pushes against the first driving block to unlock the first orientation mechanism.

In an embodiment, the first driving block is located between the first driving rib and the first orientation mechanism, the first driving rib pushes against the first driving block, and the first driving block is moved and drives the first orientation mechanism to be unlocked through the first traction member; the second driving block is located between the second driving rib and the second orientation mechanism, the second driving rib pushes against the second driving block, and the second driving block is moved and drives the second orientation mechanism to be unlocked through the second traction member.

In an embodiment, the orientation adjustment mechanism further includes a separator, the separator is located between the first driving block and the second driving block, and the first traction member has an end connected to the first orientation mechanism and the other end bypassing the separator to be connected to the first driving block; and the second traction member has one end connected to the second orientation mechanism and the other end bypassing the separator to be connected to the second driving block.

In an embodiment, the orientation adjustment mechanism further includes a third reset member and a fourth reset member, the third reset member constantly drives the first orientation mechanism to be locked, and the fourth reset member constantly drives the second orientation mechanism to be locked.

In an embodiment, the passenger device further includes a drift driving mechanism, the orientation adjustment mechanism further includes a third driving member, the drift driving mechanism is operated to cause the third driving member to be rotated relative to the handlebar until the first driving rib push against the first driving block and the second driving rib push against the second driving block.

In an embodiment, the orientation adjustment mechanism further includes a fifth reset member, both the first driving rib and the second driving rib are arranged on the third driving member, the third driving member is pivotally connected to the handlebar, the fifth reset member is abutted against the third driving member and the handlebar, respectively, and the fifth reset member constantly drives the third driving member to be fixed to the handlebar.

In an embodiment, the drift driving mechanism includes a drift operating member and a third traction member, and two ends of the third traction member are connected to the drift operating member and the third driving member, respectively.

BRIEF DESCRIPTION OF THE DRAWINGS

The above and other objectives, features, and advantages of the present disclosure will become clearer through more specific descriptions of preferred embodiments of the present disclosure as shown in the accompanying drawings. Similar reference signs indicate similar parts throughout the accompanying drawings. The accompanying drawings are not drawn to scale, so as to emphasize substantive matters of the present disclosure.

The other objectives, features, and advantages of the present disclosure will become more apparent by reading detailed descriptions about non-limiting embodiments set forth below with reference to the accompanying drawings.

DETAILED DESCRIPTION OF THE EMBODIMENTS

Figure 1:
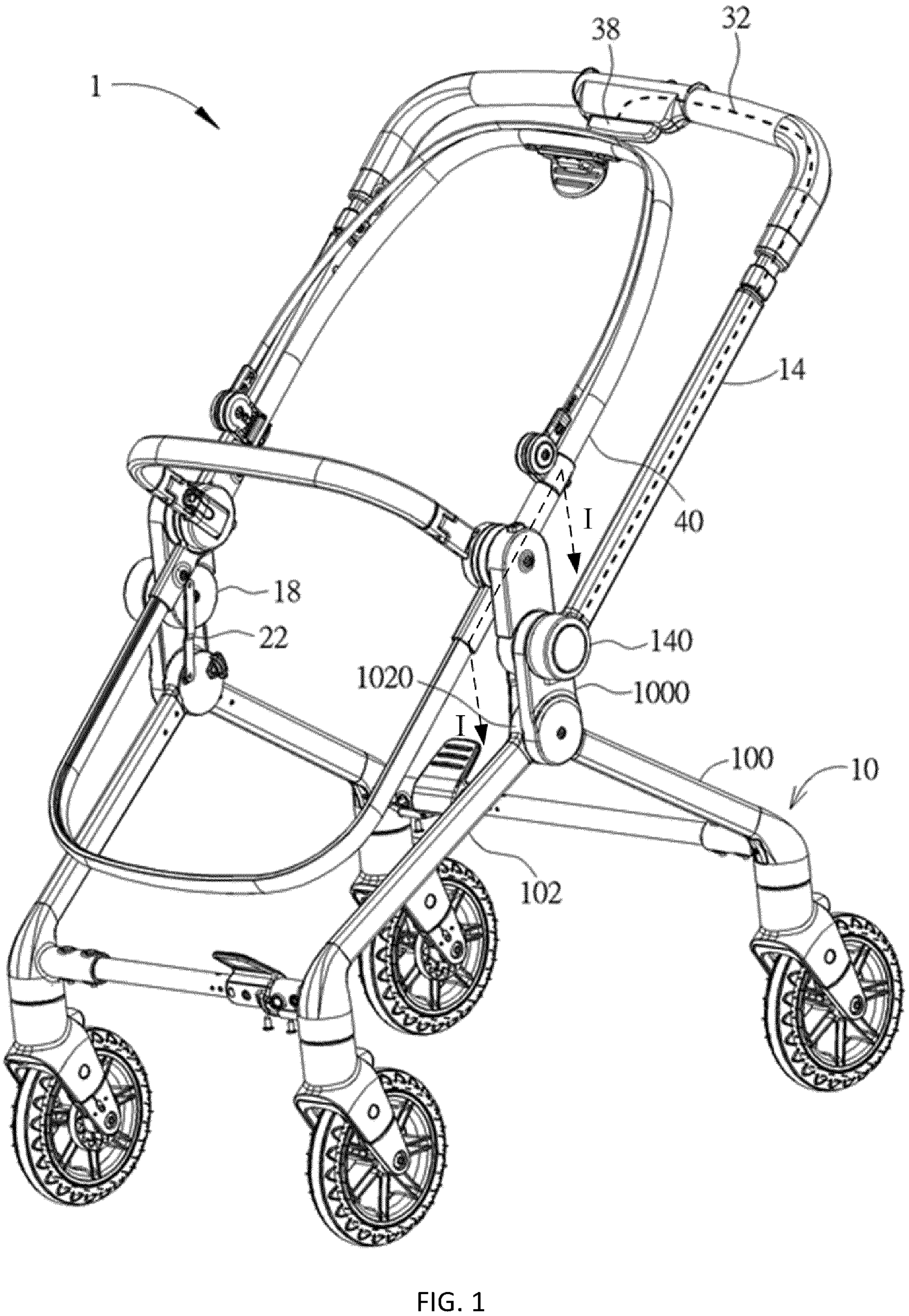
FIG. 1 is a perspective view of a passenger device according to an embodiment of the present disclosure.

To facilitate understanding of the present disclosure, a more comprehensive description of the present disclosure will be given below with reference to the relevant accompanying drawings. Preferred embodiments of the present disclosure are given in the drawings. However, the present disclosure may be implemented in many different forms and is not limited to the embodiments described herein. Rather, these embodiments are provided to make the contents disclosed in the present disclosure more fully understood.

It is to be noted that, when one element is considered to be "connected to" another element, it may be directly connected to the other element and integrated therewith or an intermediate element may co-exist. The terms "mount", "an end", "the other end" and similar expressions used herein are for illustrative purposes only.

Unless defined otherwise, all technical and scientific terms used herein have the same meanings as those commonly understood by those skilled in the technical field of the present disclosure. The terms used herein in the specification of the present disclosure are for the purpose of describing specific embodiments only, and are not intended to limit the present disclosure. The term "and/or" used herein includes any and all combinations of one or more related listed items.

Figure 2:
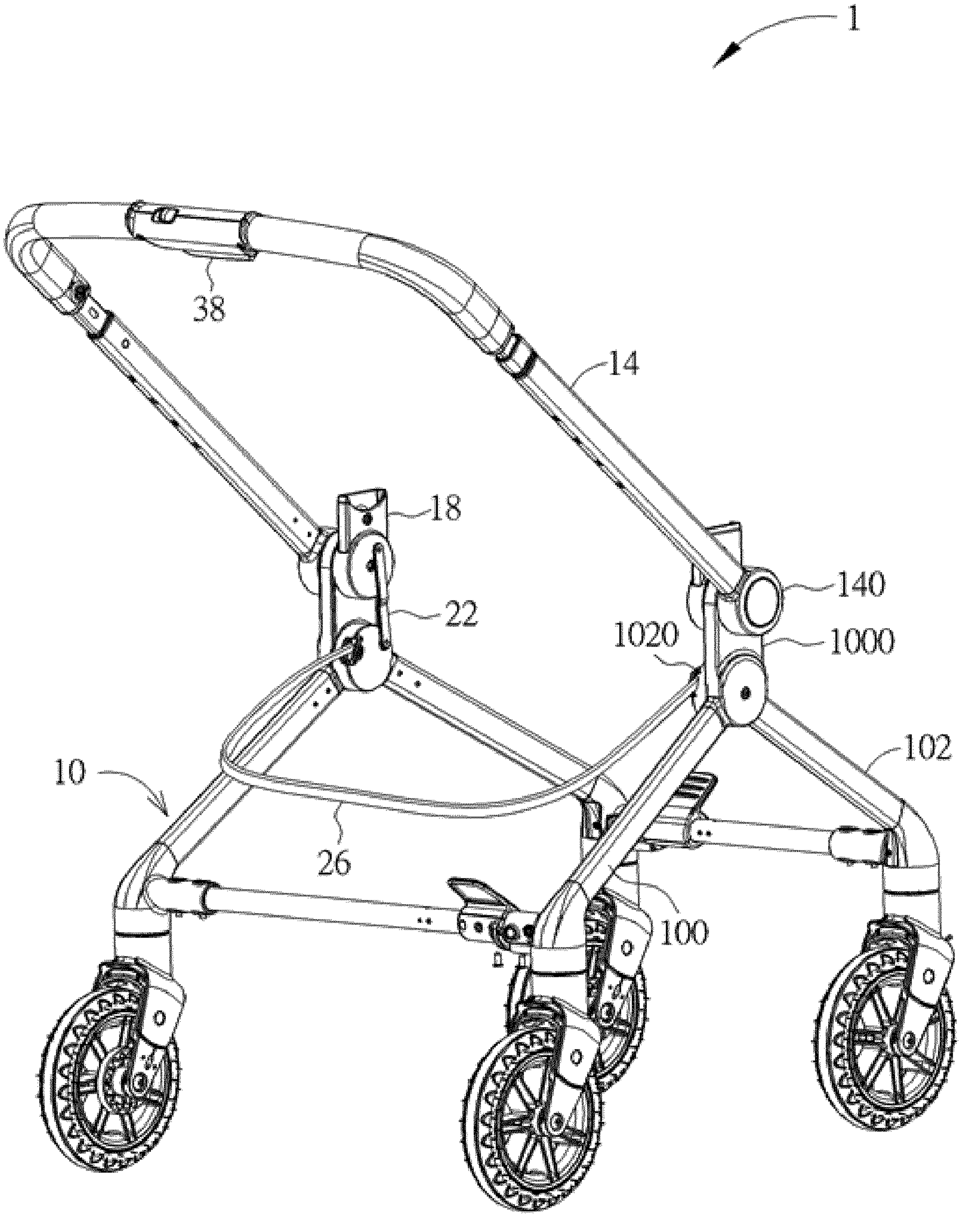
FIG. 2 is a perspective view of the passenger device in FIG. 1 with the seat removed from another perspective.
Figure 3:
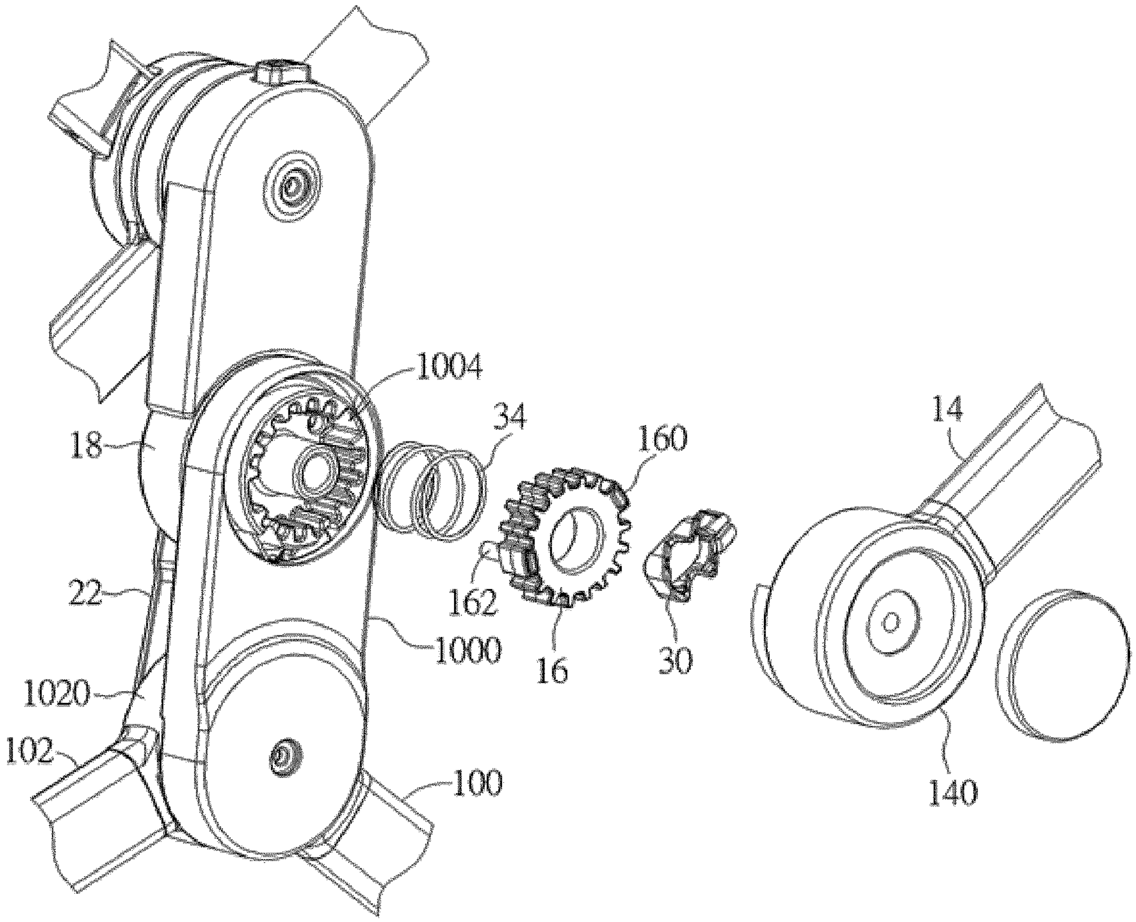
FIG. 3 is an exploded view of a handlebar, a second driving member, a second locking member, a second elastic member, and a first support member.
Figure 4:
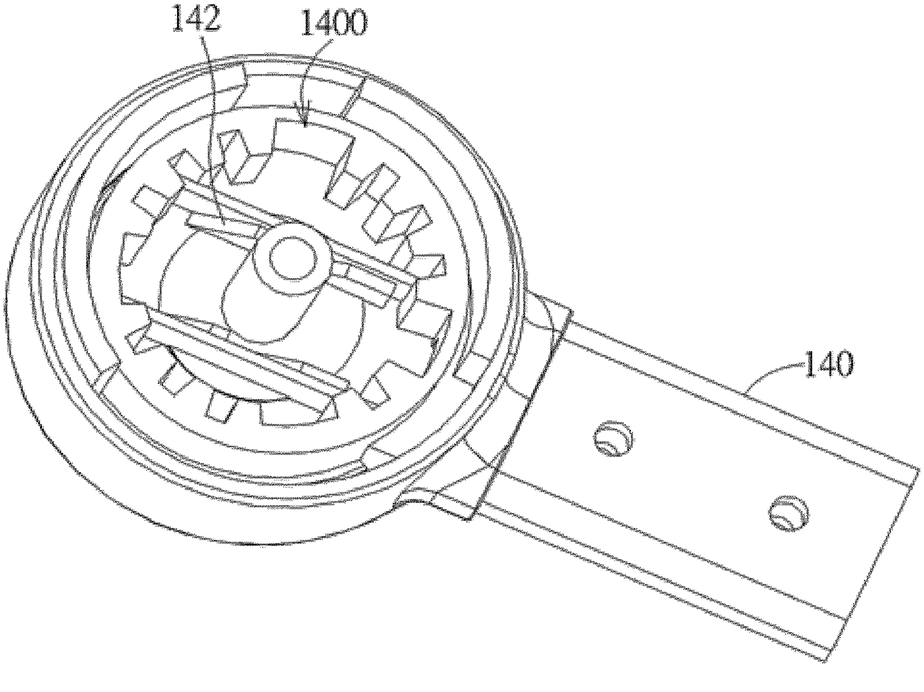
FIG. 4 is a perspective view of a handlebar connecting seat in FIG. 3 from another perspective.
Figure 5:
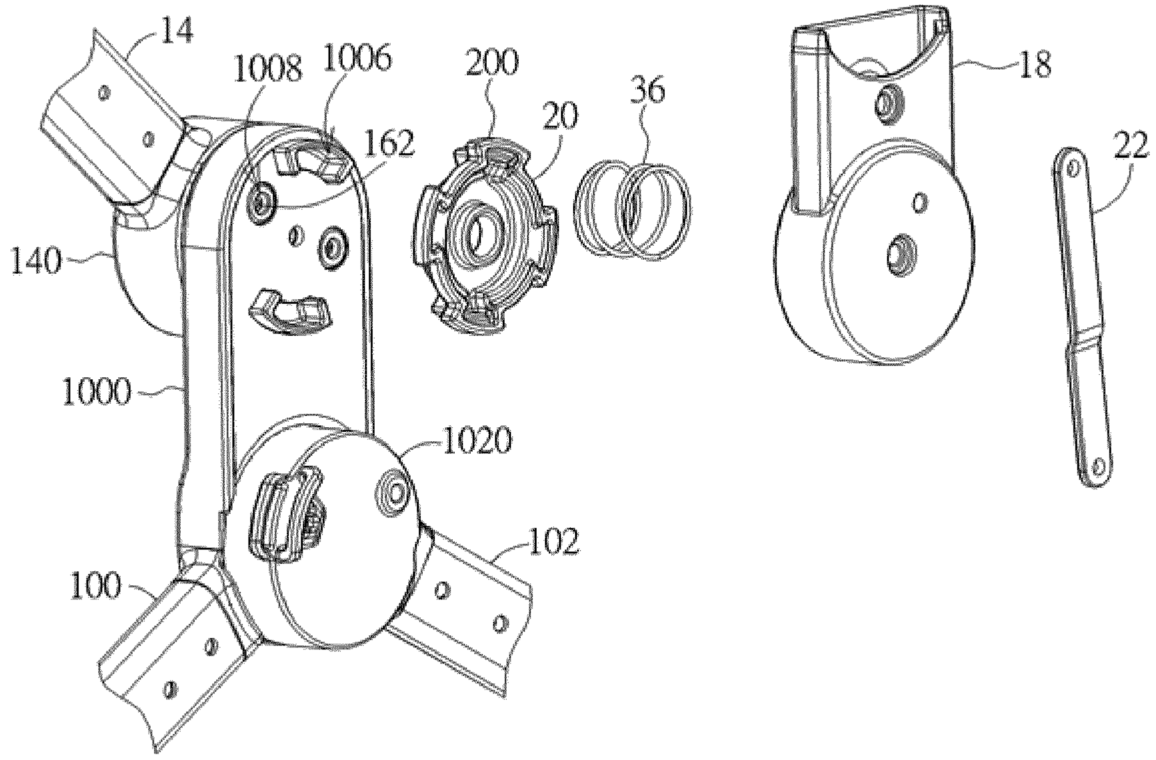
FIG. 5 is an exploded view of a linkage member, a fixed seat, a third elastic member, a third locking member, and the first support member.
Figure 6:
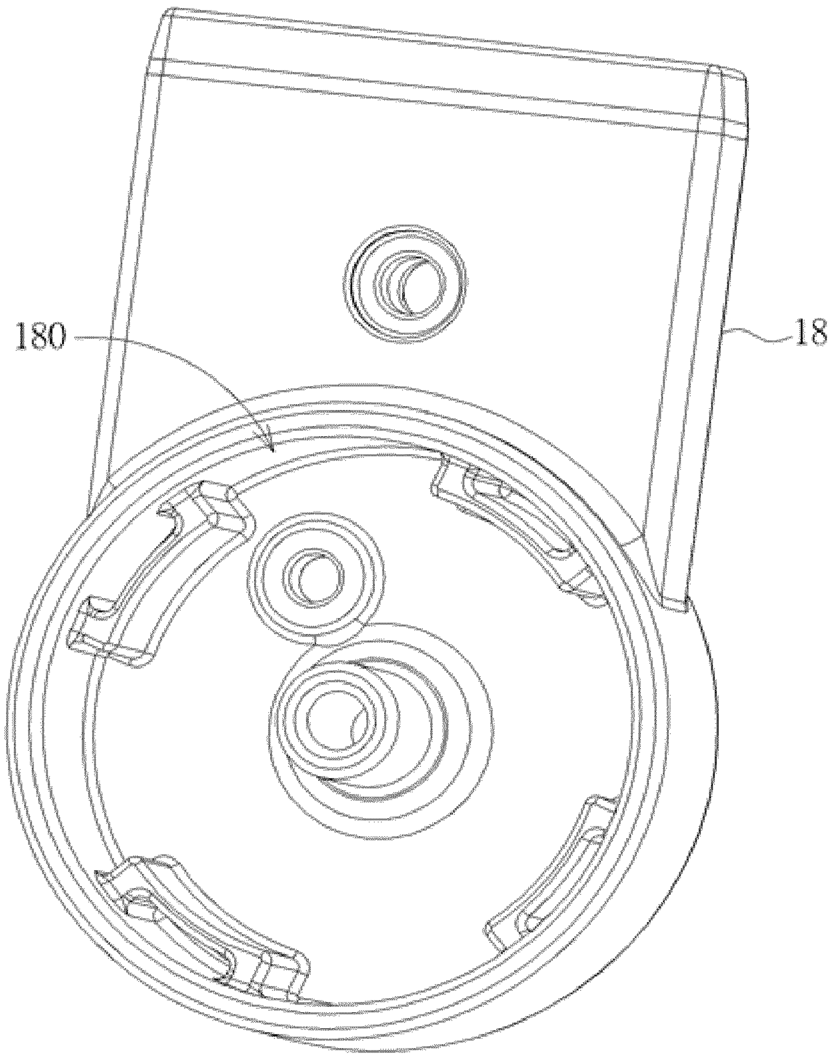
FIG. 6 is a perspective view of the fixed seat in FIG. 5 from another perspective.
Figure 7:
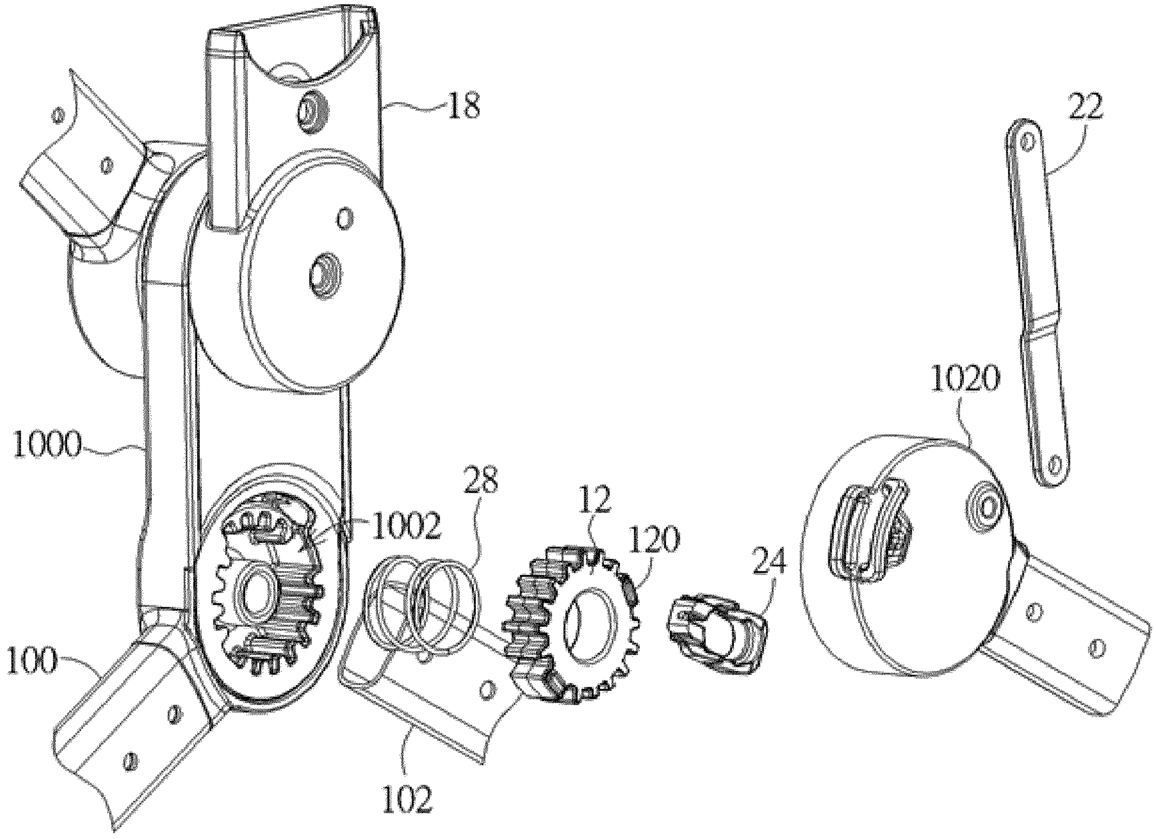
FIG. 7 is an exploded view of the linkage member, a second connecting seat, a first driving member, a first locking member, a first elastic member, and the first support member.

Referring to FIG. 1 to FIG. 7, FIG. 1 is a perspective view of a passenger device 1 according to an embodiment of the present disclosure, FIG. 2 is a perspective view of the passenger device 1 in FIG. 1 with a seat 40 from removed another perspective, FIG. 3 is an exploded view of a handlebar 14, a second driving member 30, a second locking member 16, a second elastic member 34, and a first support member 100, FIG. 4 is a perspective view of a handlebar connecting seat 140 in FIG. 3 from another perspective, FIG. 5 is an exploded view of a linkage member 22, a fixed seat 18, a third elastic member 36, a third locking member 20, and the first support member 100, FIG. 6 is a perspective view of the fixed seat 18 in FIG. 5 from another perspective, and FIG. 7 is an exploded view of the linkage member 22, a second connecting seat 1020, a first driving member 24, a first locking member 12, a first elastic member 28, and the first support member 100.

As shown in FIG. 1 to FIG. 7, the passenger device 1 according to the present disclosure includes a frame 10, a first locking member 12, a handlebar 14, a second locking member 16, a fixed seat 18, a third locking member 20, a linkage member 22, a first driving member 24, a pulling member 26, a first elastic member 28, a second driving member 30, a drawing member 32, a second elastic member 34, a third elastic member 36, an operating member 38, and a seat 40. The passenger device 1 may be a stroller or other devices for use. It is to be noted that the passenger device 1 according to the present disclosure is a structure roughly in bilateral symmetry, and the technical characteristics of the present disclosure are described below in terms of the structure on one side.

As shown in FIG. 1 and FIG. 2, the frame 10 includes a first support member 100 and a second support member 102. The first support member 100 is pivotally connected to the second support member 102, so that the first support member 100 and the second support member 102 are rotatable relative to each other to be folded or unfolded. In this embodiment, the first support member 100 may be a rear leg of the frame 10, and the second support member 102 may be a front leg of the frame 10, which are not limited thereto. The first support member 100 may include a first connecting seat 1000, and the second support member 102 may include a second connecting seat 1020. The first connecting seat 1000 is pivotally connected to the second connecting seat 1020. The fixed seat 18 is pivotally connected to the first connecting seat 1000 of the first support member 100, so that the fixed seat 18 is rotatable relative to the first support member 100. The linkage member 22 is pivotally connected to the second connecting seat 1020 of the second support member 102, and to the fixed seat 18. Therefore, when the first support member 100 and the second support member 102 are rotated relative to each other to be folded or unfolded, the second support member 102 may drive the linkage member 22 to drive the fixed seat 18 to be rotated relative to the frame 10 to be folded or unfolded.

As shown in FIG. 3, in this embodiment, the handlebar 14 may include a handlebar connecting seat 140. The handlebar connecting seat 140 of the handlebar 14 is pivotally connected to the first connecting seat 1000 of the first support member 100, so that the handlebar 14 is rotatable relative to the first support member 100. The second locking member 16, the second driving member 30, and the second elastic member 34 are all arranged between the first connecting seat 1000 of the first support member 100 and the handlebar connecting seat 140 of the handlebar 14. As shown in FIG. 4, the handlebar connecting seat 140 of the handlebar 14 has a second driving structure 142. The second driving member 30 is abutted against the second locking member 16 and the second driving structure 142 of the handlebar 14. The second elastic member 34 is abutted against the first connecting seat 1000 of the first support member 100 and the second locking member 16. In this embodiment, the second elastic member 34 may be a spring, but is not limited thereto.

As shown in FIG. 3 and FIG. 4, the first connecting seat 1000 of the first support member 100 may be provided with a third slot 1004, the handlebar connecting seat 140 of the handlebar 14 may be provided with a fourth slot 1400, and the second locking member 16 may be provided with a second clamping portion 160. The second clamping portion 160 is clamped in the third slot 1004 and the fourth slot 1400 to lock the handlebar 14. It is to be noted that numbers and positions of the third slot 1004, the fourth slot 1400, and the second clamping portion 160 may be determined according to actual disclosures.

As shown in FIG. 1, the operating member 38 is movably arranged on the handlebar 14. An end of the drawing member 32 is connected to the operating member 38, and the other end of the drawing member 32 is connected to the second driving member 30 shown in FIG. 3. Therefore, when the operating member 38 is pressed, the operating member 38 may pull the drawing member 32. When the drawing member 32 is pulled, the drawing member 32 may drive the second driving member 30 to move. In this embodiment, the operating member 38 may be a button, and the drawing member 32 may be a steel wire, which are not limited thereto.

As shown in FIG. 5, the third locking member 20 and the third elastic member 36 are both arranged between the first connecting seat 1000 of the first support member 100 and the fixed seat 18. The third elastic member 36 is abutted against the third locking member 20 and the fixed seat 18. In this embodiment, the third elastic member 36 may be a spring, but is not limited thereto. As shown in FIG. 5 and FIG. 6, the first connecting seat 1000 of the first support member 100 may be provided with a fifth slot 1006, the fixed seat 18 may be provided with a sixth slot 180, and the third locking member 20 may be provided with a third clamping portion 200. The third clamping portion 200 is clamped in the fifth slot 1006 and the sixth slot 180 to lock the fixed seat 18. It is to be noted that numbers and positions of the fifth slot 1006, the sixth slot 180, and the third clamping portion 200 may be determined according to actual disclosures.

As shown in FIG. 3 and FIG. 5, the second locking member 16 and the third locking member 20 are located on two sides of the first connecting seat 1000 of the first support member 100. In addition, the first connecting seat 1000 of the first support member 100 may be provided with a through hole 1008, and the second locking member 16 may be provided with a push rod 162. The push rod 162 is inserted into the through hole 1008.

As shown in FIG. 7, the first locking member 12, the first driving member 24, and the first elastic member 28 are all arranged between the first connecting seat 1000 of the first support member 100 and the second connecting seat 1020 of the second support member 102. In this embodiment, an inner surface of the second connecting seat 1020 of the second support member 102 may be provided with a first driving structure (not shown in the figure). The first driving structure is roughly the same as the second driving structure 142 in FIG. 4. The first driving member 24 is abutted against the first locking member 12 and the first driving structure of the second support member 102. The first elastic member 28 is abutted against the first connecting seat 1000 of the first support member 100 and the first locking member 12. In this embodiment, the first elastic member 28 may be a spring, but is not limited thereto.

As shown in FIG. 7, the first connecting seat 1000 of the first support member 100 may be provided with a first slot 1002, the inner surface of the second connecting seat 1020 of the second support member 102 may be provided with a second slot (not shown in the figure), and the first locking member 12 may be provided with a first clamping portion 120. The second slot is roughly the same as the fourth slot 1400 in FIG. 4. The first clamping portion 120 is clamped in the first slot 1002 and the second slot to lock the first support member 100 and the second support member 102. It is to be noted that numbers and positions of the first slot 1002, the second slot, and the first clamping portion 120 may be determined according to actual disclosures. In addition, the pulling member 26 shown in FIG. 2 is extended into the second connecting seat 1020 of the second support member 102 and is connected to the first driving member 24. In this embodiment, the pulling member 26 may be a braid, but is not limited thereto.

An actuation principle of the present disclosure is illustrated below with reference to the elements shown in FIG. 1 to FIG. 7.

When the passenger device 1 is in the unfolded state shown in FIG. 1, the first locking member 12 locks the first support member 100 and the second support member 102, the second locking member 16 locks the handlebar 14, and the third locking member 20 locks the fixed seat 18. In this case, the first support member 100, the second support member 102, the handlebar 14, and the fixed seat 18 are not rotatable. When a user is intended to reverse or fold the handlebar 14, the user may press the operating member 38. In this case, the operating member 38 may pull the drawing member 32, so that the drawing member 32 may drive the second driving member 30 to move. As shown in FIG. 3 and FIG. 4, the second driving member 30 and the second driving structure 142 have inclined planes abutting against each other. Therefore, when the drawing member 32 drives the second driving member 30 to move, the second driving structure 142 may push the second driving member 30 towards the second locking member 16, and the second driving member 30 may push the second locking member 16 towards the first connecting seat 1000 of the first support member 100, so that the second clamping portion 160 of the second locking member 16 is disengaged from the fourth slot 1400 of the handlebar 14. In this way, the second locking member 16 unlocks the handlebar 14. In this case, the user may rotate the handlebar 14 to reverse or fold the handlebar 14. In this case, the first support member 100 and the second support member 102 of the frame 10 are still locked by the first locking member 12, and therefore, the reversal or folding of the handlebar 14 may not lead to the folding of the frame 10.

When the second driving member 30 pushes the second locking member 16 towards the first connecting seat 1000 of the first support member 100, the second locking member 16 may compress the second elastic member 34. When the second clamping portion 160 of the second locking member 16 is re-aligned with the fourth slot 1400 of the handlebar 14, the second elastic member 34 may push the second locking member 16, so that the second locking member 16 is reset.

In addition, when the second driving member 30 pushes the second locking member 16 towards the first connecting seat 1000 of the first support member 100, the push rod 162 of the second locking member 16 may push the third locking member 20 towards the fixed seat 18, so that the third clamping portion 200 of the third locking member 20 is disengaged from the fifth slot 1006 of the first support member 100 to unlock the fixed seat 18. In other words, when the second locking member 16 unlocks the handlebar 14, the second locking member 16 may drive the third locking member 20 to unlock the fixed seat 18.

When the push rod 162 of the second locking member 16 pushes the third locking member 20 towards the fixed seat 18, the third locking member 20 may compress the third elastic member 36. When the second locking member 16 is reset, the third elastic member 36 may push the third locking member 20, so that the third locking member 20 is reset.

When the user is intended to fold the frame 10, the user may further pull the pulling member 26. When the pulling member 26 is pulled, the pulling member 26 may drive the first driving member 24 to move. In this embodiment, the first driving member 24 and the first driving structure (the first driving structure is roughly the same as the second driving structure 142 in FIG. 4) of the second support member 102 may also have inclined planes abutting against each other. Therefore, when the pulling member 26 drives the first driving member 24 to move, the first driving structure may push the first driving member 24 towards the first locking member 12, and the first driving member 24 may push the first locking member 12 towards the first connecting seat 1000 of the first support member 100, so that the first clamping portion 120 of the first locking member 12 is disengaged from the second support member 102. In this way, the first locking member 12 unlocks the first support member 100 and the second support member 102.

When the third locking member 20 unlocks the fixed seat 18 and the first locking member 12 unlocks the first support member 100 and the second support member 102, the first support member 100 and the second support member 102 may be rotated relative to each other to be folded, so that the second support member 102 drives the linkage member 22 to drive the fixed seat 18 to be rotated relative to the frame 10 to be folded.

When the first driving member 24 pushes the first locking member 12 towards the first connecting seat 1000 of the first support member 100, the first locking member 12 may compress the first elastic member 28. When the first clamping portion 120 of the first locking member 12 is re-aligned with the second slot of the second support member 102, the first elastic member 28 may push the first locking member 12, so that the first locking member 12 is reset.

As shown in FIG. 1, the seat 40 is detachably arranged on the fixed seat 18. Therefore, when the fixed seat 18 is rotated relative to the frame 10 to be folded, the seat 40 may be rotated along with the fixed seat 18 to be folded.

Figure 8:
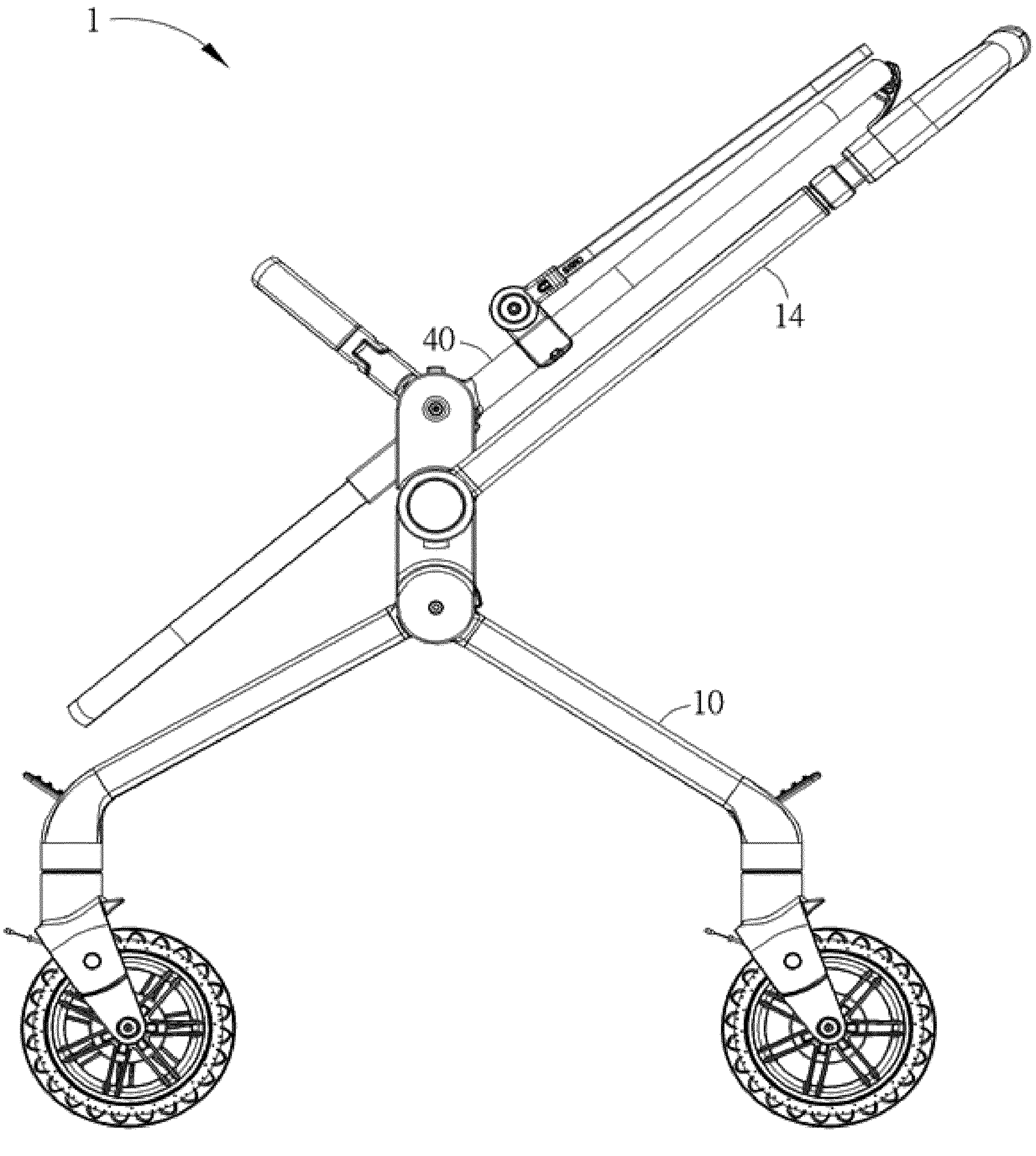
FIG. 8 is a side view of the passenger device in FIG. 1.
Figure 9:
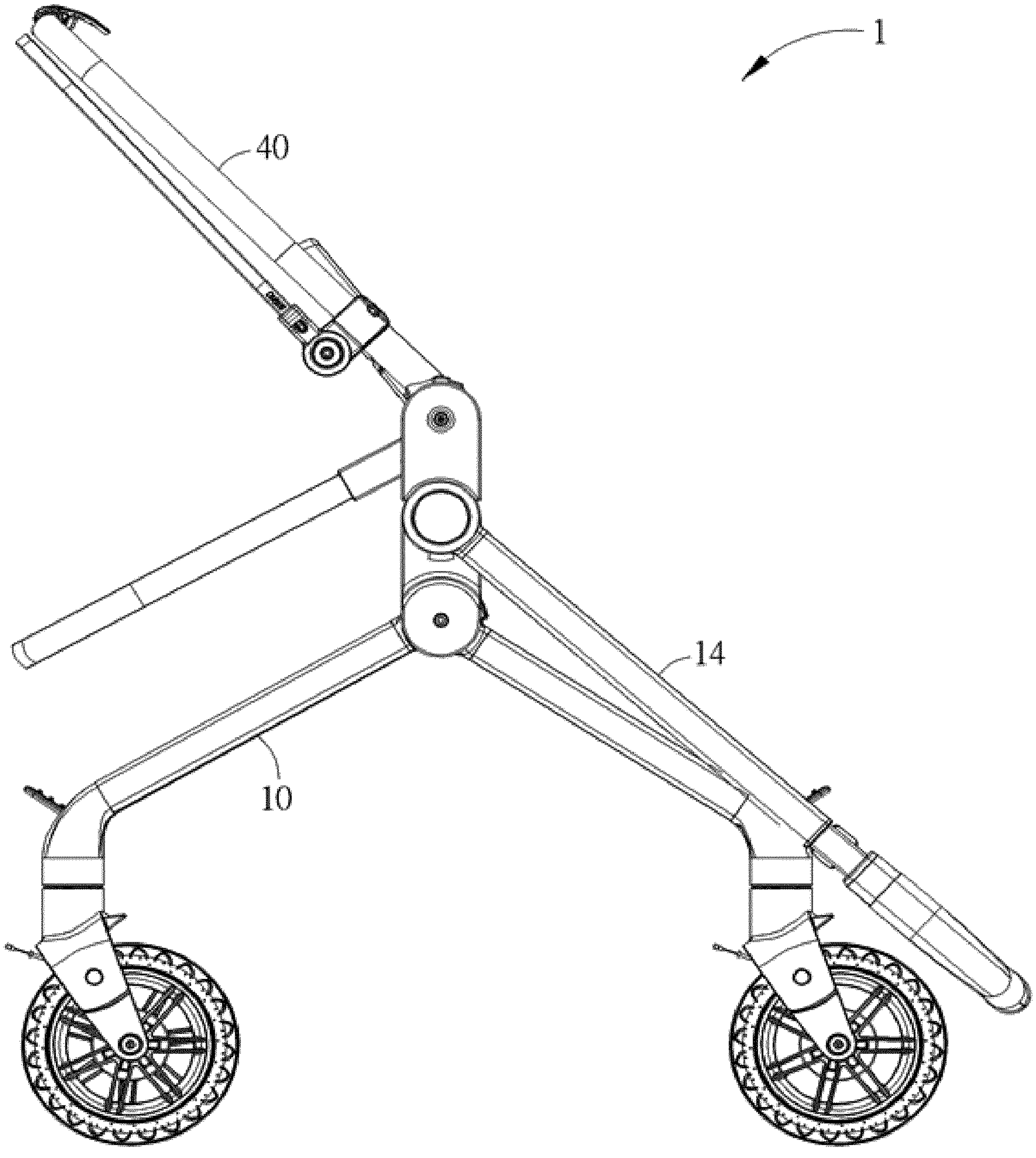
FIG. 9 is a side view illustrating that the handlebar and the seat in FIG. 8 are folded.
Figure 10:
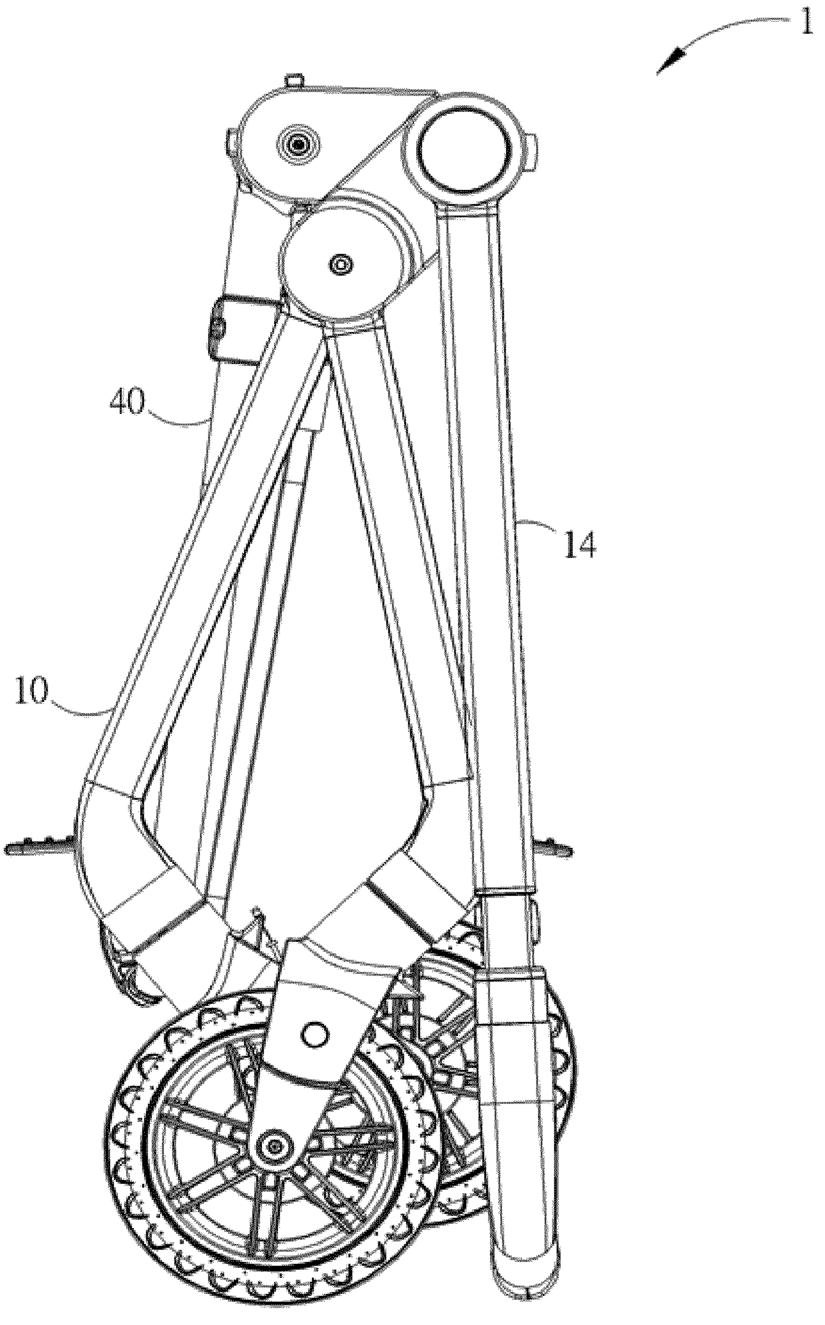
FIG. 10 is a side view illustrating that the frame in FIG. 9 is folded.

Referring to FIG. 8 to FIG. 10, FIG. 8 is a side view of the passenger device 1 in FIG. 1, FIG. 9 is a side view illustrating that the handlebar 14 and the seat 40 in FIG. 8 are folded, and FIG. 10 is a side view illustrating that the frame 10 in FIG. 9 is folded.

As shown in FIG. 8 to FIG. 10, the user may first fold the handlebar 14 according to the above operation manner. When the handlebar 14 is folded, the frame 10 is still kept unfolded. Next, the user may fold the seat 40. After the handlebar 14 and the seat 40 are folded, the user folds the frame 10 according to the above operation manner again. During the folding of the frame 10, the frame 10 may synchronously drive the seat 40 to be folded.

Figure 11:
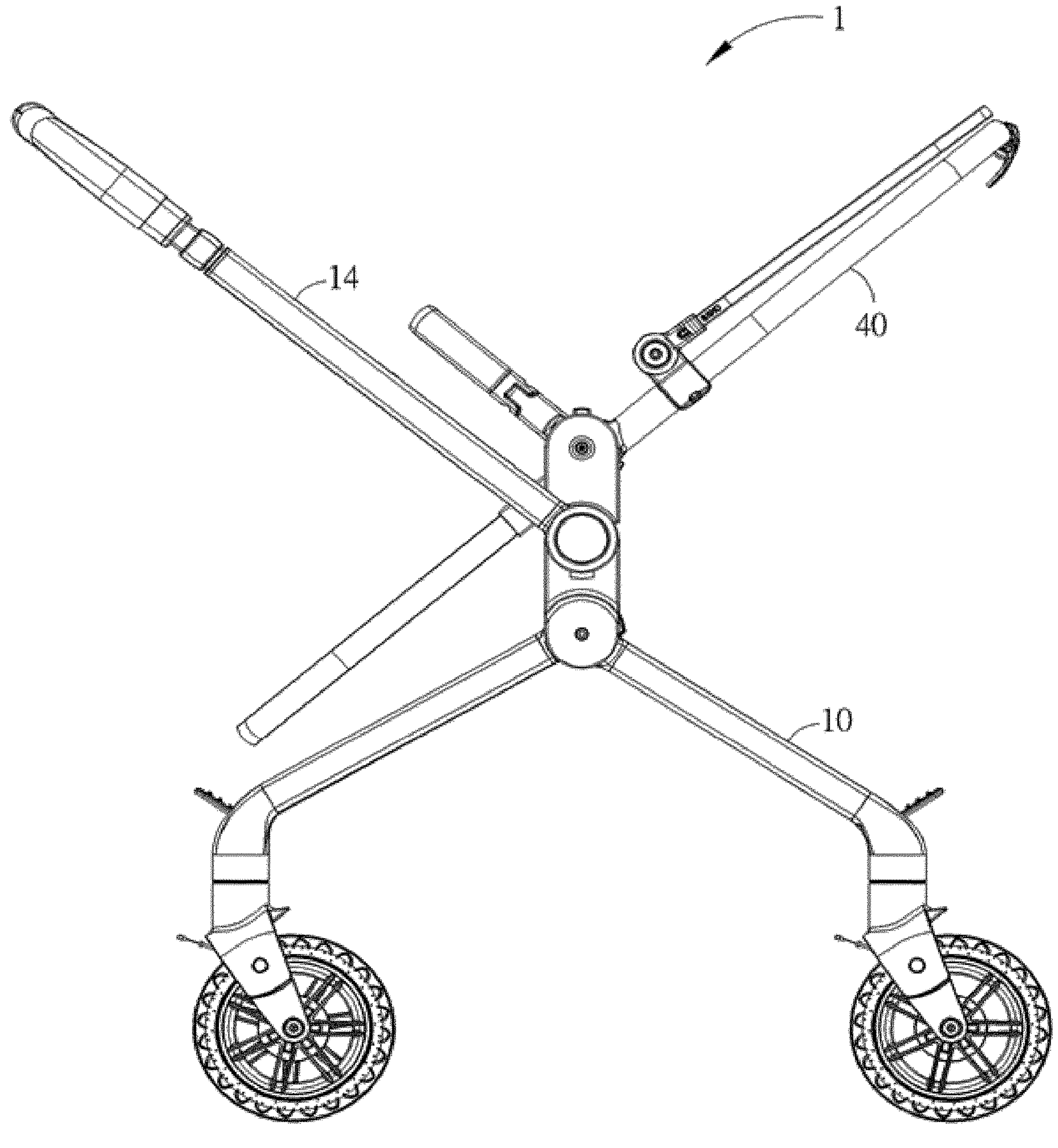
FIG. 11 is a side view illustrating that the handlebar of the passenger device in FIG. 1 is reversed.
Figure 12:
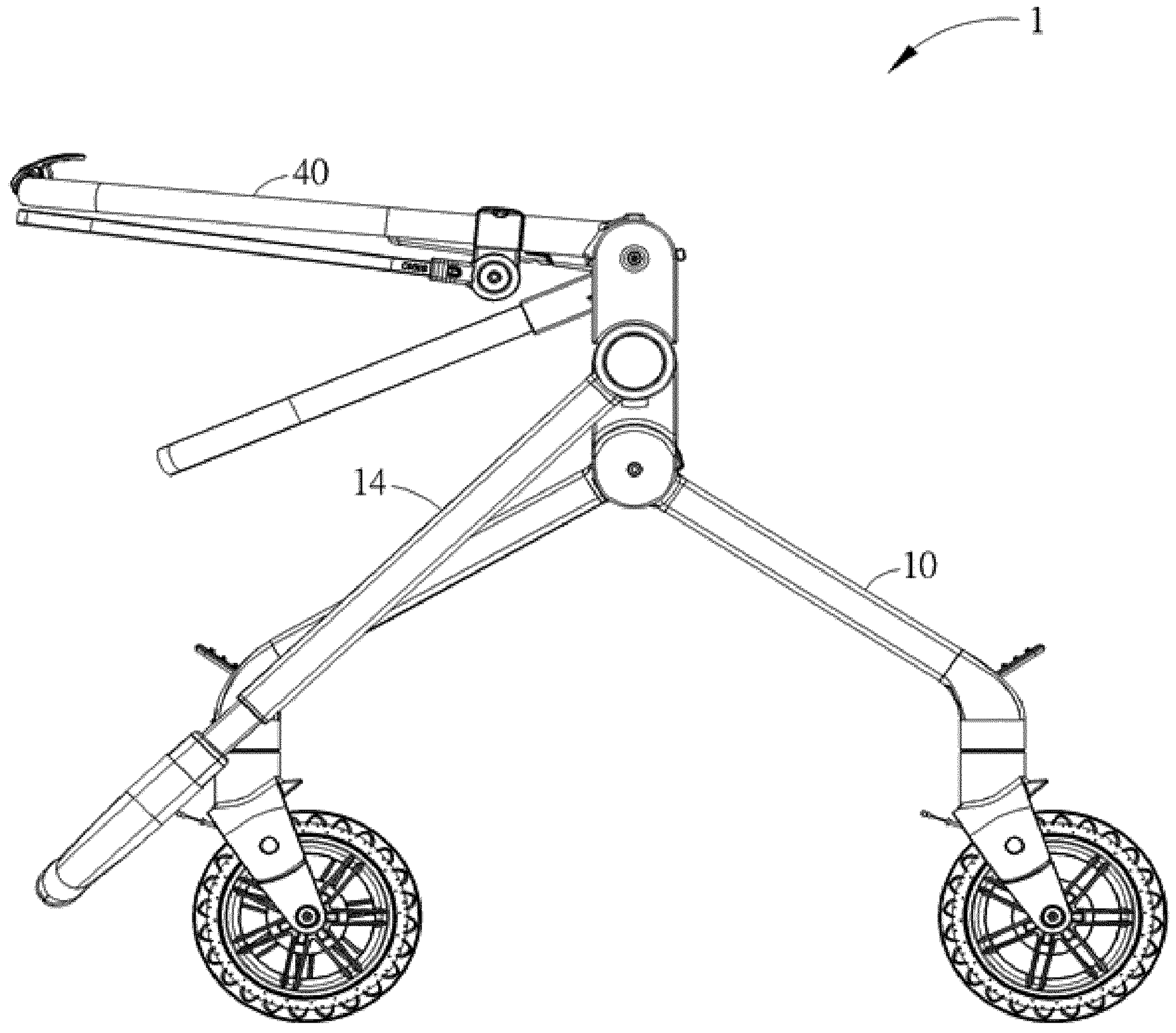
FIG. 12 is a side view illustrating that the handlebar and the seat in FIG. 11 are folded.
Figure 13:
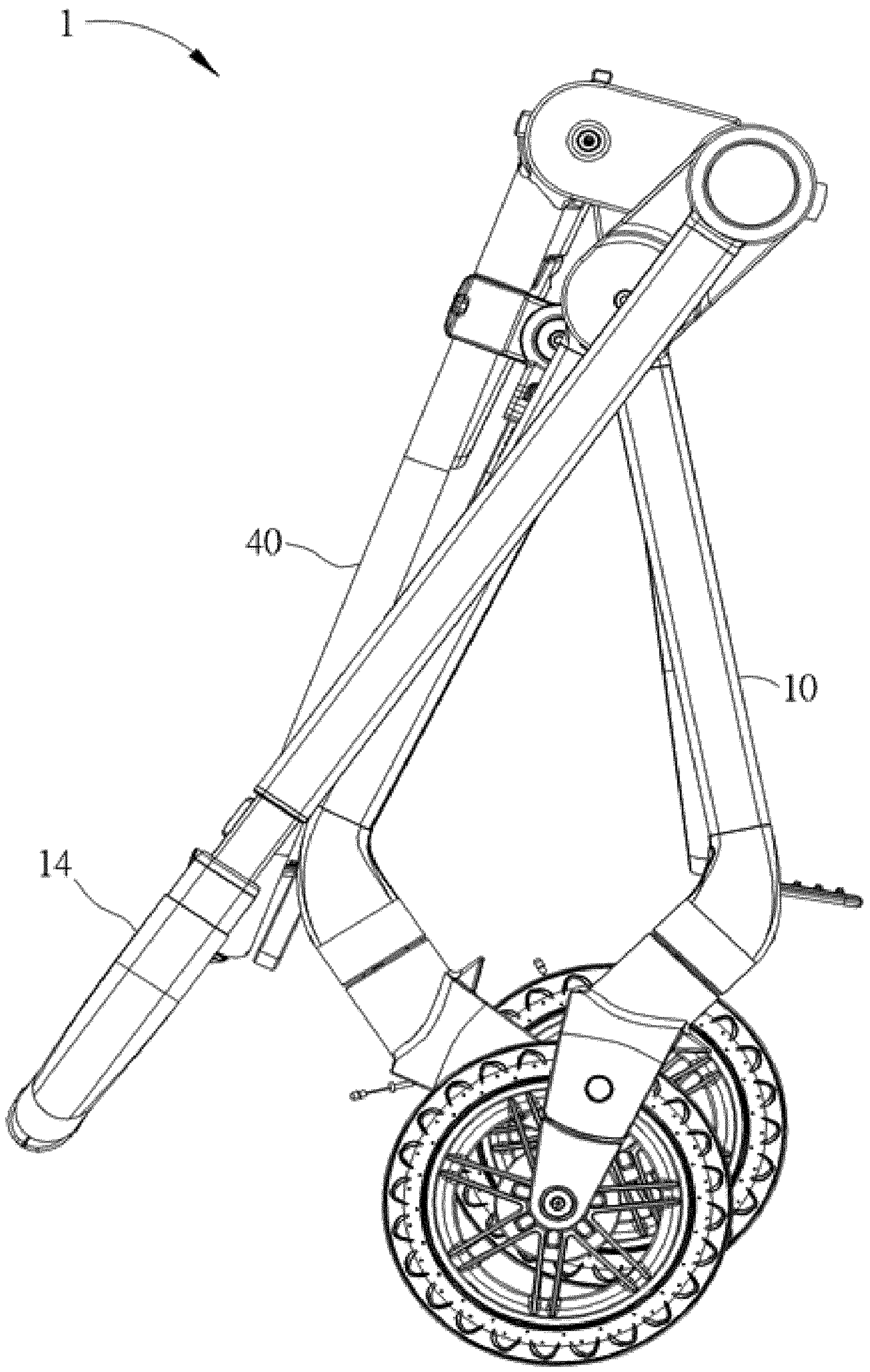
FIG. 13 is a side view illustrating that the frame in FIG. 12 is folded.

Referring to FIG. 11 to FIG. 13, FIG. 11 is a side view illustrating that the handlebar 14 of the passenger device 1 in FIG. 1 is reversed, FIG. 12 is a side view illustrating that the handlebar 14 and the seat 40 in FIG. 11 are folded, and FIG. 13 is a side view illustrating that the frame 10 in FIG. 12 is folded.

As shown in FIG. 11 to FIG. 13, the user may first reverse and then fold the handlebar 14 according to the above operation manner. When the handlebar 14 is folded, the frame 10 is still kept unfolded. Next, the user may fold the seat 40. After the handlebar 14 and the seat 40 are folded, the user folds the frame 10 according to the above operation manner again. During the folding of the frame 10, the frame 10 may synchronously drive the seat 40 to be folded.

In another embodiment, in the present disclosure, the handlebar 14 may be foldable when in the state shown in FIG. 8, and the handlebar 14 may be not foldable when in the state shown in FIG. 11. Further, when the handlebar 14 is in the state shown in FIG. 8, the user may fold the handlebar 14 to the state shown in FIG. 9. When the user switches the handlebar 14 from the state shown in FIG. 8 to the state shown in FIG. 11, the handlebar 14 cannot be folded to the state shown in FIG. 12 by the user.

Therefore, in the present disclosure, the handlebar 14 may be selectively foldable or non-foldable when in the state shown in FIG. 11, depending on actual disclosures.

Figure 14:
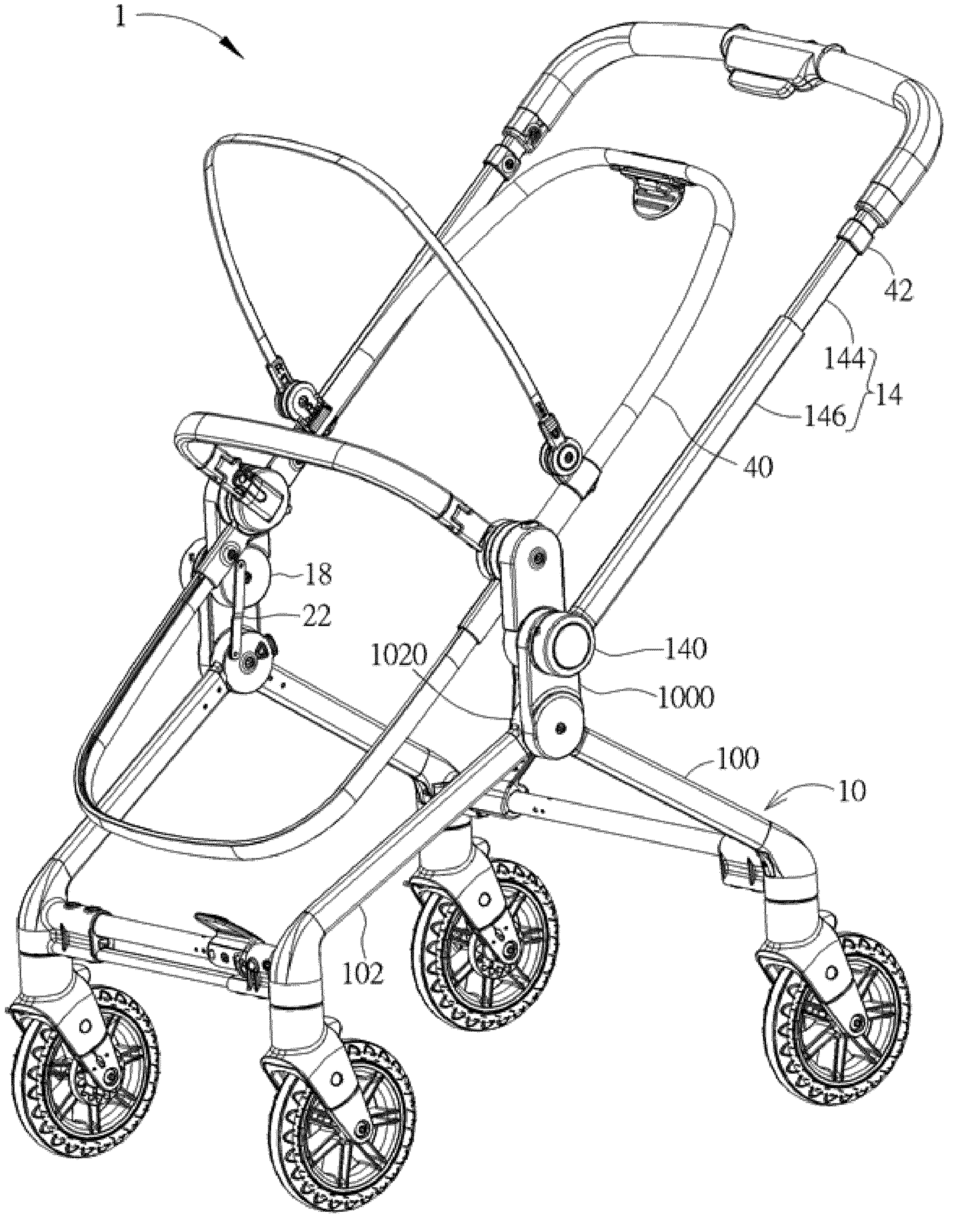
FIG. 14 is a perspective view of a passenger device according to another embodiment of the present disclosure.
Figure 15:
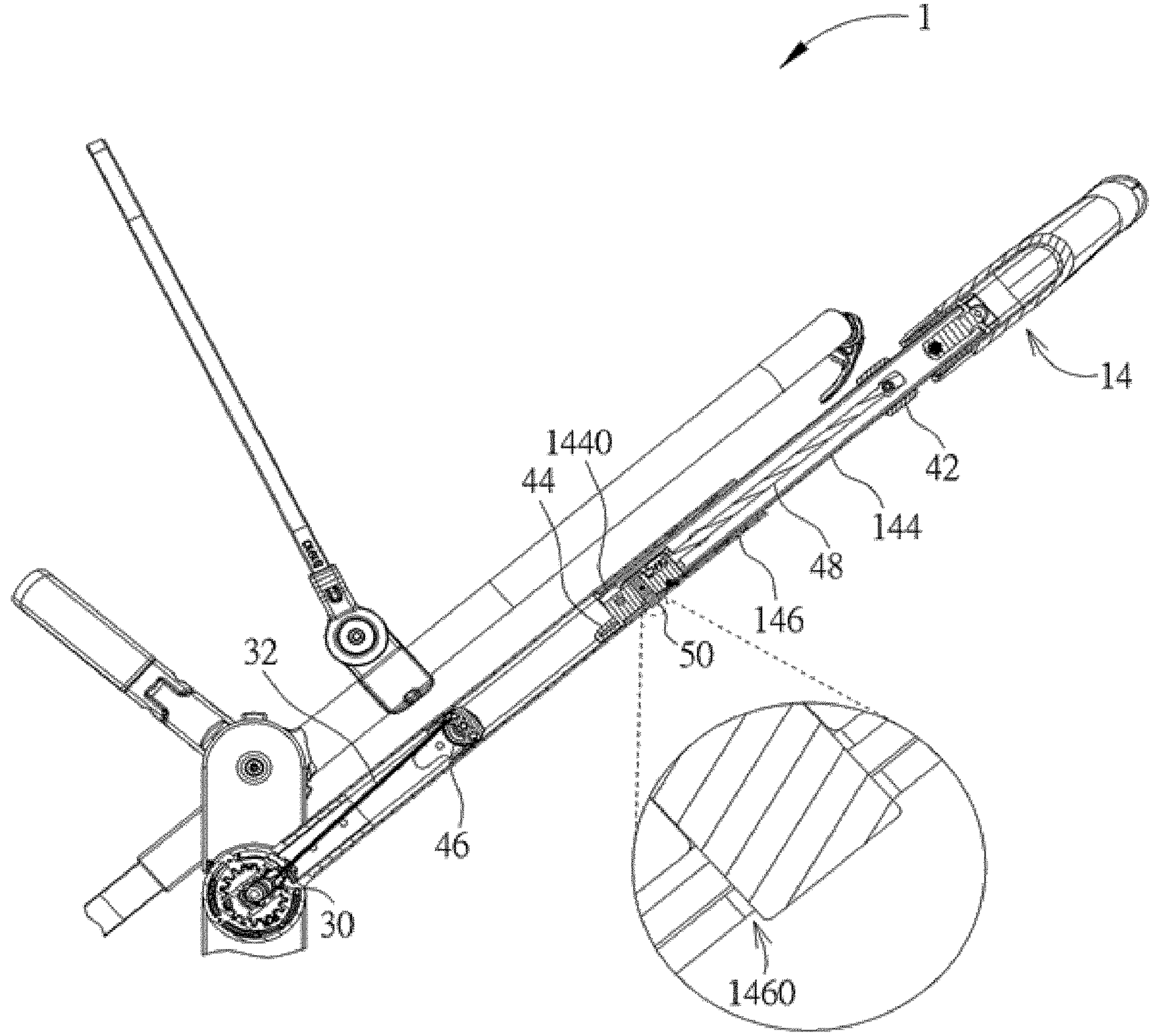
FIG. 15 is a partial sectional view of the passenger device in FIG. 14.
Figure 16:
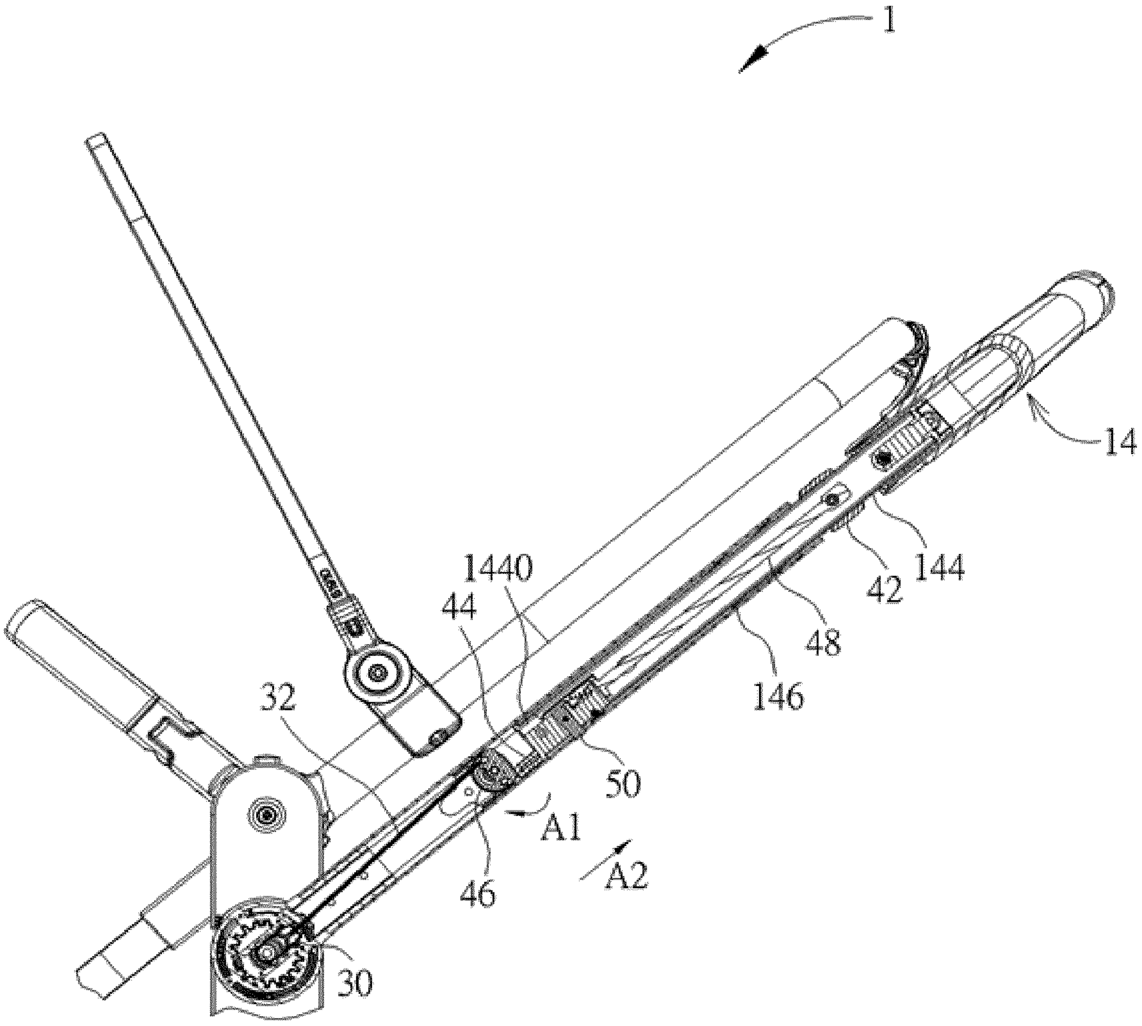
FIG. 16 is a sectional view illustrating that the upper handlebar in FIG. 15 slides to a lowest position relative to a lower handlebar.

Referring to FIG. 14 to FIG. 16, FIG. 14 is a perspective view of the passenger device 1 according to another embodiment of the present disclosure, FIG. 15 is a partial sectional view of the passenger device 1 in FIG. 14, and FIG. 16 is a sectional view illustrating that the upper handlebar 144 in FIG. 15 slides to a lowest position relative to a lower handlebar 146.

As shown in FIG. 14 to FIG. 16, the passenger device 1 may further include an operating member 42, a pushing member 44, a rotating member 46, a connecting member 48, and a clamping member 50, and the handlebar 14 may include an upper handlebar 144 and a lower handlebar 146. The lower handlebar 146 is pivotally connected to the first connecting seat 1000 of the first support member 100, and a lower end 1440 of the upper handlebar 144 is telescopically inserted into the lower handlebar 146. The pushing member 44 is arranged at the lower end 1440 of the upper handlebar 144. The operating member 42 is slidably arranged on the upper handlebar 144. The rotating member 46 is rotatably arranged in the lower handlebar 146. Two ends of the connecting member 48 are connected to the operating member 42 and the clamping member 50, respectively. The lower handlebar 146 is provided with a plurality of clamping holes 1460. The clamping member 50 is clamped in one of the plurality of clamping holes 1460 to lock the upper handlebar 144. The operating member 42 is operable, so that the clamping member 50 is driven by the connecting member 48 to be detached from the clamping hole 1460, so that the upper handlebar 144 is slidable relative to the lower handlebar 146 to adjust a length of the handlebar 14. In this embodiment, the user may pull the operating member 42 upwards, so that the clamping member 50 is driven by the connecting member 48 to be detached from the clamping hole 1460. Next, the user may slide the upper handlebar 144 upwards or downwards relative to the lower handlebar 146 and clamp the clamping member 50 in the corresponding clamping hole 1460 to adjust the length of the handlebar 14.

As shown in FIG. 15 and FIG. 16, two ends of the drawing member 32 may be connected to the rotating member 46 and the second driving member 30, respectively. As described above, the operating member 42 is operable to cause the upper handlebar 144 to slide relative to the lower handlebar 146. As shown in FIG. 16, when the upper handlebar 144 slides to the lowest position relative to the lower handlebar 146, the pushing member 44 may push an end of the rotating member 46 to be rotated along a direction indicated by an arrow A1, so that the other end of the rotating member 46 pulls the drawing member 32 along a direction indicated by an arrow A2, so as to unlock the lower handlebar 146 of the handlebar 14. In this case, the user may rotate the handlebar 14 to reverse or fold the handlebar 14. It is to be noted that an unlock structure and an actuation principle of the handlebar 14 are described above, and details are not described herein again.

Therefore, according to the above technical solutions, the passenger device according to the present disclosure has at least the following advantages and beneficial effects: when the user is intended to fold the frame, the user is required to first operate the second locking member to unlock the handlebar; when the second locking member unlocks the handlebar, the second locking member may simultaneously drive the third locking member to unlock the fixed seat; and then, the user operates the first locking member to unlock the first support member and the second support member, in this case, the user may fold the first support member and the second support member relative to each other; when the first support member and the second support member are folded relative to each other, the second support member may simultaneously drive the linkage member to drive the fixed seat to be rotated relative to the frame and folded, so as to realize the folding of the frame; and when the second locking member unlocks the handlebar, the user may reverse or fold the handlebar, in this case, the first support member and the second support member of the frame are still locked by the first locking member, and therefore, the reversal or folding of the handlebar may not lead to the folding of the frame. Since the frame and the handlebar of the passenger device of the present disclosure are folded relatively independently of each other, a risk that the handlebar drives the frame to be synchronously folded can be prevented, so as to improve safety of the passenger device. In addition, during the folding, the frame may drive the fixed seat to be rotated and folded, which can reduce a volume of the passenger device after the folding.

Figure 17:
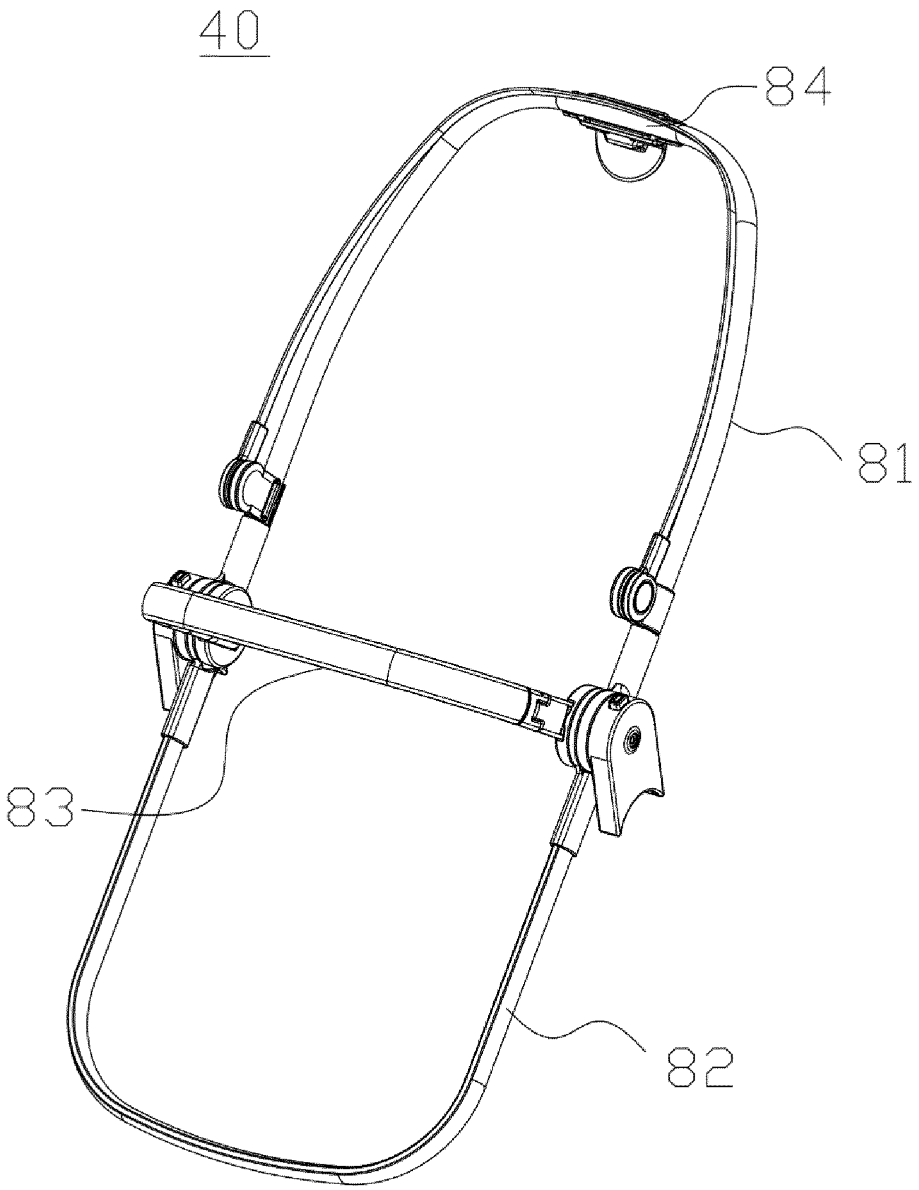
FIG. 17 is a perspective view of a seat according to an embodiment of the present disclosure.

As shown in FIG. 17, the seat 40 of the passenger device 1 according to an embodiment of the present disclosure includes an upper framework 81, a lower framework 82, and an armrest 83. The upper framework 81, the lower framework 82, and the armrest 83 are pivotally connected together through an armrest folding mechanism, so that the three are pivotable relative to one another to be folded.

Figure 18:
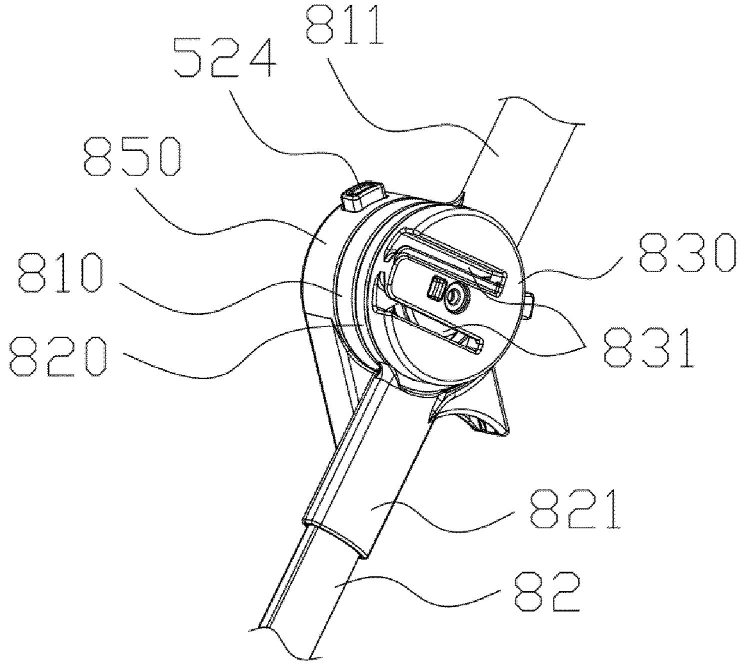
FIG. 18 is a perspective view of an armrest folding mechanism in a locked state according to an embodiment of the present disclosure.
Figure 23:
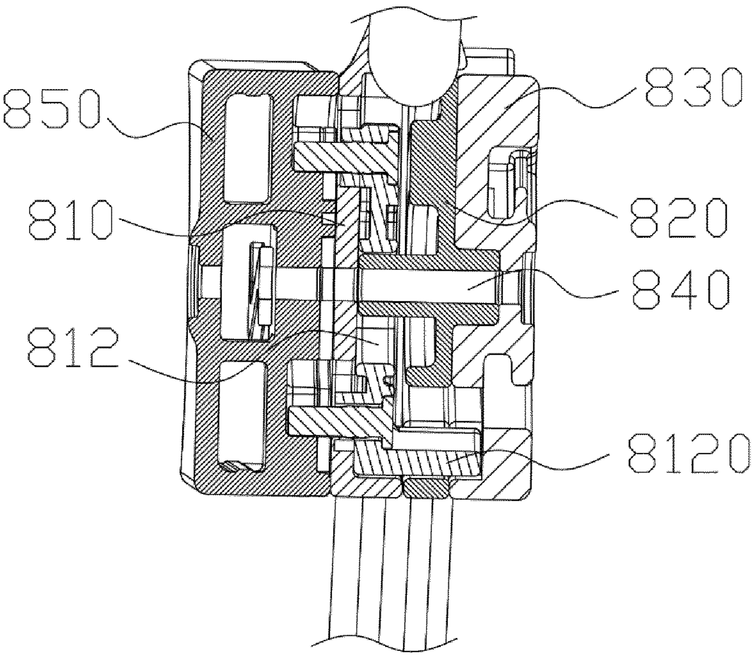
FIG. 23 is a sectional view of the armrest folding mechanism according to an embodiment of the present disclosure.

FIG. 18 illustrates the armrest folding mechanism according to the present disclosure, which includes a first connecting member 810, a second connecting member 820, and a third connecting member 830, which are connected through a connecting shaft 840 (shown in FIG. 23) to be rotatable relative to one another about a central axis.

The first connecting member 810 is connected to the upper framework 81, the second connecting member 820 is connected to the lower framework 82, and the third connecting member 830 is connected to the armrest 83. Since the first connecting member 810, the second connecting member 820, and the third connecting member 830 are rotatable relative to one another, the upper framework 81, the lower framework 82, and the armrest 83 connected thereto respectively are pivotable relative to one another. Such a connection may be fixed or detachable. For example, in the embodiment of FIG. 3, the first connecting member 810 is extended out of a first connecting portion 811 to be fixedly connected to the upper framework 81. The second connecting member 820 is extended out of a second connecting portion 821 to be fixedly connected to the lower framework 82. A connecting groove 831 is arranged in an outer end face of the third connecting member 830 facing away from the second connecting member 820, to be detachably connected to the armrest 83. However, the present disclosure is not limited thereto.

In addition, although the first connecting member 810, the second connecting member 820, and the third connecting member 830 are illustrated as disc-shaped, other shapes are possible as well.

How the seat 40 is switched between the unfolded state and the folded state and how to maintain the seat 40 in the unfolded state through the armrest folding mechanism according to the present disclosure will be described in detail below.

Figure 19:
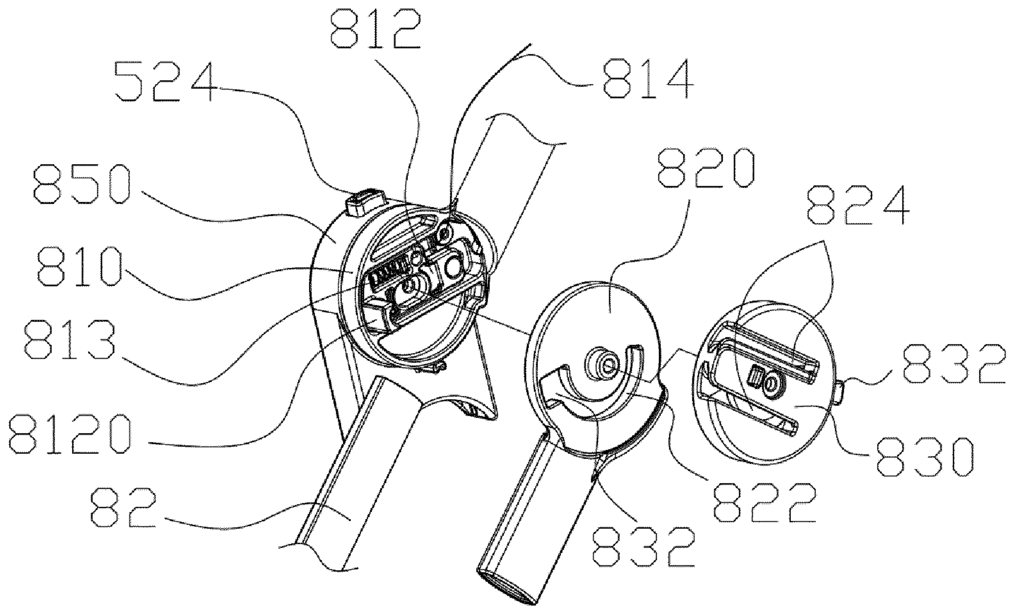
FIG. 19 is a partially exploded perspective view of the armrest folding mechanism shown in FIG. 18.
Figure 20:
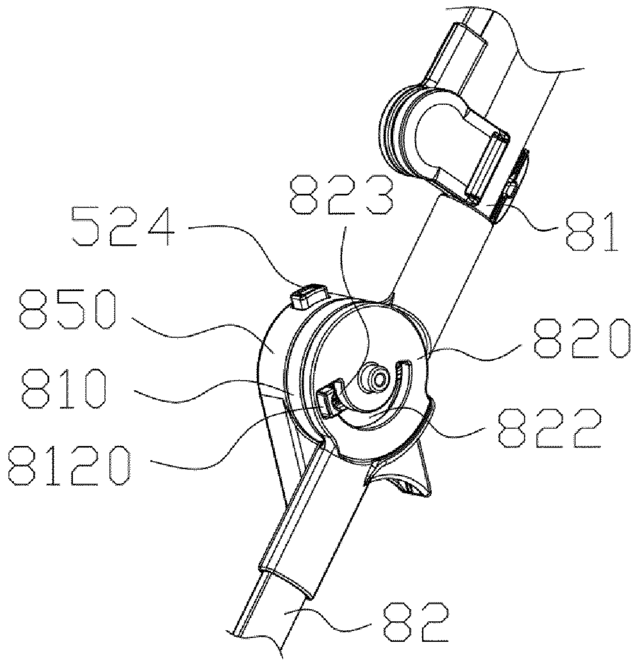
FIG. 20 is a perspective view of the armrest folding mechanism shown in FIG. 18 with a third connecting member removed.
Figure 21:
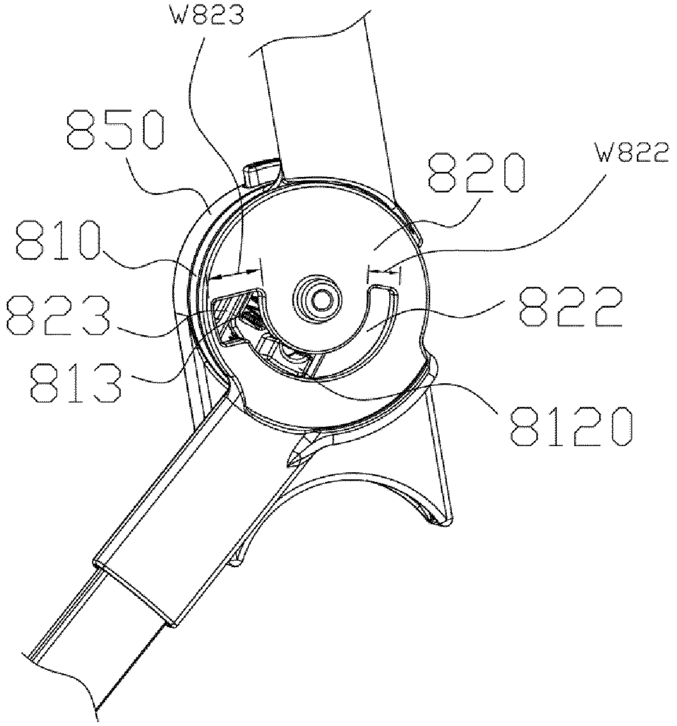
FIG. 21 is a perspective view of the armrest folding mechanism shown in FIG. 20 in an unlocked state.

In order to realize the above functions, the upper framework 81 and the lower framework 82 of the seat 40 are required to be pivotable relative to each other and to be kept at a pivotal angle, such as 180° as shown in FIG. 17 to FIG. 20. That is, the first connecting member 810 and the second connecting member 820 are required to rotatable relative to each other and to mutually lockable without rotation. To this end, as shown in FIG. 19, the first connecting member 810 is connected to a clamping member 812. The clamping member 812 is capable of shifting between a lock position and an unlock position relative to the first connecting member 810, but is not capable of rotating relative to the first connecting member 810. The clamping member 812 includes a protruding portion 8120. Correspondingly, the second connecting member 820 is provided with a first chute 822 bending and extending around the central axis and a clamping hole 823 communicated with an end of the first chute 822. The protruding portion 8120 is capable of being inserted into the clamping hole 823 and is slidable along the first chute 822, as shown in FIG. 20 and FIG. 21. An extension radian of the first chute 822 may be approximately 180° or slightly less than 180° to allow the upper framework 81 connected to the first connecting member 810 and the lower framework 82 connected to the second connecting member 820 to be folded as much as possible relative to each other.

As shown in FIG. 21, a radial width W823 of the clamping hole 823 is greater than a radial width W822 of the first chute 822, and the radial width W823 of the clamping hole 823 is configured to allow the clamping member 812 to shift radially between the lock position and the unlock position after the protruding portion 8120 is inserted into the clamping hole 823, so that the clamping member 812 locks and unlocks the relative rotation of the first connecting member 810 and the second connecting member 820.

Figure 24:
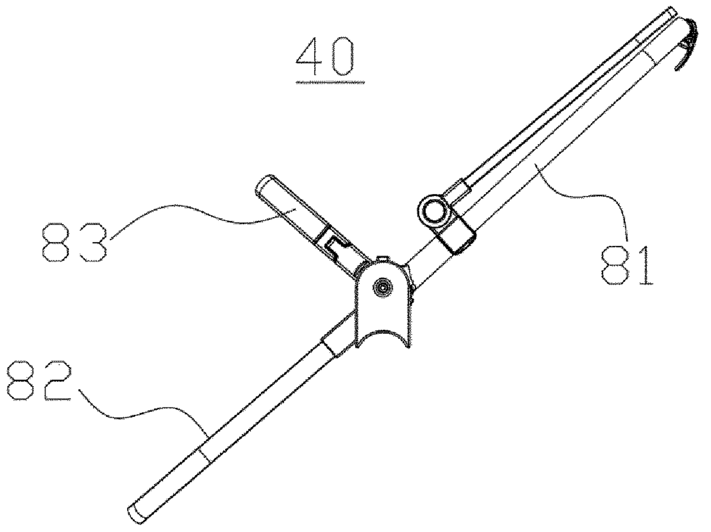
FIG. 24 is a schematic view of the seat shown in FIG. 17 in an unfolded state.

Specifically, in a case that the clamping member 812 is shifted to the lock position, as shown in FIG. 20, the protruding portion 8120 is located at a position in the clamping hole 823 and deviating from the first chute 822, and is not capable of entering the first chute 822, so that the rotation of the first connecting member 810 and the second connecting member 820 relative to each other are prevented. In this case, the seat 40 is kept in the unfolded state, as shown in FIG. 24.

Figure 25:
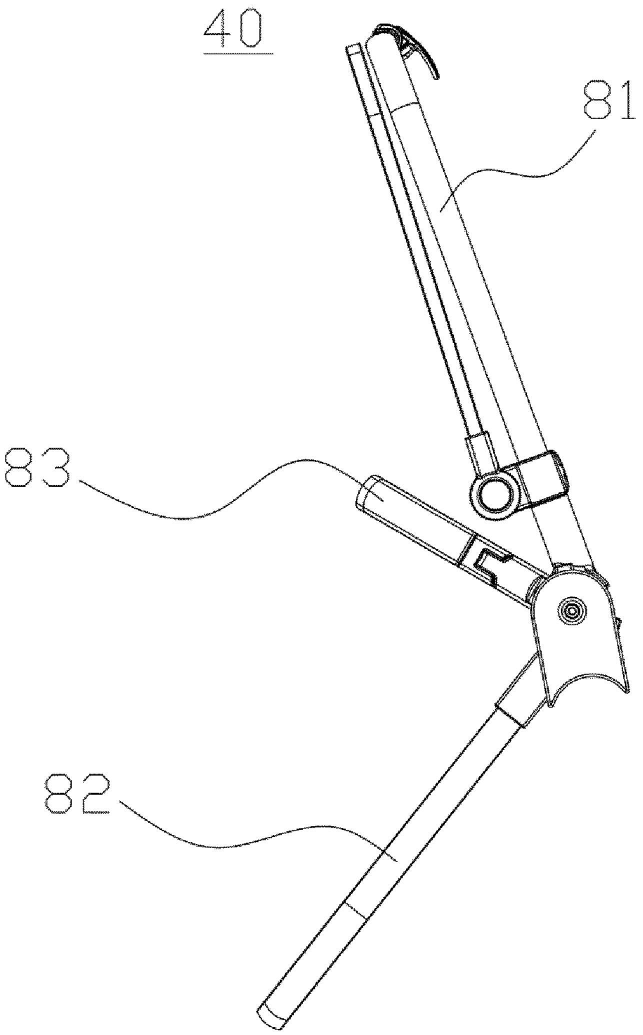
FIG. 25 is a schematic view of the seat shown in FIG. 17 in a folded state.
Figure 26:
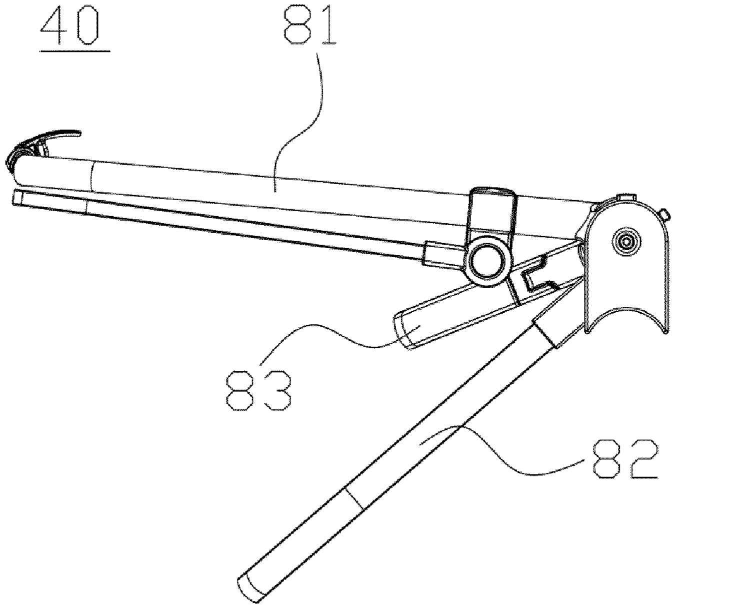
FIG. 26 is a schematic view of the seat shown in FIG. 17 in a further folded state.

In a case that the clamping member 812 is shifted to the unlock position, the protruding portion 8120 moves to a position in the clamping hole 823 and aligned with the first chute 822, and is capable of entering the first chute 822 for sliding, as shown in FIG. 21, so that the rotation of the first connecting member 810 and the second connecting member relative to each other is allowed. In this case, the seat 40 is switchable between the unfolded state and the folded state, as shown in FIG. 25 and FIG. 26.

In the present disclosure, the clamping member 812 may be arranged on the first connecting member 810 in various common manners. For example, a guide rail for guiding the clamping member 812 may be arranged on a side end face of the first connecting member 810. Alternatively, the clamping member 812 is provided with two long slotted holes passing therethrough, and the two long slotted holes guide the shifting of the clamping member 812. One of the long slotted holes may allow a connecting shaft 840 to pass through, and the other of the long slotted holes may allow a pin, which connects the clamping member 812 to the first connecting member 810, to pass through. Alternatively, the clamping member 812 is provided with only one long slotted hole that allows the connecting shaft 840 to pass through, and the first connecting member 810 is provided with the other long slotted hole to allow the pin, which connects the clamping member 812 to the first connecting member 810, to pass through.

In the present disclosure, the shifting of the clamping member 812 relative to the first connecting member 810 may be realized in various common manners. For example, the clamping member 812 has an operating lever (not shown) that is extended out of the armrest folding mechanism. The clamping member 812 is shifted by moving the operating lever. The armrest folding mechanism is further provided with a fourth elastic member 813. The fourth elastic member 813 drives the clamping member 812 to shift to the lock position. The fourth elastic member 813 may be a compression spring, a plate spring, an elastic body, or the like. It is to be understood that, although the fourth elastic member 813 is arranged at the first connecting member 810 in the preferred embodiment shown in FIG. 19, the fourth elastic member may also be arranged in other parts of the armrest folding mechanism. For example, in a case that the clamping member is arranged on the second connecting member 820, the fourth elastic member may be arranged at the second connecting member 820. More preferably, the armrest folding mechanism is further provided with a second unlocking member 814. The second unlocking member 814 is operable to drive the clamping member 812 to shift to the unlock position. In order to facilitate the folding of the seat, the second unlocking member 814 may be a steel wire. The steel wire has an end connected to the clamping member 812 and the other end connected to an operating portion 84 located on the upper framework 81. In this way, when the user operates the operating portion 84, the steel wire is pulled, so as to drive the clamping member 812 connected to an end of the steel wire to shift. Certainly, the present disclosure is not limited thereto.

How the armrest 83 of the seat 40 is synchronously folded and is kept at a use position by the armrest folding mechanism according to the present disclosure will be described in detail below.

In order to realize the function, the armrest 83 of the seat 40 is pivotable relative to the upper framework 81 and the lower framework 82 and is capable of being kept at a pivotal angle. That is, the third connecting member 830 is rotatable relative to the first connecting member 810 and the second connecting member 820, and is lockable with each other without rotation. To this end, as best observed from FIG. 22, a side end face of the third connecting member 830 facing the second connecting member 820 is also provided with a second chute 824 bending and extending around the central axis and a positioning hole 825 communicated with an end of the second chute 824. The protruding portion 8120 of the clamping member 812 is also capable of being inserted into the positioning hole 825 and being slid along the second chute 824. An extension radian of the second chute 824 may be equal to or less than the extension radian of the first chute 822, but preferably greater than an angle from the armrest 83 to the lower framework 82 in the unfolded state, so as to allow the armrest 83 connected to the third connecting member 830 and the lower framework 82 connected to the second connecting member 820 to be folded as much as possible relative to each other.

Figure 22:
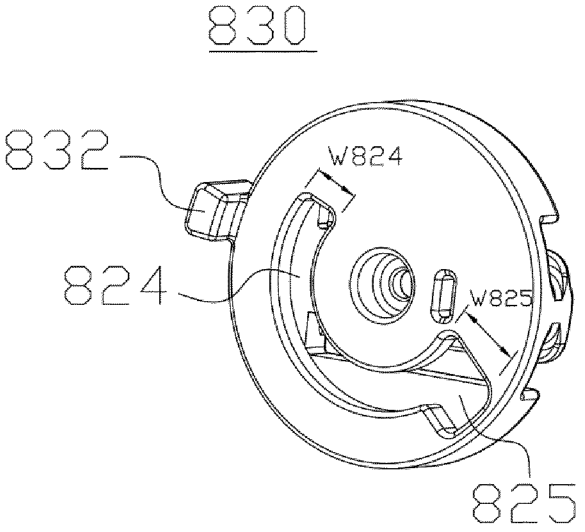
FIG. 22 is a perspective view of the third connecting member of the armrest folding mechanism according to an embodiment of the present disclosure.

Radial positions of the first chute 822 and the second chute 824 correspond to each other, and radial positions of the clamping hole 823 and the positioning hole 825 correspond to each other. Moreover, as shown in FIG. 22, a radial width W825 of the positioning hole 825 is greater than a radial width W824 of the second chute 824, and the radial width W825 of the positioning hole 825 is also configured to allow the clamping member 812 to be shifted radially between the lock position and the unlock position after the protruding portion 8120 is inserted into the positioning hole 825, so that the clamping member 812 is also capable of locking and unlocking the relative rotation among the third connecting member 830, the first connecting member 810, and the second connecting member 820.

Specifically, in a case that the clamping member 812 is shifted to the lock position, the protruding portion 8120 may move to a position in the positioning hole 825 and deviating from the second chute 824, and is not capable of entering the second chute 824, so that the relative rotation among the third connecting member 830, the first connecting member 810, and the second connecting member 820 is prevented. In this case, the armrest 83 connected to the third connecting member 830 is kept at the use position, as shown in FIG. 24.

In a case that the clamping member 812 is shifted to the unlock position, the protruding portion 8120 moves to a position in the positioning hole 825 and aligned with the second chute 824, and is capable of entering the second chute 824 for sliding, so that the relative rotation among the third connecting member 830, the first connecting member 810, and the second connecting member 820 is allowed. In this case, the armrest 83 connected to the third connecting member 830 is capable of being folded synchronously, as shown in FIG. 25 and FIG. 26.

Through the above setting, the armrest folding mechanism according to the present disclosure can realize that the armrest 83 is at the use position when the seat 40 is in the unfolded state, and the armrest 83 is folded synchronously when the seat 40 is in the folded state. Moreover, the structure of the armrest folding mechanism according to the present disclosure is simpler and easier to operate.

The armrest folding mechanism according to the present disclosure is described above based on an example in which the clamping member 812 is connected to the first connecting member 810, but the present disclosure is not limited thereto. In a variant embodiment, the clamping member may be connected to the second connecting member 820. In the variant embodiment, the structures of the first connecting member 810 and the second connecting member 820 are changed, while the structure of the third connecting member 830 remains the same.

Specifically, the clamping member may be connected to either side of the second connecting member 820, so that the clamping member is capable of being shifted between the lock position and the unlock position relative to the second connecting member 820, but is non-rotatable relative to the second connecting member 820. The clamping member includes a protruding portion protruding towards two sides of the second connecting member 820. Moreover, the second connecting member 820 is provided with a via hole for the protruding portion to pass through, so that the protruding portion of the clamping member is capable of being penetrated the first connecting member 810 and the third connecting member 830 regardless of which side of the second connecting member 820 is connected to the clamping member.

Correspondingly, the first connecting member 810 is provided with a first connecting member chute bending and extending around the central axis and a first connecting member clamping hole communicated with an end of the first connecting member chute.

Radial positions of the first connecting member chute of the first connecting member 810 and the second chute of the third connecting member 830 correspond to each other, radial positions of the first connecting member clamping hole of the first connecting member 810, the via hole of the second connecting member 820, and the positioning hole of the third connecting member 830 correspond to one another, and the protruding portion is capable of being penetrated the first connecting member clamping hole and the positioning hole, and is slidable along the first connecting member chute and the second chute.

Radial widths of the first connecting member clamping hole, the via hole, and the positioning hole are configured to be greater than radial widths of the first connecting member chute and the second chute, and to allow the clamping member to be shifted radially between a lock position and an unlock position, so that the clamping member is capable of allowing and preventing rotation of the first connecting member 810, the second connecting member 820, and the third connecting member 830 relative to one another.

Several special embodiments of the armrest folding mechanism according to the present disclosure will be described below. Such embodiments can facilitate more reliable and convenient use of the stroller.

Figure 27:
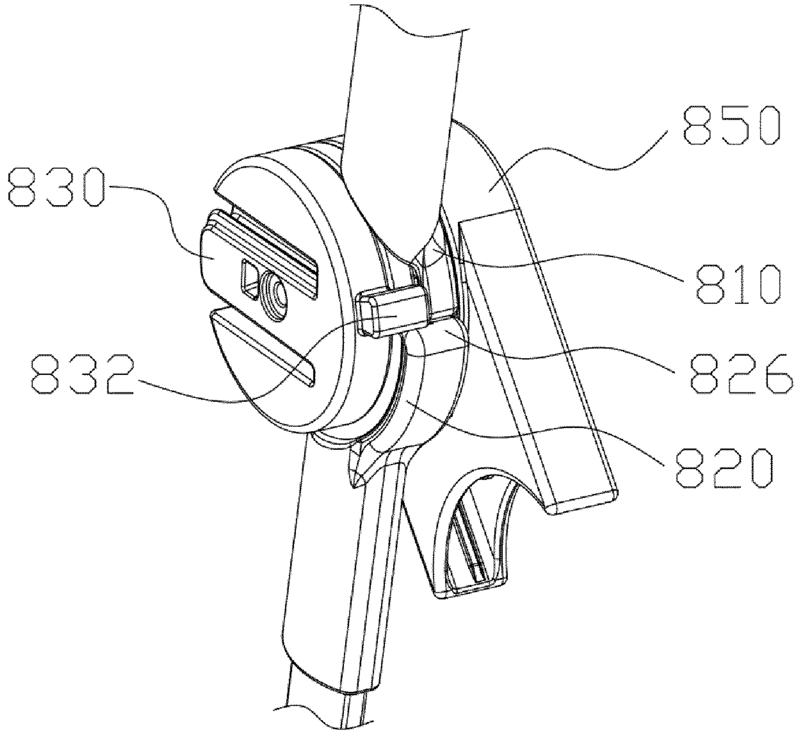
FIG. 27 is a perspective view of the armrest folding mechanism according to the present disclosure from another perspective, which illustrates that a reinforcing bulge is abutted against an abutment surface.

In an embodiment, in order to strengthen the positioning of the armrest 83 at the use position, as shown in FIG. 27, a reinforcing bulge 832 is arranged on a periphery of the third connecting member 830, and an abutment surface 826 is arranged at a corresponding position of a periphery of the second connecting member 820. When the armrest 83 is used as a handle and is pulled upwards, the reinforcing bulge 832 is abutted against the abutment surface 826 to restrict rotation of the third connecting member 830 relative to the second connecting member 820, so as to strengthen the positioning of the armrest 83.

In another embodiment, in a case that the seat 40 and the frame 10 are separable, the armrest folding mechanism may also be provided with an adapter 850 for easy arrangement of the seat 40 on the frame 10 and for easy removal of the seat 40 from the frame 10. The adapter 850 is fixed to the first connecting member 810 and is capable of being engaged with the fixed seat 18 arranged on the frame 10, as shown in FIG. 28 and FIG. 29, so as to enable the seat to be detachably arranged on the frame.

Further, in order to prevent a risk of separation of the seat 40 from the frame 10 caused by accidental detachment of the adapter 850 from the fixed seat 18, the adapter 850 may be provided with a locking member 526, for example, a hook 5262, and the fixed seat 18 may be provided with a clamping structure fitting with the locking member 526, for example, a clamping bulge 181. Alternatively, an inverse configuration is also possible, that is, the adapter 850 may be provided with the clamping bulge 181, and the fixed seat 18 may be provided with the hook 5262. The hook 5262 is capable of being engaged with or disengaged from the clamping bulge 181 to prevent the adapter 850 from being detached from the fixed seat 18 or allow the adapter 850 to be detached from the fixed seat 18.

Figure 28:
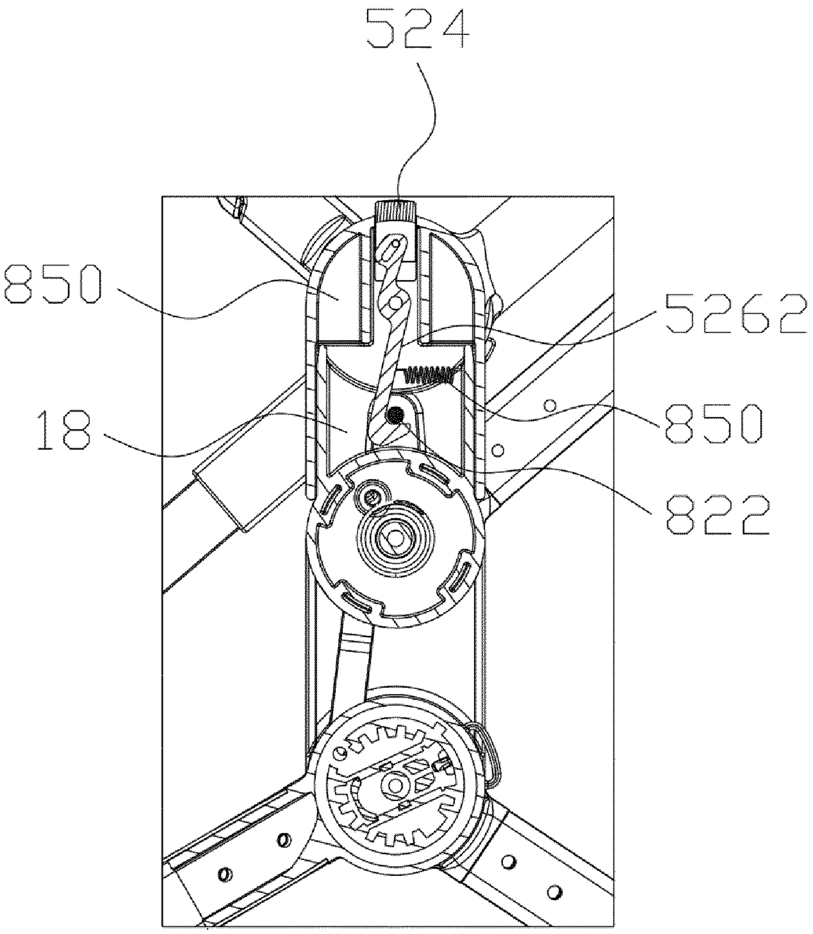
FIG. 28 is a sectional view taken along a line "I-I" in FIG. 1, which illustrates a hook is engaged with a clamping bulge.
Figure 29:
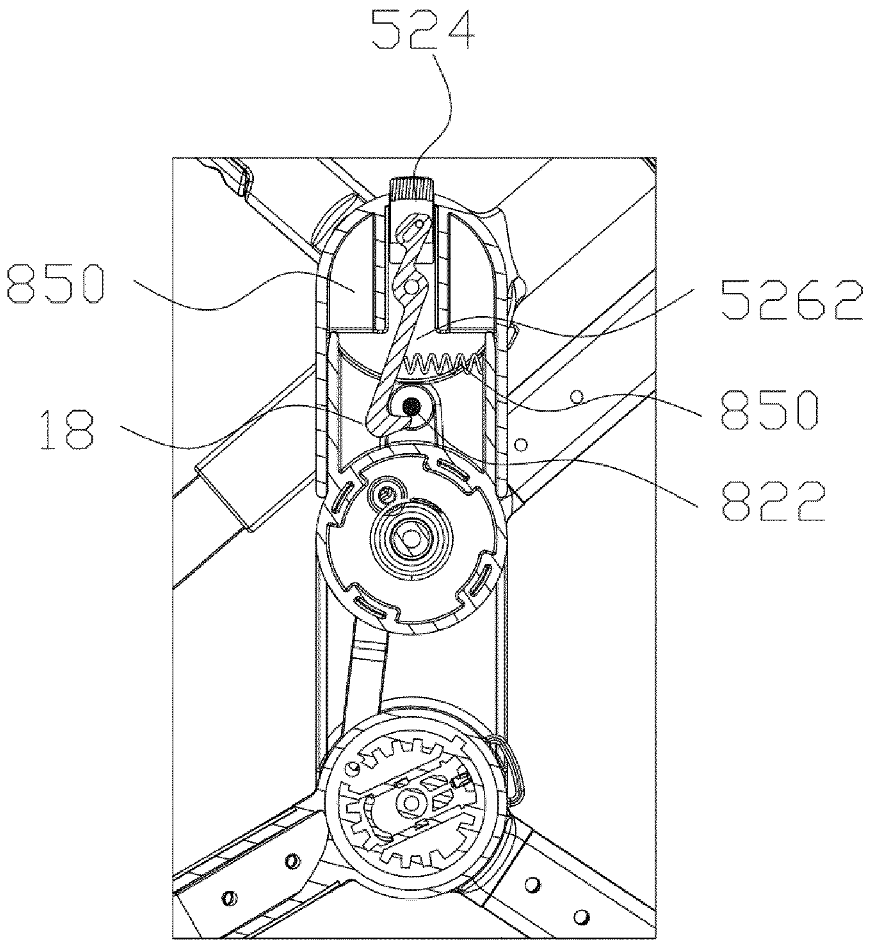
FIG. 29 is a sectional view taken along the line "I-I" in FIG. 1, which illustrates the hook is disengaged from the clamping bulge.

In the embodiment shown in FIG. 28 and FIG. 29, the hook 5262 is pivotable, so as to be engaged with or disengaged from the clamping bulge 181. However, the present disclosure is not limited thereto. Alternatively, the hook 5262 is shiftable from left and right, or the clamping bulge 181 is movable, to realize engagement or disengagement therebetween.

For easier operation, the adapter 850 may be further provided with a fifth elastic member 851. The fifth elastic member 851 drives the hook 5262 to be engaged with the clamping bulge 181. The fifth elastic member 851 may be an extension spring, a plate spring, an elastic body, or the like.

In a more preferred embodiment, the adapter 850 is further provided with a first unlocking member 524. The first unlocking member 524 is, for example, a button. The first unlocking member 524 is capable of being pressed to drive the hook 5262 to be disengaged from the clamping bulge 181. Certainly, the present disclosure is not limited thereto. The adapter 850 may be further provided with other operating components, provided that the hook 5262 can be driven to be disengaged from the clamping bulge 181.

Figure 30:
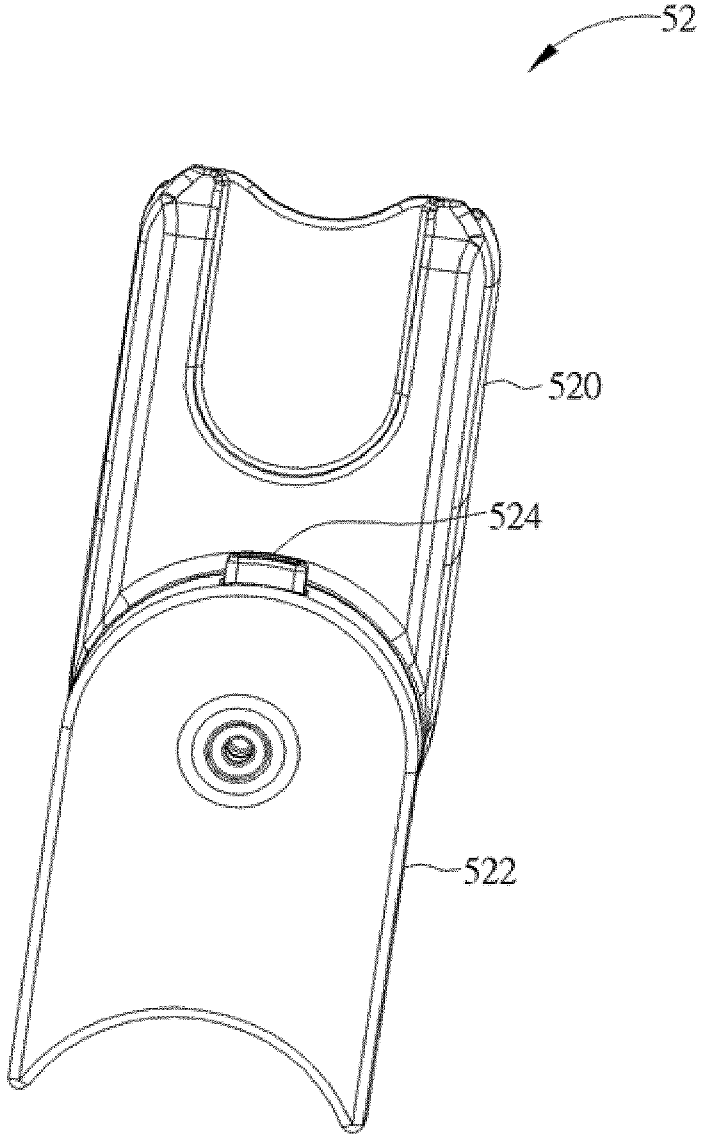
FIG. 30 is a perspective view of an adapter according to another embodiment of the present disclosure.
Figure 31:
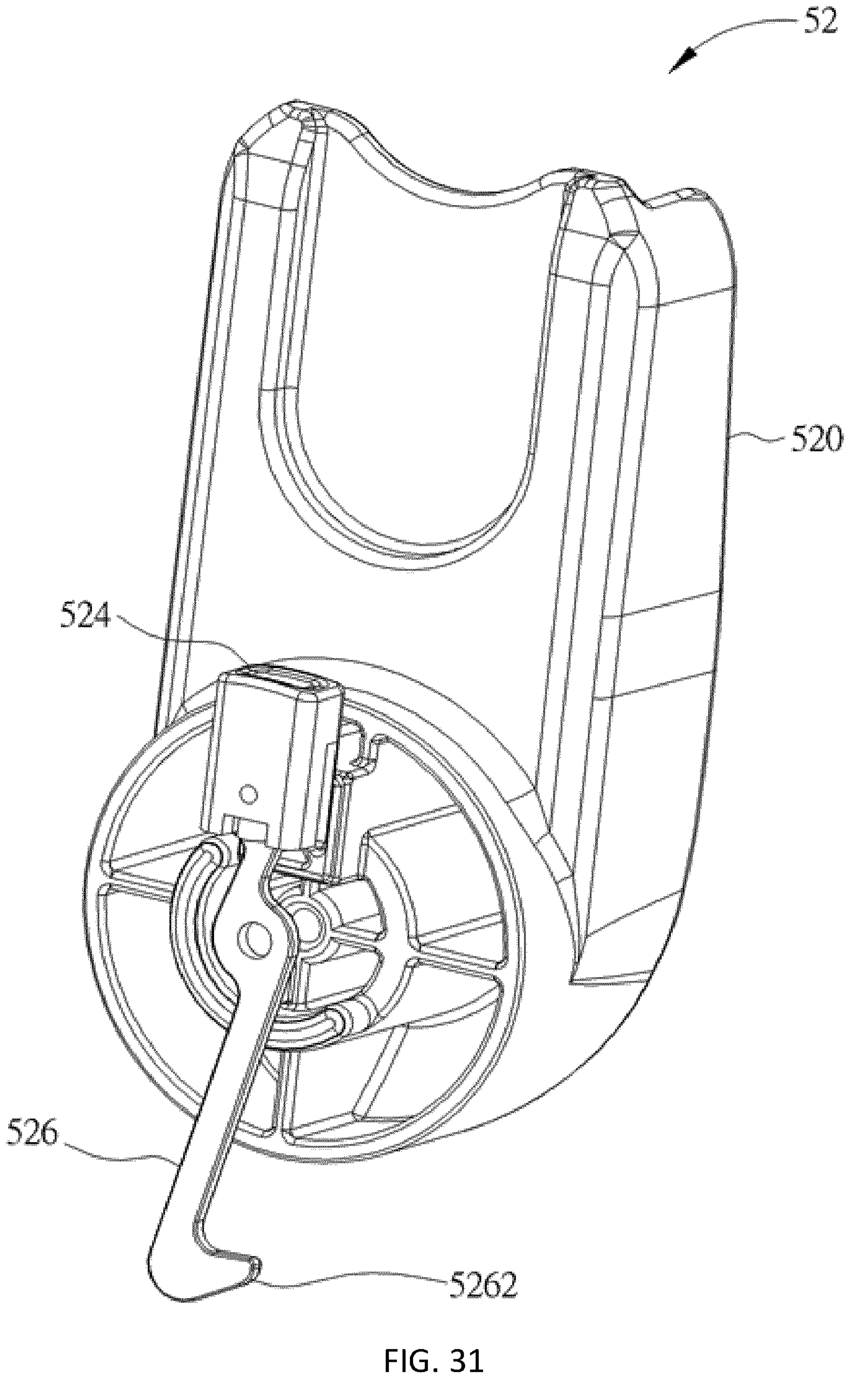
FIG. 31 is a perspective view of the adapter in FIG. 30 with a second seat body removed.
Figure 32:
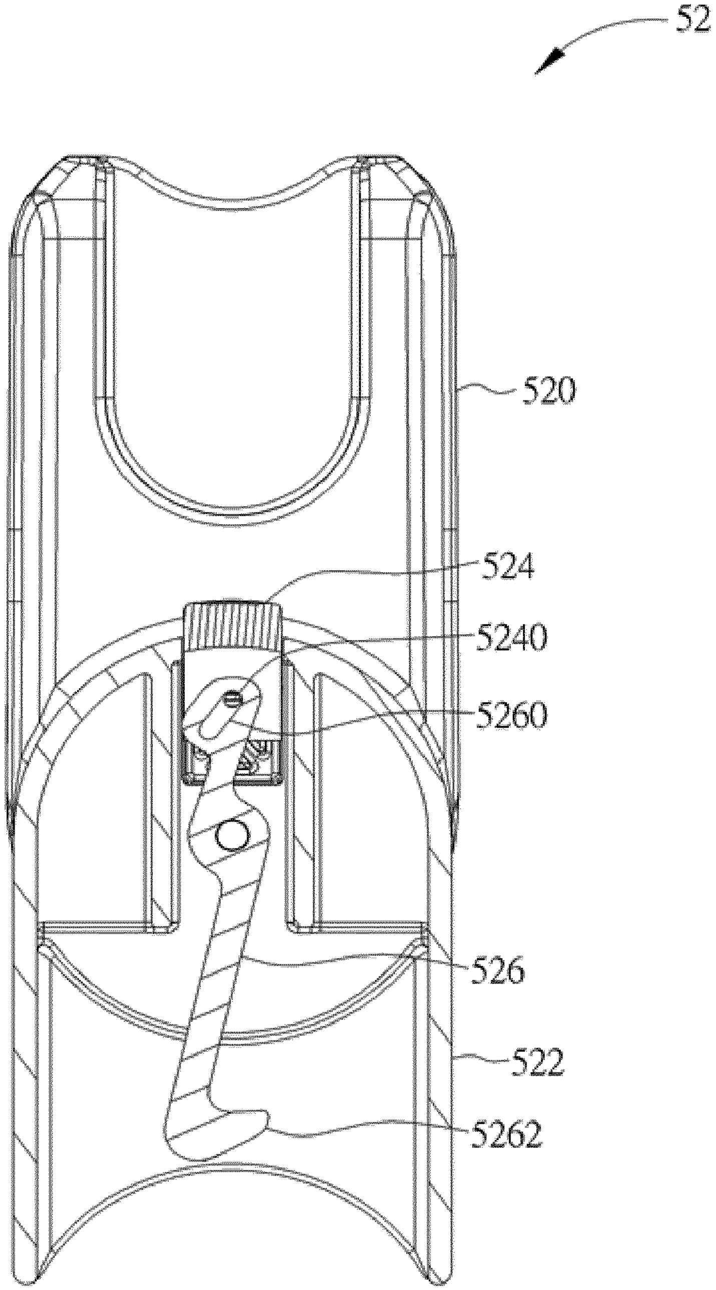
FIG. 32 is a partial sectional view of the adapter in FIG. 30.

In another embodiment according to the present disclosure, as shown in FIG. 30 to FIG. 32, an adapter 850 includes a first seat body 520, a second seat body 522, a first unlocking member 524, and a locking member 526. The first seat body 520 is connected to the second seat body 522. The first seat body 520 is configured to connect a vehicle. The vehicle may be a safety seat, a carrycot or other infant vehicles, depending on actual disclosures. The user may arrange the second seat body 522 of the adapter 850 on the fixed seat 18 and then connect the vehicle to the first seat body 520. In this way, the vehicle may be arranged on the frame 10 of the passenger device 1 through the adapter 850.

As shown in FIG. 30 to FIG. 32, the locking member 526 is rotatably arranged in the second seat body 522, and the first unlocking member 524 is movably arranged on the second seat body 522. The first unlocking member 524 has a guide portion 5240, and the locking member 526 has a skewed slot 5260 and a hook 5262. The guide portion 5240 of the first unlocking member 524 is arranged in the skewed slot 5260 of the locking member 526. When the second seat body 522 of the adapter 850 is arranged on the fixed seat 18 shown in FIG. 2, the hook 5262 of the locking member 526 are engaged with the clamping structure (e.g., the clamping bulge 181) in the fixed seat 18. When the user is intended to remove the adapter 850, the user may press the first unlocking member 524. When the first unlocking member 524 is pressed, the guide portion 5240 of the first unlocking member 524 may push the skewed slot 5260 of the locking member 526, so as to drive the locking member 526 to be rotated, so that the hook 5262 of the locking member 526 is disengaged from the clamping structure of the fixed seat 18. In this way, the user can easily remove the adapter 850.

As shown in FIG. 33 to FIG. 35, and FIG. 50, an embodiment of the present disclosure proposes a passenger device, including a first travel assembly 300, a second travel assembly 400, a handlebar 14, an orientation adjustment mechanism 600, and a drift driving mechanism 700. The passenger device can realize the function of adjusting orientation of wheels while reversing the handlebar with a simple structure, so as to reduce the manufacturing costs of the passenger device.

Figure 33:
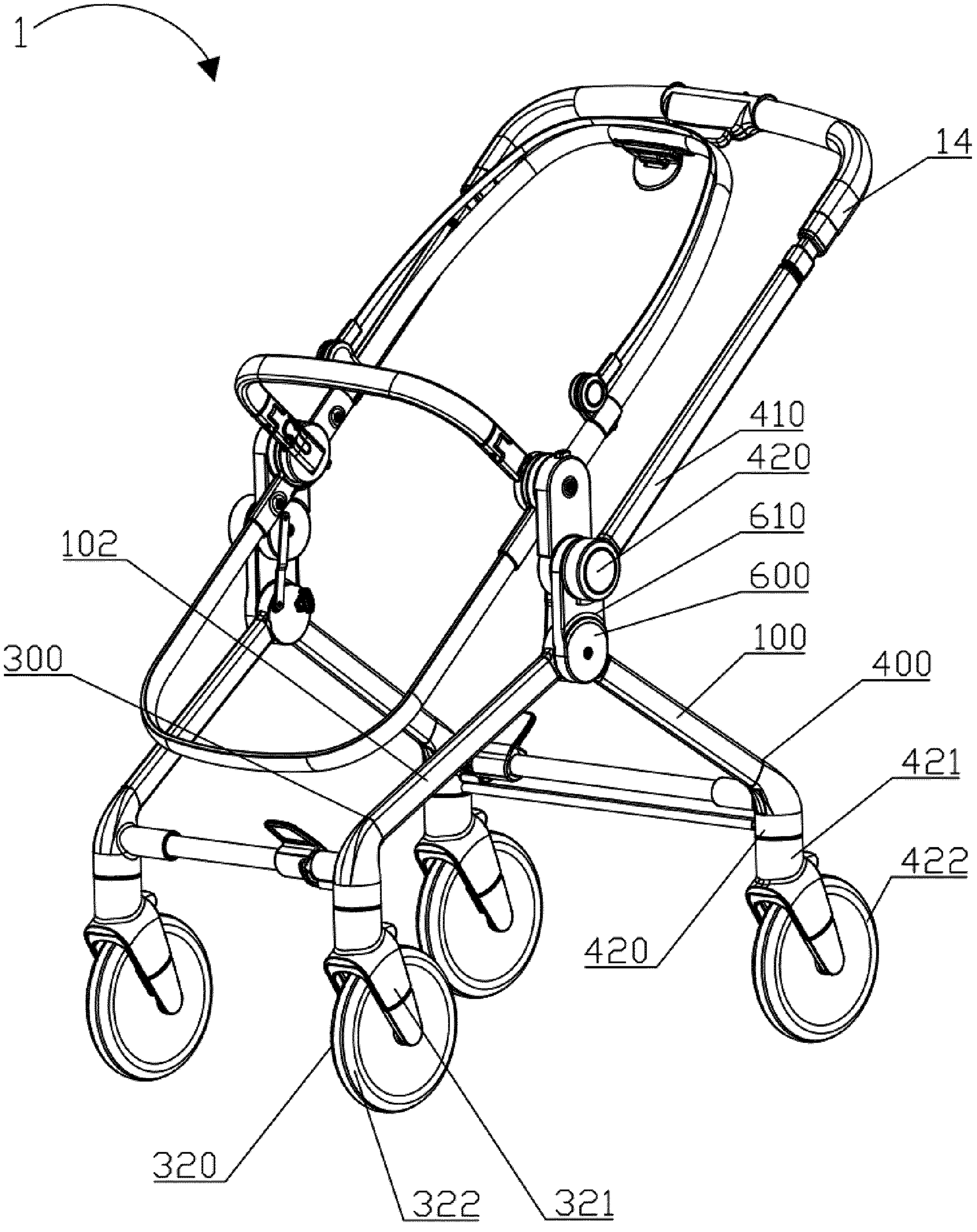
FIG. 33 is a schematic structural view of the passenger device according to an embodiment of the present disclosure.
Figure 44:
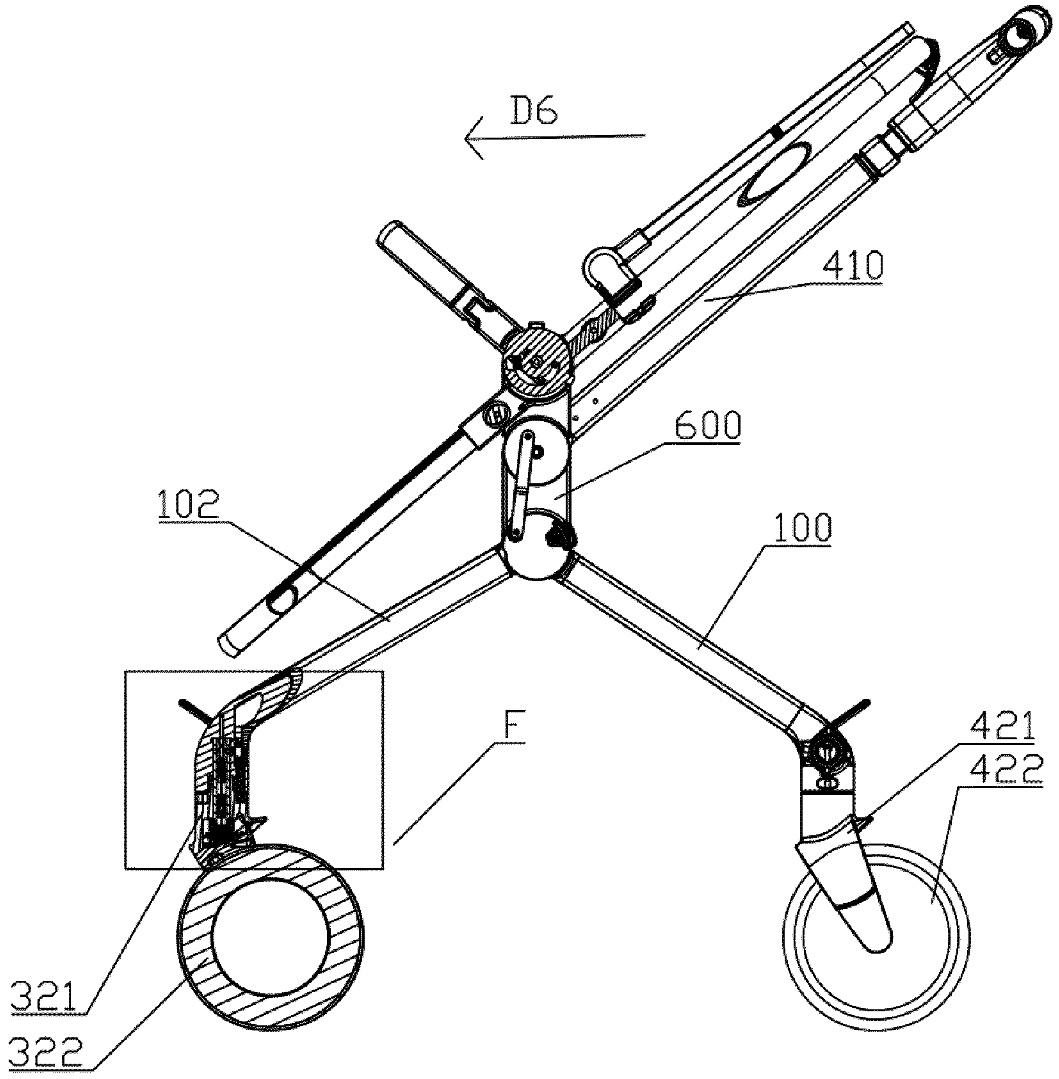
FIG. 44 is yet another partial sectional view of the passenger device shown in FIG. 33 according to an embodiment of the present disclosure, in which case the handlebar is on a same side as the second travel assembly.
Figure 45:
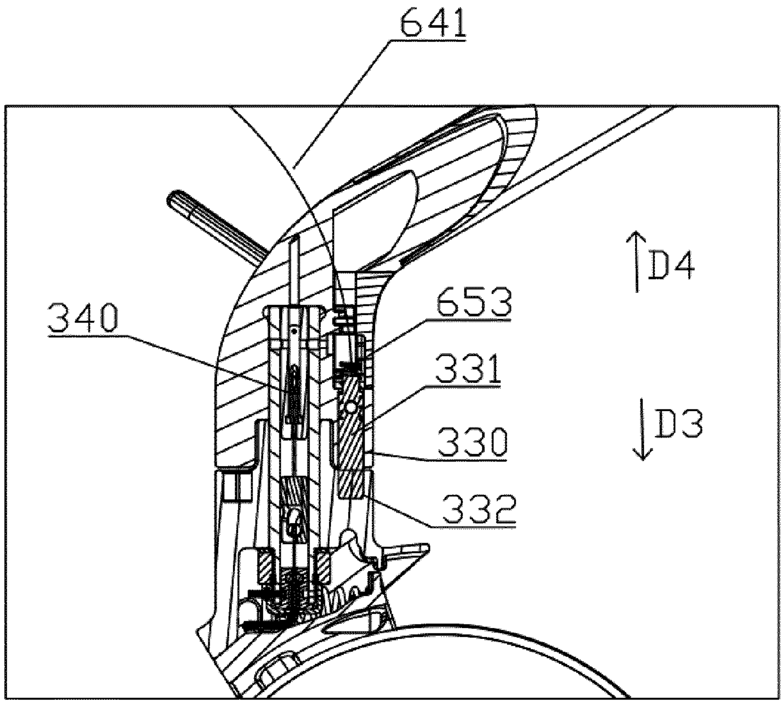
FIG. 45 is an enlarged view of an area F in FIG. 44.

Specifically, as shown in FIG. 33, FIG. 44, and FIG. 45, the first travel assembly 300 includes a second support member 102, a first wheel member 320, a first orientation mechanism 330, and a first rotating shaft 340.

As shown in FIG. 33, FIG. 44, and FIG. 45, the second support member 102 is pivotally connected to the first wheel member 320. Specifically, an end of the first rotating shaft 340 is fixed to the second support member 102, and the first wheel member 320 is pivotally connected to the other end of the first rotating shaft 340. Certainly, in other embodiments, the end of the first rotating shaft 340 may be fixed to the first wheel member 320, and the second support member 102 is pivotally connected to the other end of the first rotating shaft 340, which are not limited. The first wheel member 320 includes a first wheel mount 321 and a first wheel body 322. The first wheel mount 321 is pivotally connected to the second support member 102. The first wheel body 322 is rotatably mounted in the first wheel mount 321.

As shown in FIG. 33, FIG. 44, and FIG. 45, the first orientation mechanism 330 includes a first orientation pin 331 movably arranged on the second support member 102 and a first orientation groove 332 arranged on the first wheel mount 321. The first orientation pin 331 is inserted into the first orientation groove 332 to lock the first orientation mechanism 330. In this case, the first wheel member 320 is kept in a certain direction relative to the second support member 102. The first orientation pin 331 is detached from the first orientation groove 332 to unlock the first orientation mechanism 330. In this case, the first wheel member 320 is rotatable by 360 degrees relative to the second support member 102. Certainly, the first orientation mechanism 330 may also be in other forms, as long as it can be locked to orient the first wheel member 320 and can be unlocked to disorient the first wheel member 320.

Figure 42:
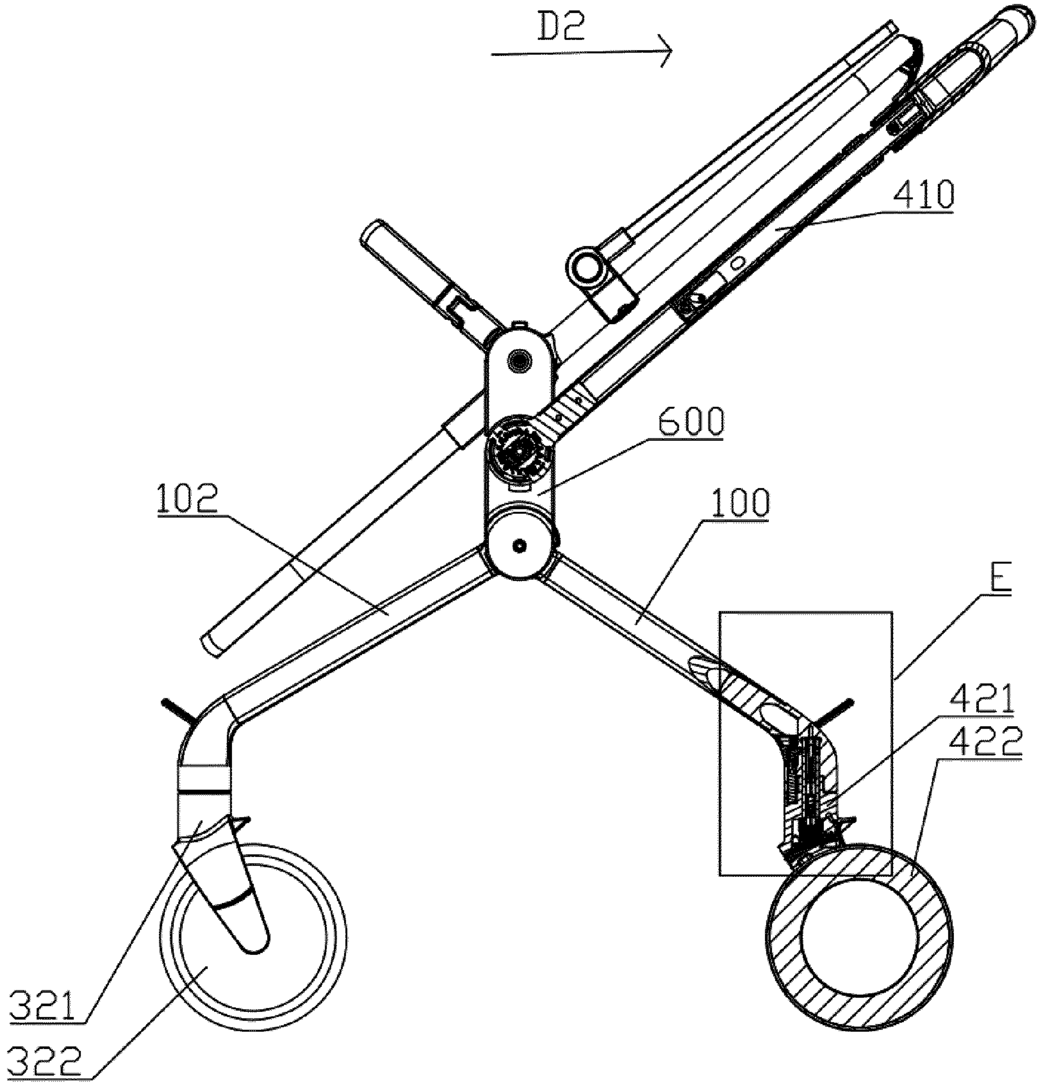
FIG. 42 is another partial sectional view of the passenger device shown in FIG. 33 according to an embodiment of the present disclosure, in which case the handlebar is on a same side as the second travel assembly.
Figure 43:
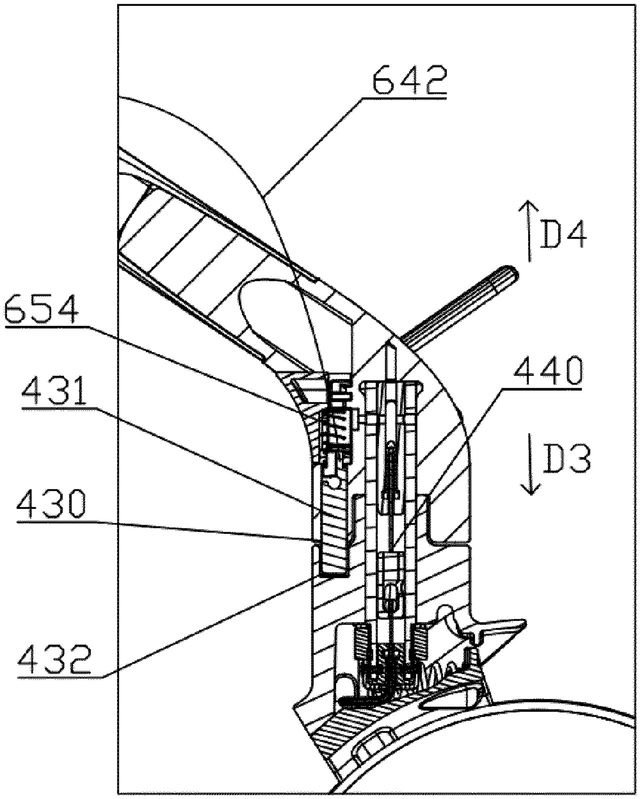
FIG. 43 is an enlarged view of an area E in FIG. 42.

Specifically, as shown in FIG. 33, FIG. 42, and FIG. 43, the second travel assembly 400 includes a first support member 100, a second wheel member 419, a second orientation mechanism 430, and a second rotating shaft 440.

As shown in FIG. 33, FIG. 42, and FIG. 43, the first support member 100 is pivotally connected to the second wheel member 419. Specifically, an end of the second rotating shaft 440 is fixed to the first support member 100, and the second wheel member 419 is pivotally connected to the other end of the second rotating shaft 440. Certainly, in other embodiments, the end of the second rotating shaft 440 may be fixed to the second wheel member 419, and the first support member 100 is pivotally connected to the other end of the second rotating shaft 440. The second wheel member 419 includes a second wheel mount 421 and a second wheel body 422. The second wheel mount 421 is pivotally connected to the first support member 100. The second wheel body 422 is rotatably mounted in the second wheel mount 421.

As shown in FIG. 33, FIG. 42, and FIG. 43, the second orientation mechanism 430 includes a second orientation pin 431 movably arranged on the first support member 100 and a second orientation groove 432 arranged on the second wheel mount 421. The second orientation pin 431 is inserted into the second orientation groove 432 to lock the second orientation mechanism 430. In this case, the second wheel member 419 is kept in a certain direction relative to the first support member 100. The second orientation pin 431 is detached from the second orientation groove 432 to unlock the second orientation mechanism 430. In this case, the second wheel member 419 is rotatable by 360 degrees relative to the first support member 100. Certainly, the second orientation mechanism 430 may also be in other forms, as long as it can be locked to orient the second wheel member 419 and can be unlocked to disorient the second wheel member 419.

In this embodiment, as shown in FIG. 33, an end of the second support member 102 away from the first wheel member 320 is pivotally connected to an end of the first support member 100 away from the second wheel member 419.

Specifically, as shown in FIG. 33 to FIG. 37, the handlebar 14 includes a handlebar body 410 and a handlebar mount 420 that are connected to each other. The handlebar body 410 is roughly rod-shaped, and the handlebar mount 420 is roughly disc-shaped. The handlebar 14 is rotatable relative to the first travel assembly 300 or the second travel assembly 400 to change a travel direction of the passenger device. For example, when the handlebar 14 is rotated to a same side as the first travel assembly 300, the passenger device moves along a second direction D2 in FIG. 38. When the handlebar 14 rotates to a same side as the second travel assembly 400, the passenger device moves along a sixth direction D6 in FIG. 40.

Figure 38:
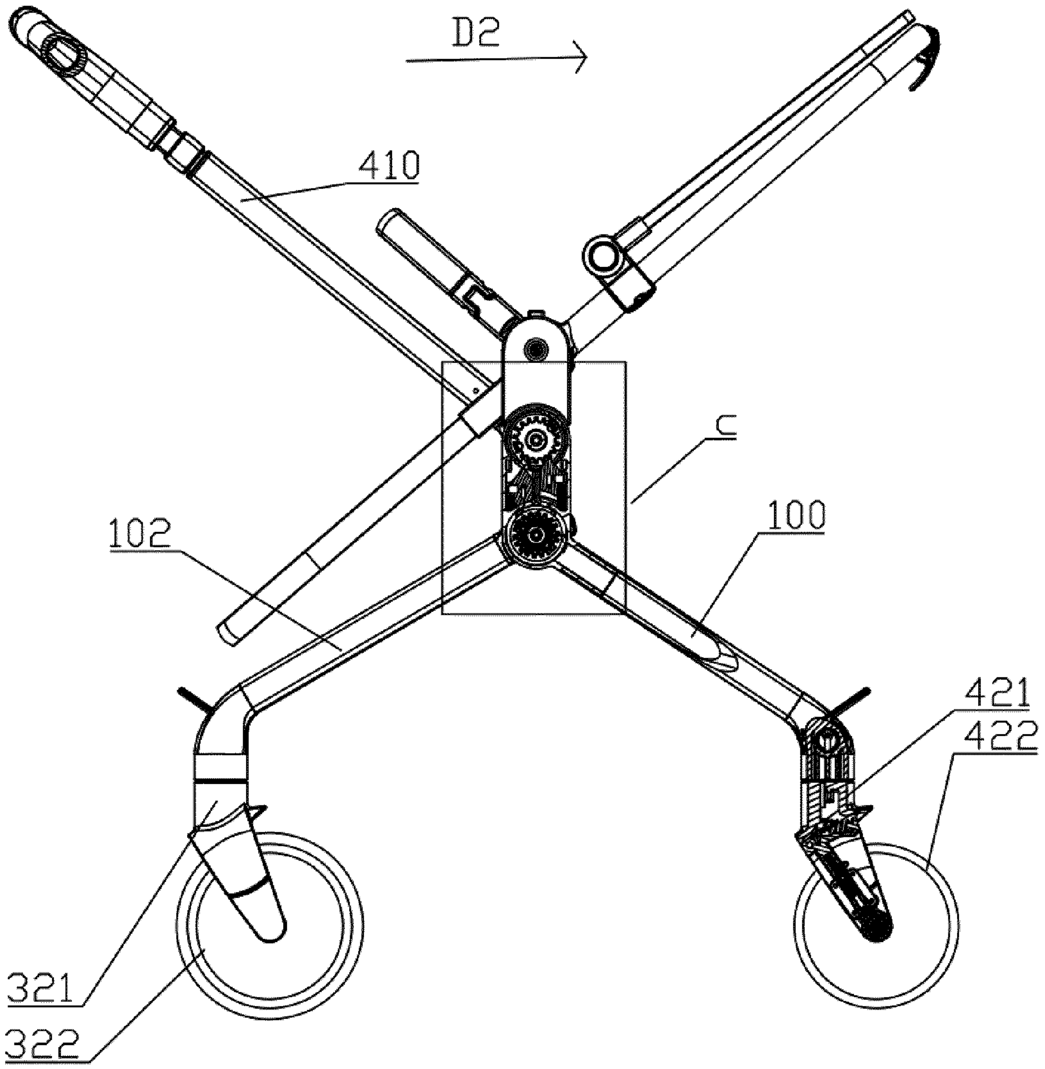
FIG. 38 is a partial sectional view of the passenger device shown in FIG. 33 according to an embodiment of the present disclosure, in which case the handlebar is on a same side as a first travel assembly.
Figure 39:
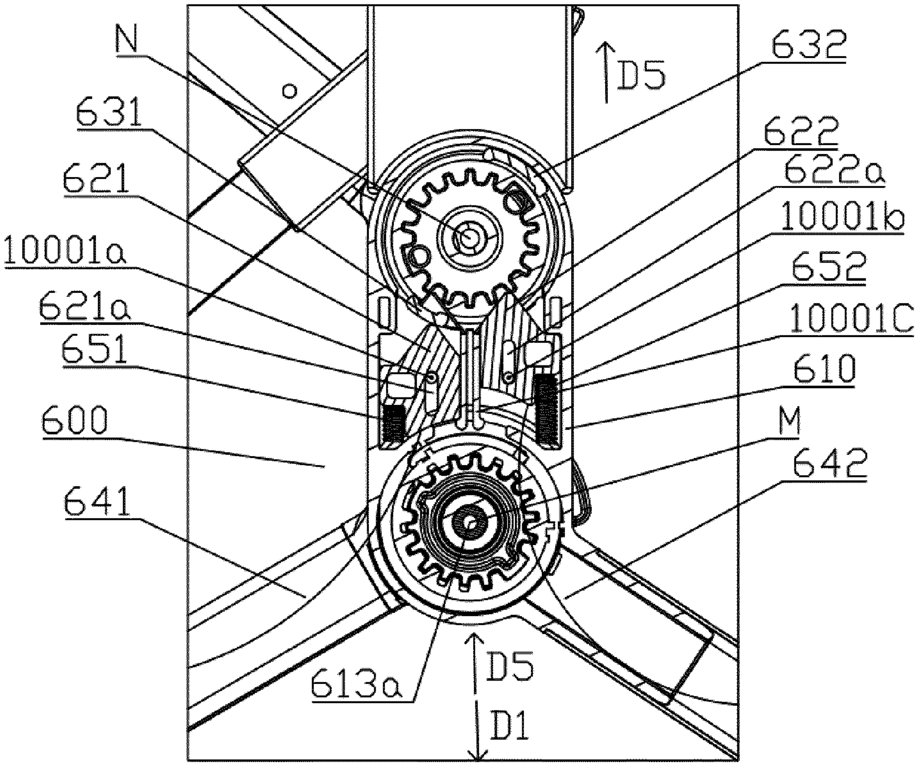
FIG. 39 is an enlarged view of an area C in FIG. 38.
Figure 40:
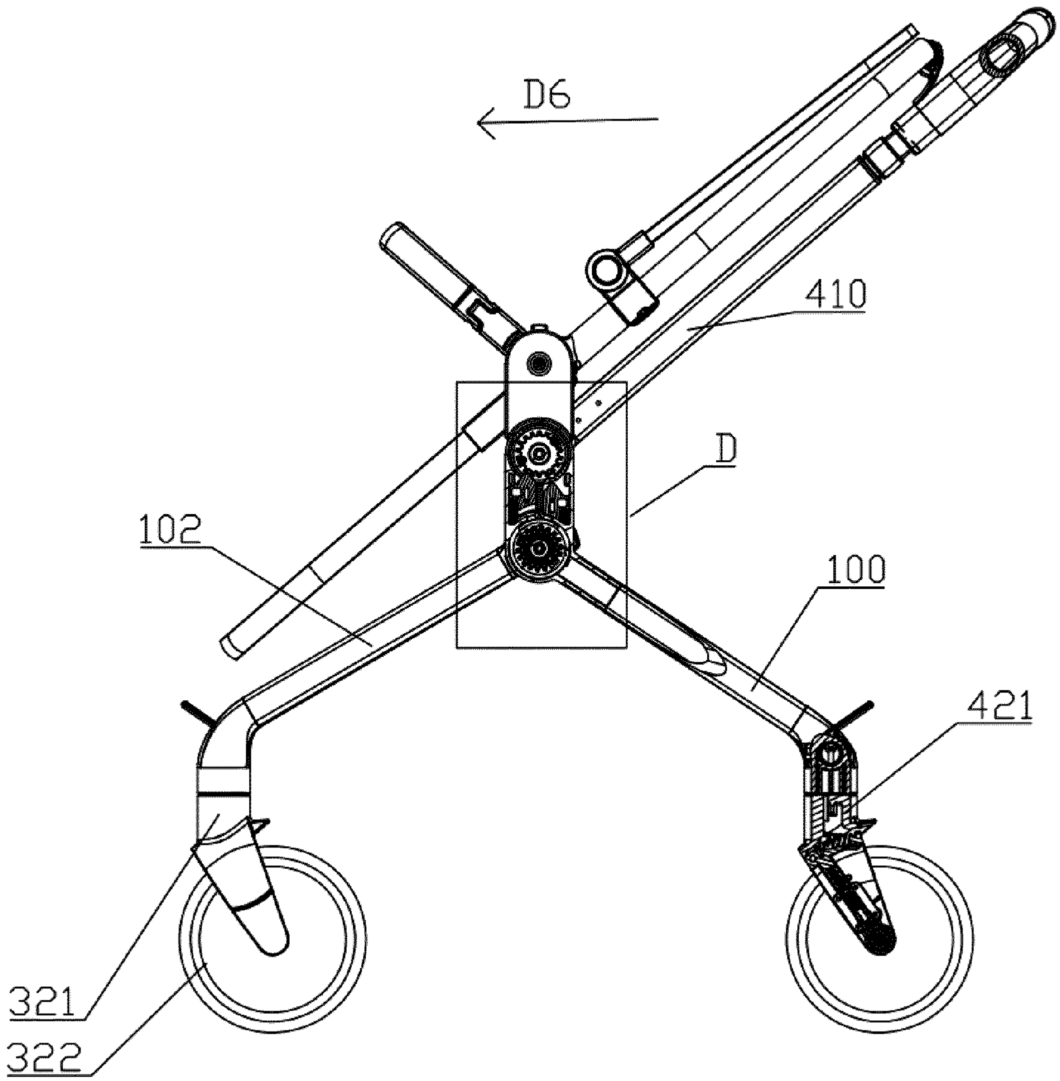
FIG. 40 is a partial sectional view of the passenger device shown in FIG. 33 according to an embodiment of the present disclosure, in which case the handlebar is on a same side as a second travel assembly.
Figure 41:
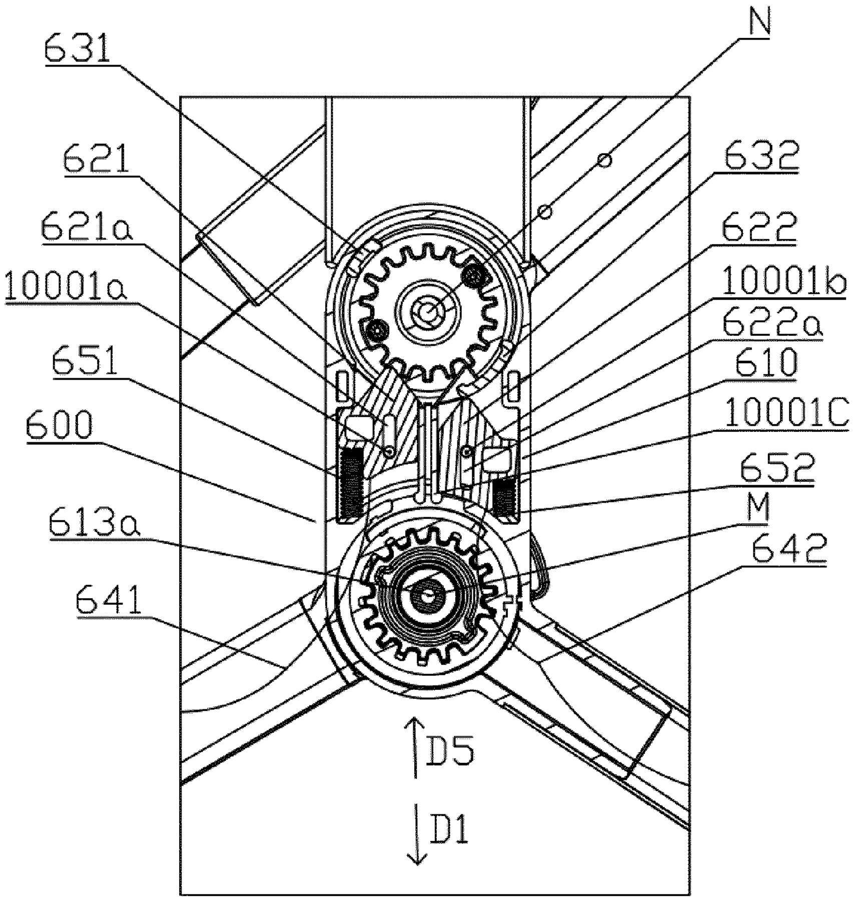
FIG. 41 is an enlarged view of an area D in FIG. 40.

Specifically, as shown in FIG. 33 to FIG. 45, the orientation adjustment mechanism 600 is arranged among the first travel assembly 300, the second travel assembly 400, and the handlebar 14. As shown in FIG. 38 and FIG. 39, the handlebar 14 is rotated to the same side as the first travel assembly 300, and the orientation adjustment mechanism 600 drives the first wheel member 320 to be oriented and the second wheel member 419 to be disoriented. As shown in FIG. 40 and FIG. 41, the handlebar 14 is rotated to the same side as the second travel assembly 400, and the orientation adjustment mechanism 600 drives the second wheel member 419 to be oriented and the first wheel member 320 to be disoriented.

In this embodiment, as shown in FIG. 38 to FIG. 45, the orientation adjustment mechanism 600 may include a fixed shell 610, a first driving block 621, a second driving block 622, a first driving rib 631, a second driving rib 632, a first traction member 641, a second traction member 642, a first reset member 651, a second reset member 652, a third reset member 653, and a fourth reset member 654.

Figure 34:
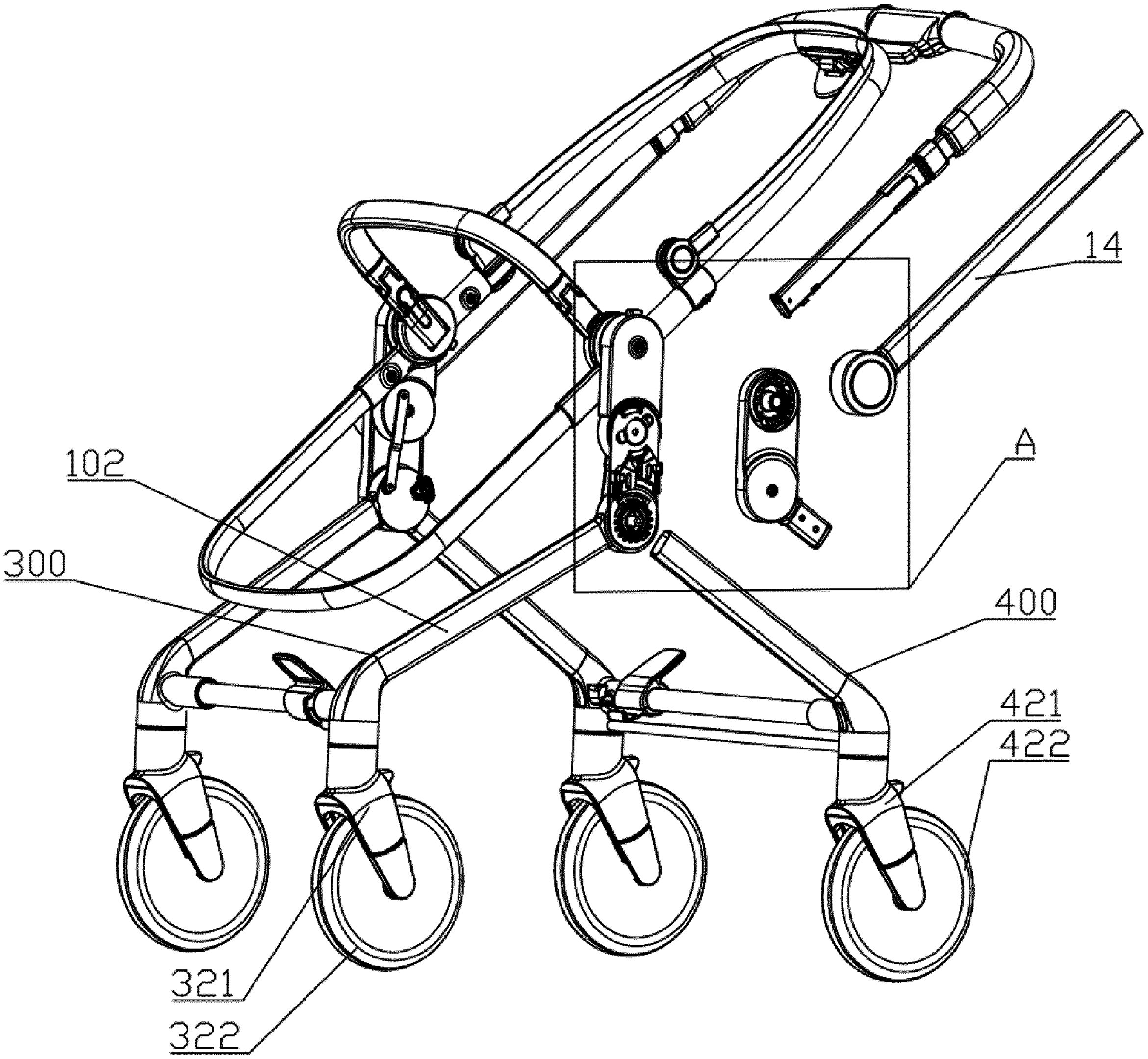
FIG. 34 is an exploded view of FIG. 33.
Figure 35:
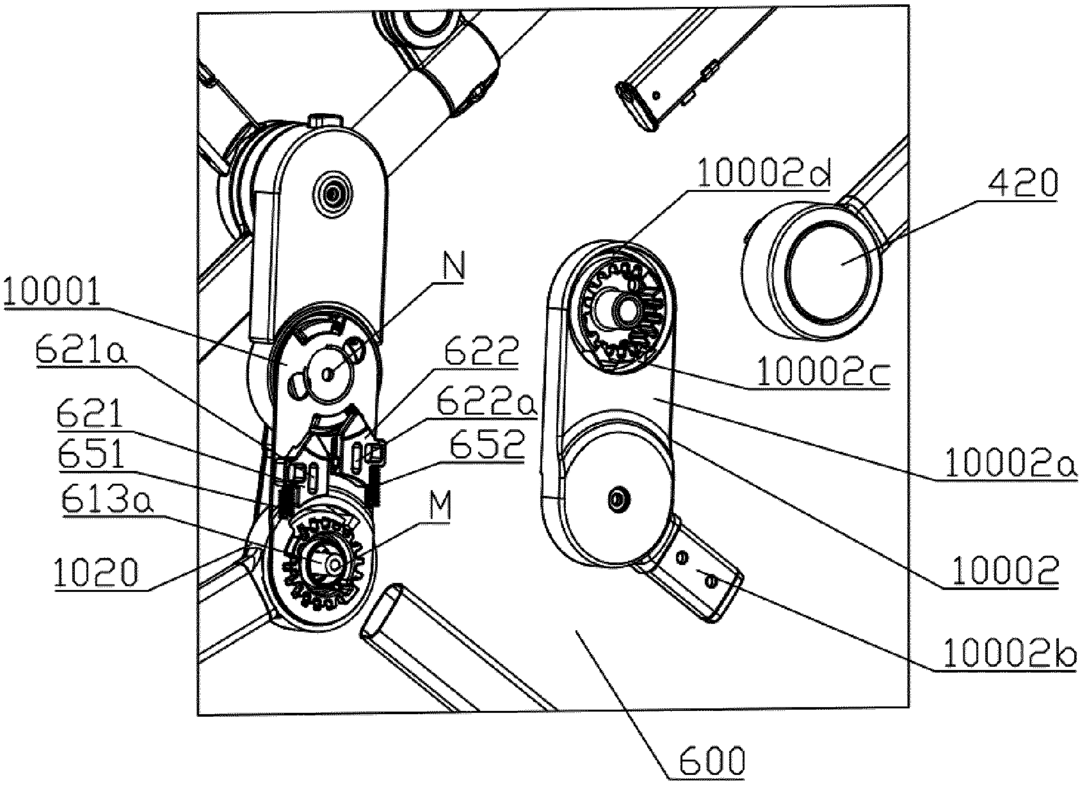
FIG. 35 is an enlarged view of an area A in FIG. 34.
Figure 36:
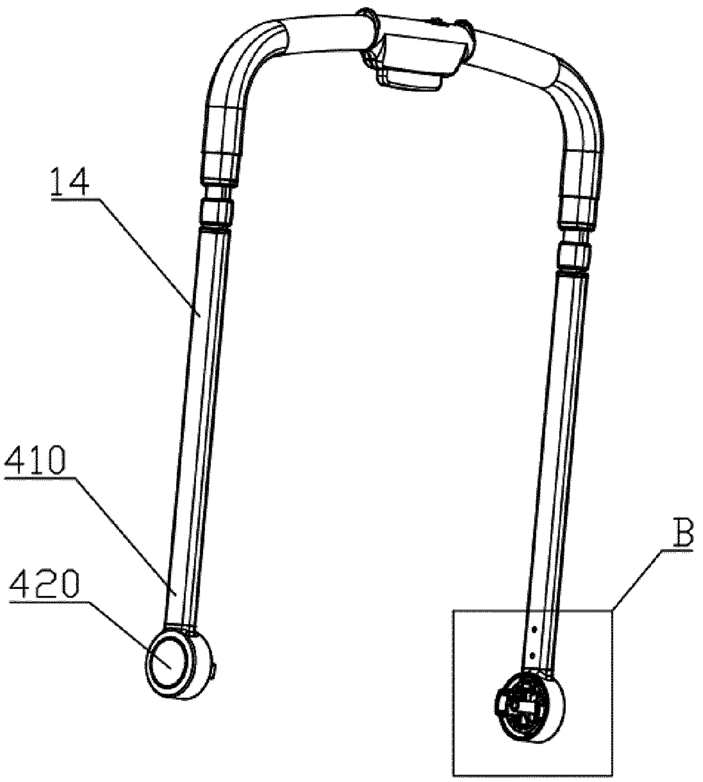
FIG. 36 is a schematic structural view of the handlebar in the passenger device shown in FIG. 33.
Figure 37:
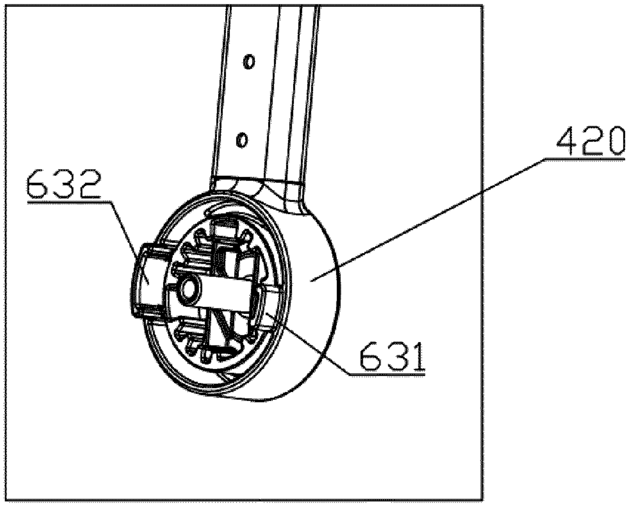
FIG. 37 is an enlarged view of an area B in FIG. 36.

Specifically, as shown in FIG. 33 to FIG. 35, the fixed shell 610 includes a first connecting seat base 10001, a first connecting seat housing 10002, and a second connecting seat 1020. The first connecting seat base 10001 is pivotally connected to the first travel assembly 300, the first connecting seat housing 10002 is fixed to the second travel assembly 400, and the first connecting seat base 10001 and the first connecting seat housing 10002 enclose the first connecting seat 1000 with an accommodating space. The first connecting seat base 10001 has a roughly elliptic sheet structure. The first connecting seat housing 10002 includes a housing body **10002*a* and a housing connecting member 10002*b* that are connected to each other. The housing body 10002*a* has an elliptic structure matching the first connecting seat base 10001. The housing connecting member 10002*b* is roughly bush-shaped in order to sleeve the end of the first support member 100 away from the second wheel member 419. The second connecting seat 1020 is fixed to the end of the second support member 102 away from the first wheel member 320. The second connecting seat 1020 is provided with a pivotal shaft 613*a*. The pivotal shaft 613*a* sequentially passes through the first connecting seat base 10001 and the housing body 10002*a* to realize coaxially pivotal connection of the three. Referring to FIG. 39 together, the second connecting seat 1020, the first connecting seat base 10001, and the housing body 10002*a* are pivotally connected to a first pivot point M. The handlebar 14 is pivotally connected to a side of the first connecting seat housing 10002 facing away from the first connecting seat base 10001. The handlebar 14 and the first connecting seat housing 10002 are pivotally connected to a second pivot point N. The first connecting seat housing 10002 is provided with a first guide pillar 10001*a* and a second guide pillar 10001*b*. Certainly, in other embodiments, the first guide pillar 10001*a* and the second guide pillar 10001*b* may also be arranged on the first connecting seat base 10001. In this embodiment, the first pivot point M is located in a first direction D1 of the second pivot point N. The first guide pillar 10001*a* and the second guide pillar 10001*b*** are located between the first pivot point M and the second pivot point N.

In this embodiment, the second connecting seat 1020 is made of a plastic material. Certainly, in other embodiments, the second connecting seat 1020 may also be made of other materials.

Further, as shown in FIG. 38 to FIG. 41, the first driving block 621 and the second driving block 622 are movably arranged in the fixed shell 610, that is, located in the accommodating space. Specifically, the first driving block 621 is provided with an elongated first guide groove **621*a*, the first guide pillar 10001*a* is inserted into the first guide groove 621*a*, and the first guide groove 621*a* is coordinated with the first guide pillar 10001*a* to enable the first driving block 621 to reciprocate along an extension direction of the first guide groove 621*a*, i.e., the first direction D1 and a fifth direction D5. The second driving block 622 is provided with an elongated second guide groove 622*a*, the second guide pillar 10001*b* is inserted into the second guide groove 622*a*, and the second guide groove 622*a* is coordinated with the second guide pillar 10001*b* to enable the second driving block 622 to reciprocate along an extension direction of the second guide groove 622*a*, i.e., the first direction D1 and the fifth direction D5. Certainly, the first driving block 621 and the second driving block 622 may also be movably arranged in the fixed shell 610** in other manners. The first direction D1 is opposite to the fifth direction D5.

Specifically, as shown in FIG. 35, the first connecting seat housing 10002 is provided with a penetration hole **10002*c* communicated with the accommodating space, the first driving block 621 is movable along the fifth direction D5 to expose from the penetration hole 10002*c*, and the second driving block 622 is movable along the fifth direction D5 to expose from the penetration hole 10002*c*. In this embodiment, two penetration holes 10002*c* are provided, which may allow the first driving block 621 and the second driving block 622 to insert therein respectively. The orientation adjustment mechanism 600** further includes a separator 10001*c*. The separator 10001*c* is located between the first driving block 621 and the second driving block 622 to separate the first driving block 621 from the second driving block 622. In other embodiments, only one penetration hole 10002*c* may also be provided, provided that it can allow the first driving block 621 and the second driving block 622 to insert therein.

Further, as shown in FIG. 34 to FIG. 37, the first driving rib 631 and the second driving rib 632 are arranged on the handlebar 14, and the first connecting seat housing 10002 is provided with a track 10002*d*. The first driving rib 631 and the second driving rib 632 is movable along the track 10002*d*. Through the track 10002*d*, the first driving rib 631 is capable of being abutted against the first driving block 621, and the second driving rib 632 is capable of being abutted against the second driving block 622. Referring to FIG. 38 to FIG. 41 together, the first driving block 621 is located between the first driving rib 631 and the first orientation mechanism 330, the handlebar 14 is rotated to the same side as the first travel assembly 300, and the first driving rib 631 pushes against the first driving block 621 counterclockwise to move towards the first direction D1, so that the first orientation mechanism 330 is locked. The second driving block 622 is located between the second driving rib 632 and the second orientation mechanism 430, the handlebar 14 is rotated to the same side as the second travel assembly 400, and the second driving rib 632 pushes against the second driving block 622 clockwise to move towards the first direction D1, so that the second orientation mechanism 430 is locked.

In this embodiment, the first driving rib 631 and the second driving rib 632 are both arc-shaped ribs. The first driving rib 631 and the second driving rib 632 have different arc lengths. For example, the arc length of the first driving rib 631 is less than the arc length of the second driving rib 632, so as to prevent the first driving rib 631 from interfering with movement of the second driving block 622 due to an excessive arc length when the first driving rib 631 pushes against the first driving block 621.

Further, as shown in FIG. 38 to FIG. 45, two ends of the first traction member 641 are connected to the first driving block 621 and the first orientation mechanism 330, respectively. Specifically, the two ends of the first traction member 641 are connected to an end of the first driving block 621 close to the first pivot point M and an end of the first orientation pin 331 close to the first pivot point M, respectively. That is, the first traction member 641 is extended along a direction from the first driving block 621 to the first orientation pin 331. In this way, when moving along the fifth direction D5, the first driving block 621 is capable of driving the first orientation pin 331 through the first traction member 641 to move along a fourth direction D4, so that the first orientation pin 331 is detached from the first orientation groove 332 to unlock the first orientation mechanism 330.

Similarly, two ends of the second traction member 642 are connected to the second driving block 622 and the second orientation mechanism 430, respectively. Specifically, the two ends of the second traction member 642 are connected to an end of the second driving block 622 close to the first pivot point M and an end of the second orientation pin 431 close to the first pivot point M respectively. That is, the second traction member 642 is extended along a direction from the second driving block 622 to the second orientation mechanism 430. In this way, when moving along the fifth direction D5, the second driving block 622 is capable of driving the second orientation pin 431 through the second traction member 642 to move along the fourth direction D4, so that the second orientation pin 431 is detached from the second orientation groove 432 to unlock the second orientation mechanism 430.

In this embodiment, the first traction member 641 and the second traction member 642 are both steel wires. Certainly, in other embodiments, the first traction member 641 and the second traction member 642 may also be made of other materials.

Further, as shown in FIG. 38 to FIG. 41, two ends of the first reset member 651 are abutted against the fixed shell 610 and the first driving block 621, respectively. Specifically, the first reset member 651 is arranged roughly along the first direction D1, an end of the first reset member 651 is arranged at the end of the first driving block 621 close to the first pivot point M, and the other end of the first reset member 651 is abutted against the fixed shell 610. The first reset member 651 constantly drives the first driving block 621 to move in a direction of driving the first orientation mechanism 330 to be unlocked. That is, the first reset member 651 constantly drives the first driving block 621 to move towards the fifth direction D5. In this way, when the handlebar 14 is rotated from the same side as the first travel assembly 300 to the same side as the second travel assembly 400, the first driving rib 631 is switched from a state of pushing against the first driving block 621 to a state of not pushing against the first driving block 621, the first driving block 621 is movable along the fifth direction D5 under an elastic force of the first reset member 651, so as to drive, through the first traction member 641, the first orientation pin 331 to move towards the fourth direction D4 and to be detached from the first orientation groove 332, so that the first orientation mechanism 330 is unlocked. The first reset member 651 may be a spring, an elastic rubber column, or the like.

Similarly, as shown in FIG. 38 to FIG. 41, two ends of the second reset member 652 are abutted against the fixed shell 610 and the second driving block 622, respectively. Specifically, the second reset member 652 is arranged roughly along the first direction D1, an end of the second reset member 652 is arranged at the of the second driving block 622 close to the first pivot point M, and the other end of the second reset member 652 is abutted against the fixed shell 610. The second reset member 652 constantly drives the second driving block 622 to move in a direction of driving the second orientation mechanism 430 to be unlocked. That is, the second reset member 652 constantly drives the second driving block 622 to move towards the fifth direction D5. In this way, when the handlebar 14 is rotated from the same side as the second travel assembly 400 to the same side as the first travel assembly 300, the second driving rib 632 is switched from a state of pushing against the second driving block 622 to a state of not pushing against the second driving block 622, the second driving block 622 is movable along the fifth direction D5 under an elastic force of the second reset member 652, so as to drive, through the second traction member 642, the second orientation pin 431 to move towards the fourth direction D4 and to be detached from the second orientation groove 432, so that the second orientation mechanism 430 is unlocked. The second reset member 652 may be a spring, an elastic rubber column, or the like.

Further, as shown in FIG. 44 and FIG. 45, two ends of the third reset member 653 are abutted against the second support member 102 and the first orientation pin 331, respectively. The third reset member 653 constantly drives the first orientation mechanism 330 to be locked. That is, the third reset member 653 constantly drives the first orientation pin 331 to move towards the first orientation groove 332. An elastic coefficient of the third reset member 653 is less than that of the first reset member 651. In this way, when the first driving rib 631 does not push against the first driving block 621, the first driving block 621 is capable of overcoming an elastic force of the third reset member 653 and is movable along the fifth direction D5 under the elastic force of the first reset member 651, so as to unlock the first orientation mechanism 330. When the first driving rib 631 pushes against the first driving block 621, the first driving block 621 moves along the fifth direction D5. When the first reset member 651 is compressed, the first orientation pin 331 moves into the first orientation groove 332 under the elastic force of the third reset member 653, so as to lock the first orientation mechanism 330. The third reset member 653 may be a spring, an elastic rubber column, or the like.

Similarly, as shown in FIG. 42 and FIG. 43, two ends of the fourth reset member 654 are abutted against the first support member 100 and the second orientation pin 431 respectively. The fourth reset member 654 constantly drives the second orientation mechanism 430 to be locked. That is, the fourth reset member 654 constantly drives the second orientation pin 431 to move towards the second orientation groove 432. An elastic coefficient of the fourth reset member 654 is less than that of the second reset member 652. In this way, when the second driving rib 632 does not push against the second driving block 622, the second driving block 622 is capable of overcoming an elastic force of the fourth reset member 654 and is movable along the fifth direction D5 under the elastic force of the second reset member 652, so as to unlock the second orientation mechanism 430. When the second driving rib 632 pushes against the second driving block 622, the second driving block 622 moves along the first direction D1. When the second reset member 652 is compressed, the second orientation pin 431 is moved into the second orientation groove 432 under the elastic force of the fourth reset member 654, so as to lock the second orientation mechanism 430. The fourth reset member 654 may be a spring, an elastic rubber column, or the like.

A specific operating principle of the orientation adjustment mechanism 600 according to this embodiment is as follows:

When the handlebar 14 is rotated to the same side as the first travel assembly 300, as shown in FIG. 38 and FIG. 39, the first driving rib 631 pushes against the first driving block 621, so that the first driving block 621 is located at a position close to the first pivot point M (i.e., a lower position). In this case, the first traction member 641 is loosened, and the first orientation pin 331 is moved along a third direction D3 under the elastic force of the third reset member 653, so that the first orientation pin 331 is inserted into the first orientation groove 332 to lock the first orientation mechanism 330. At the same time, the second driving block 622 not pushed against is located at a position far away from the first pivot point M (i.e., a upper position) under the elastic force of the second reset member 652. In this case, the second traction member 642 is tensioned, and the second orientation pin 431 is pulled by the second traction member 642 to overcome the elastic force of the fourth reset member 654, and thus to be moved along the fourth direction D4, so that the second orientation pin 431 is detached from the second orientation groove 432 to unlock the second orientation mechanism 430. The third direction D3 is opposite to the fourth direction D4.

Similarly, when the handlebar 14 is rotated to the same side as the second travel assembly 400, as shown in FIG. 40 and FIG. 41, the second driving rib 632 pushes against the second driving block 622, so that the second driving block 622 is located at a position close to the first pivot point M (i.e., a lower position). In this case, the second traction member 642 is loosened, and the second orientation pin 431 is moved along the third direction D3 under the elastic force of the fourth reset member 654, so that the second orientation pin 431 is inserted into the second orientation groove 432 to lock the second orientation mechanism 430. At the same time, the first driving block 621 not pushed against is located at a position far away from the first pivot point M (i.e., a upper position) under the elastic force of the first reset member 651. In this case, the first traction member 641 is tensioned, and the first orientation pin 331 is pilled by the first traction member 641 to overcome the elastic force of the third reset member 653 and move towards the fourth direction D4, so that the first orientation pin 331 is detached from the first orientation groove 332 to unlock the first orientation mechanism 330.

In another embodiment, as shown in FIG. 46 to FIG. 49, the orientation adjustment mechanism 600 includes a fixed shell 610, a first driving block 621, a second driving block 622, a first driving rib 631, a second driving rib 632, a first traction member 641, a second traction member 642, a first reset member 651, a second reset member 652, a third reset member 653, and a fourth reset member 654. The structure of the orientation adjustment mechanism 600 in this embodiment is roughly the same as the structure of the orientation adjustment mechanism 600 in the embodiment corresponding to FIG. 33 to FIG. 45, except that:

Firstly, as shown in FIG. 46 to FIG. 49, the first traction member 641 has an end connected to the first orientation mechanism 330 (specifically connected to the first orientation pin 331) and the other end bypassing the separator 10001*c* to be connected to the first driving block 621. In this way, the first orientation pin 331, the first traction member 641, the first driving block 621, and the separator 10001*c* form a pulley-like structure, so that a movement direction of the first orientation pin 331 is opposite to that of the first driving block 621. In this way, when moving along the first direction D1, the first driving block 621 may drive the first orientation pin 331 to move along the fourth direction D4, so as to unlock the first orientation mechanism 330.

Similarly, as shown in FIG. 46 to FIG. 49, the second traction member 642 has an end connected to the second orientation mechanism 430, specifically connected to the second orientation pin 431, and the other end bypassing the separator 10001*c* to be connected to the second driving block 622. In this way, the second orientation pin 431, the second traction member 642, the second driving block 622, and the separator 10001*c* form a pulley-like structure, so that a movement direction of the second orientation pin 431 is opposite to that of the second driving block 622. In this way, when moving along the first direction D1, the second driving block 622 may drive the second orientation pin 431 to move along the fourth direction D4, so as to unlock the second orientation mechanism 430.

Figure 46:
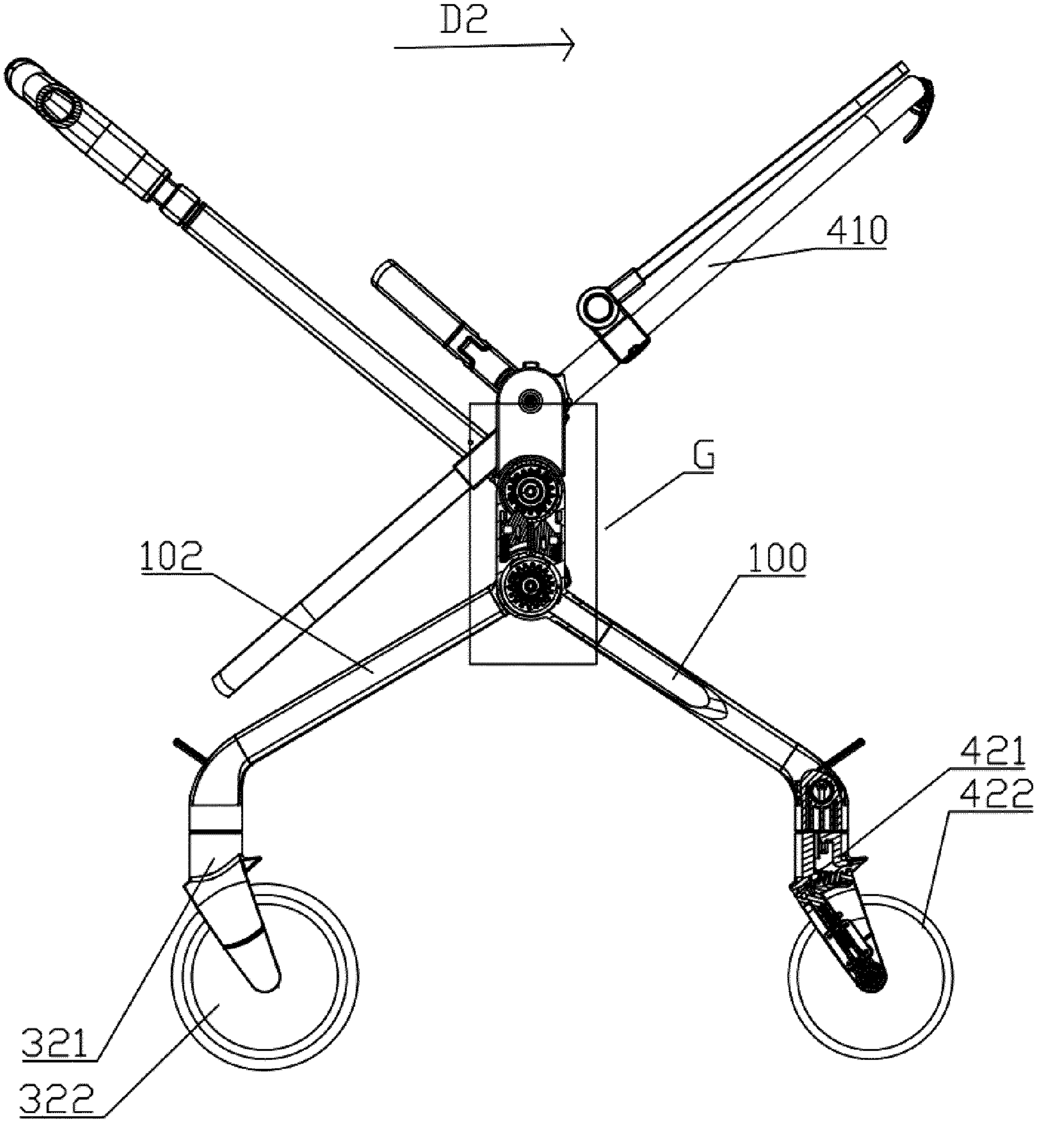
FIG. 46 is a partial sectional view of the passenger device shown in FIG. 33 according to another embodiment of the present disclosure, in which case the handlebar is on a same side as the first travel assembly.
Figure 47:
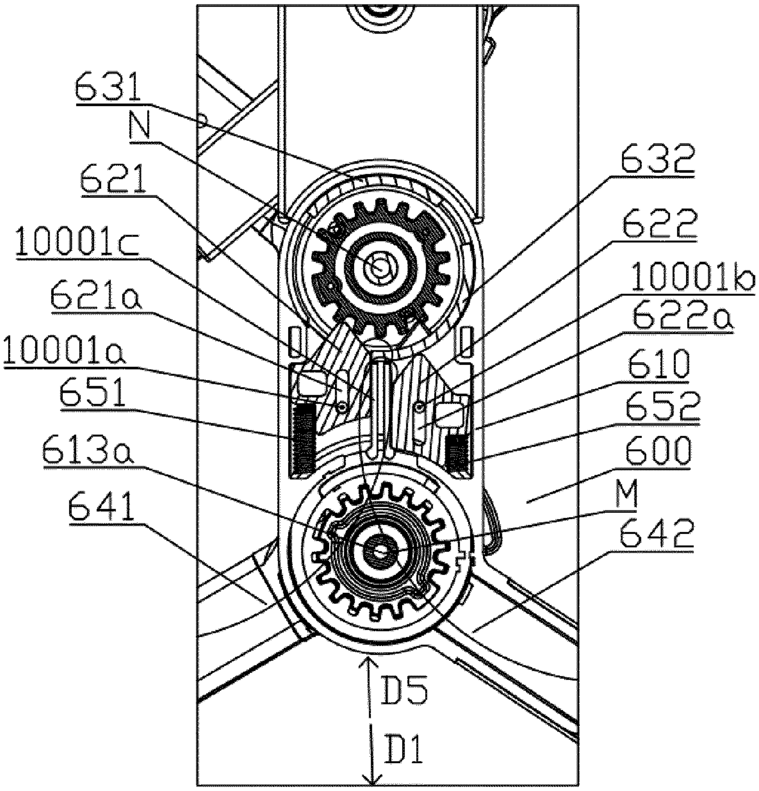
FIG. 47 is an enlarged view of an area G in FIG. 46.
Figure 48:
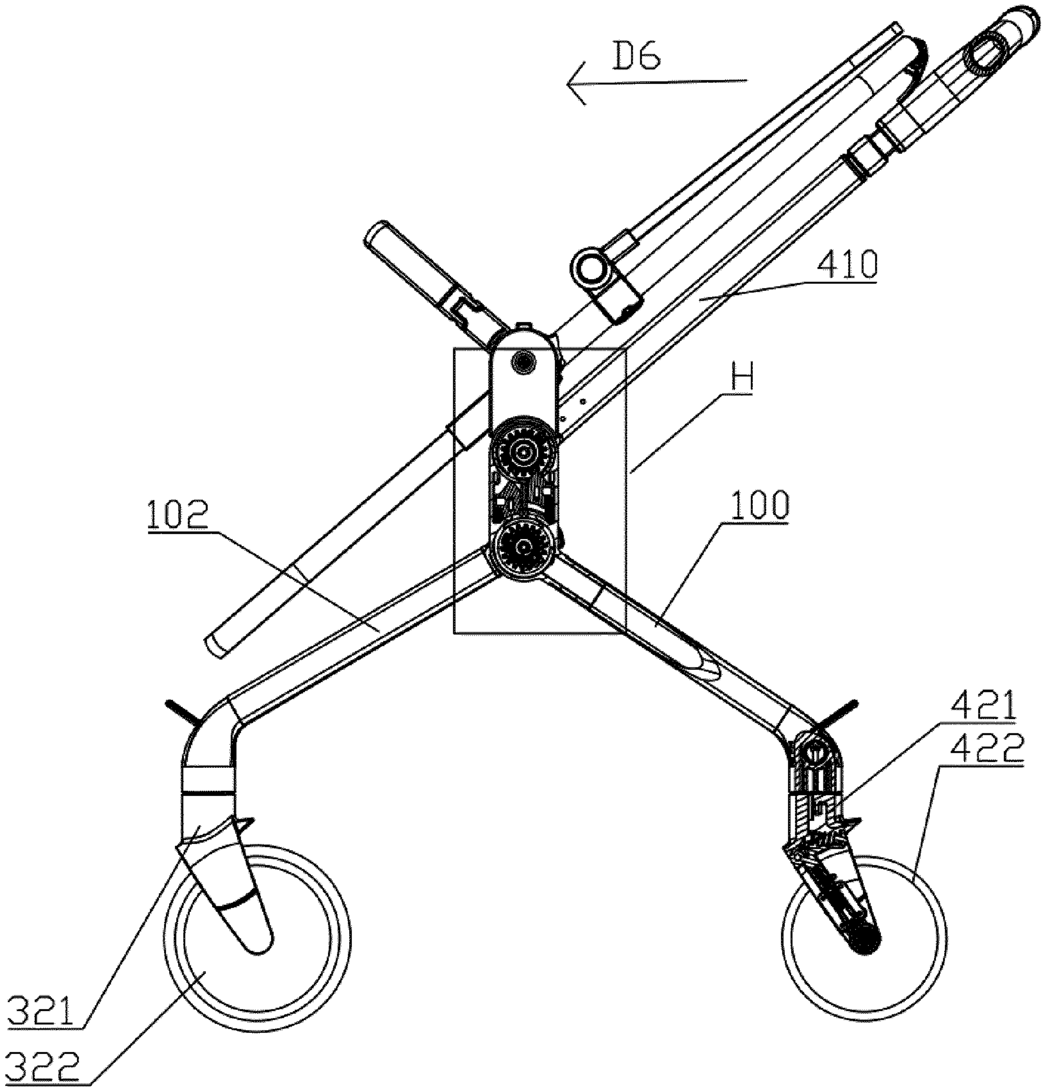
FIG. 48 is a partial sectional view of the passenger device shown in FIG. 33 according to another embodiment of the present disclosure, in which case the handlebar is on a same side as the second travel assembly.
Figure 49:
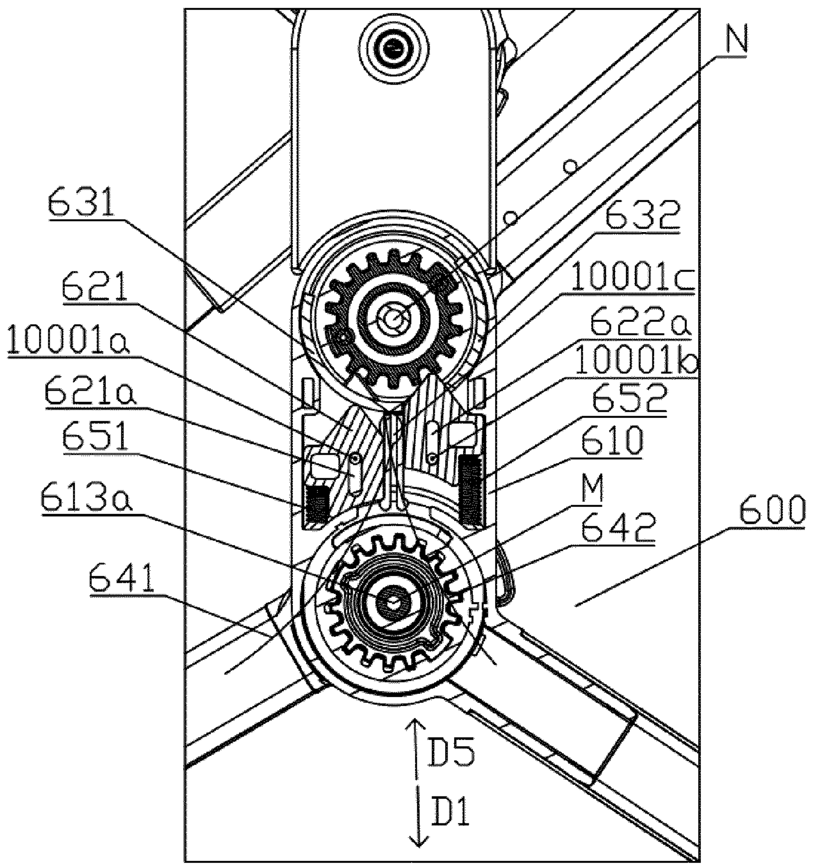
FIG. 49 is an enlarged view of an area H in FIG. 48.
Figure 50:
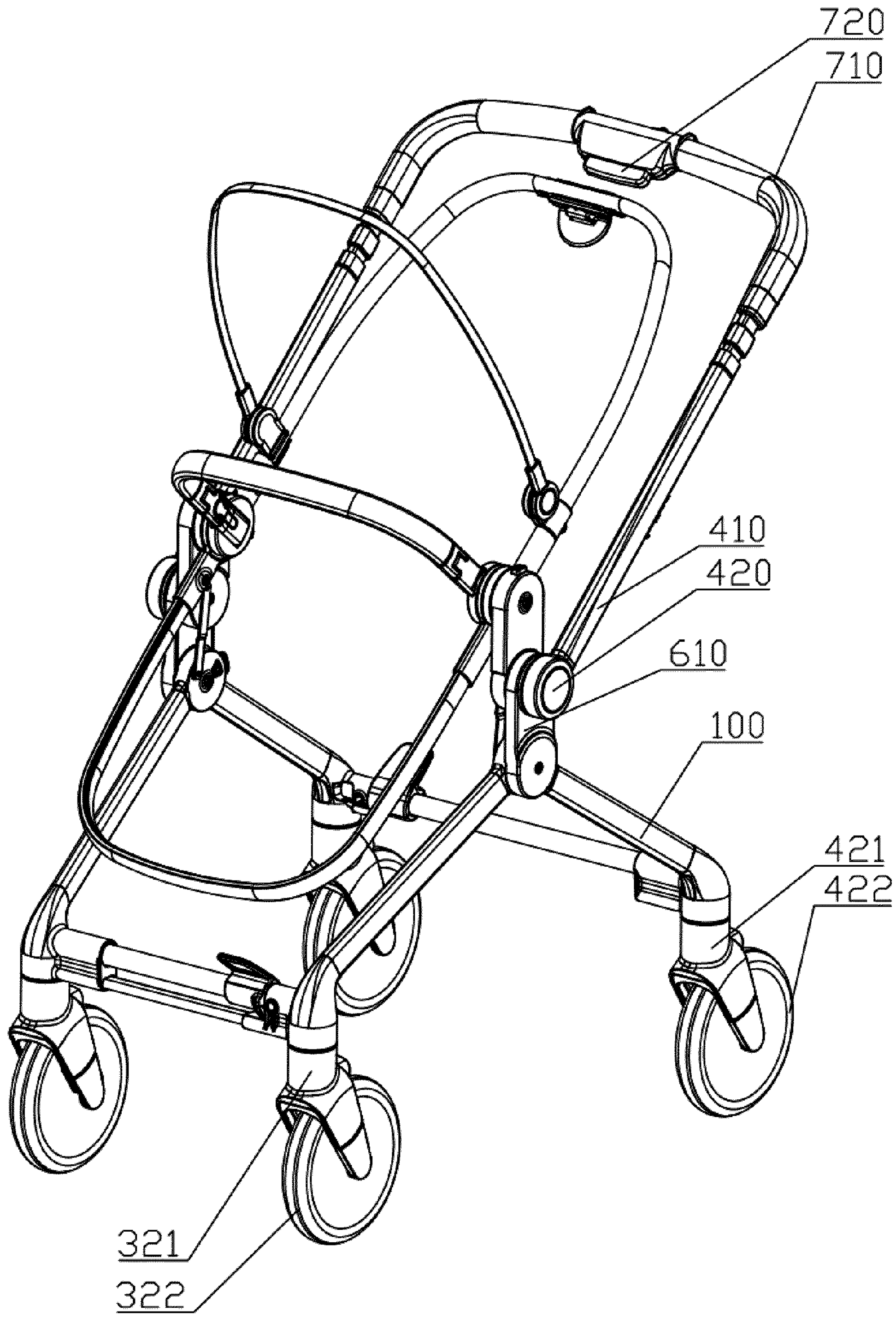
FIG. 50 is a schematic structural view of the passenger device according to a further embodiment of the present disclosure.
Figure 51:
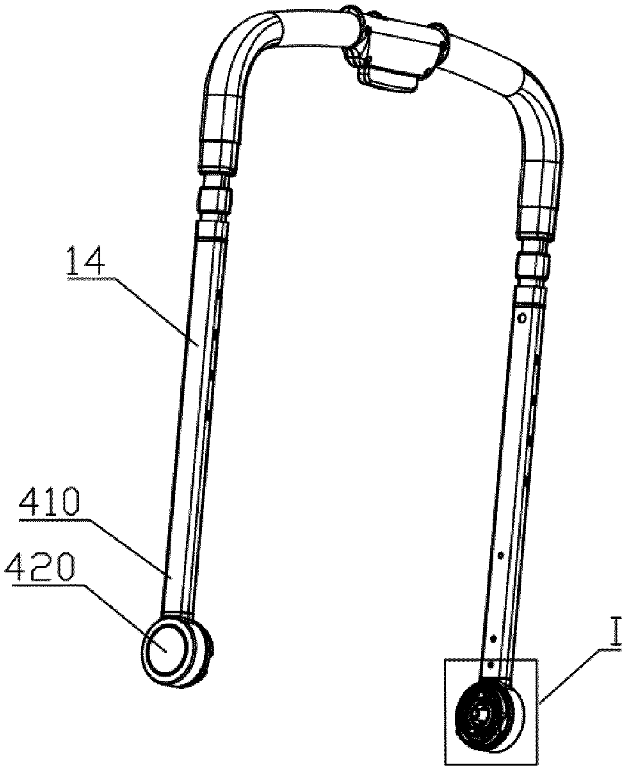
FIG. 51 is a schematic structural view of the handlebar in the passenger device shown in FIG. 50.
Figure 52:
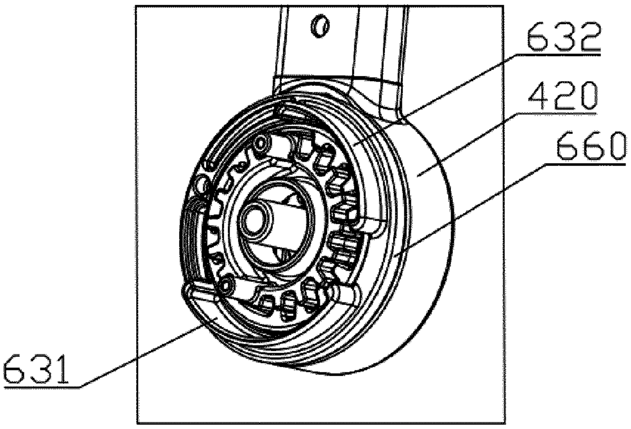
FIG. 52 is an enlarged view of an area I in FIG. 51.
Figure 53:
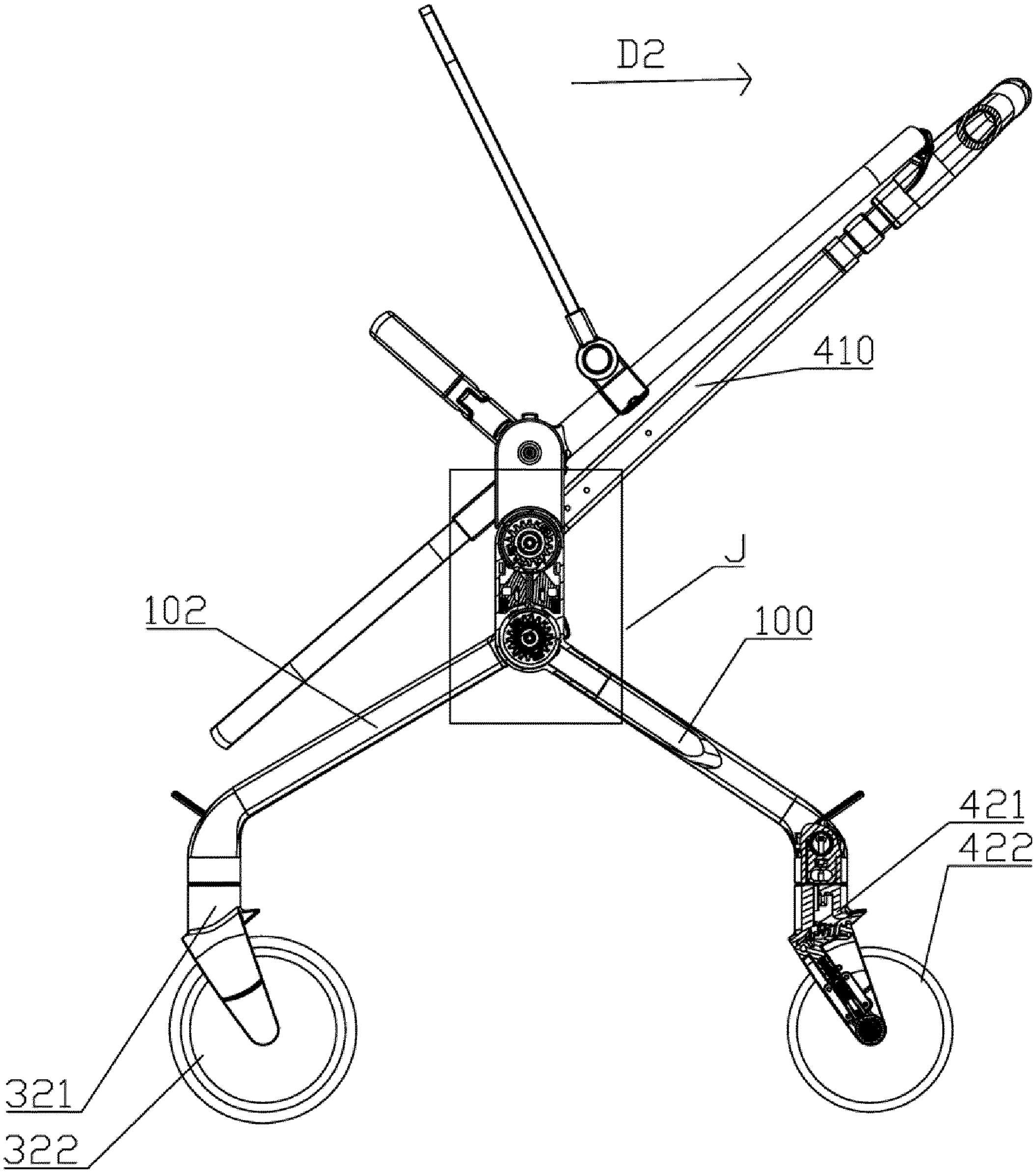
FIG. 53 is a partial sectional view of the passenger device shown in FIG. 50.
Figure 54:
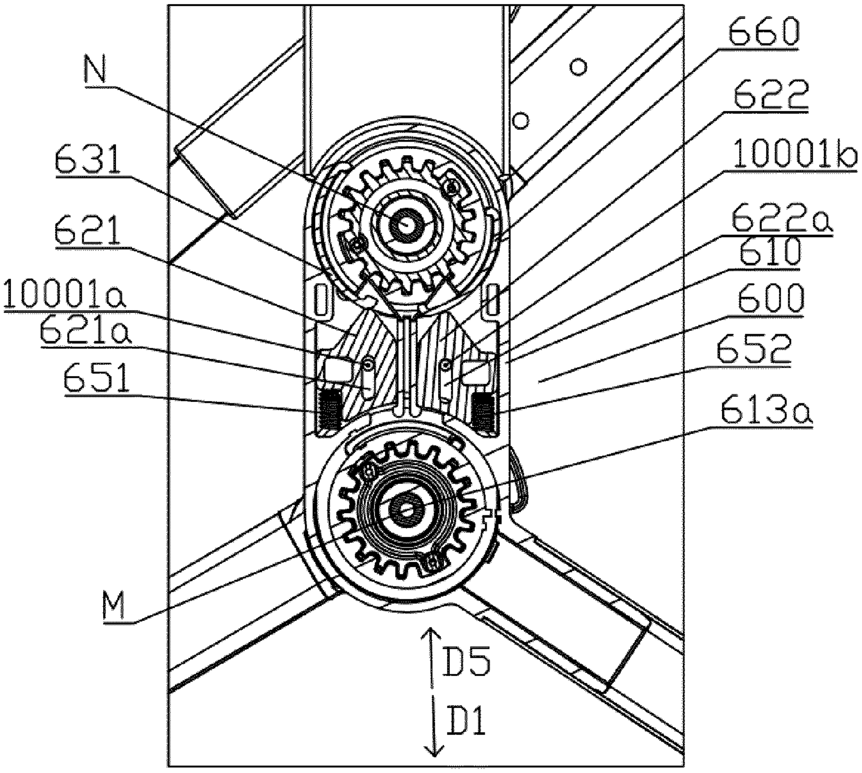
FIG. 54 is an enlarged view of an area J in FIG. 53.
Figure 55:
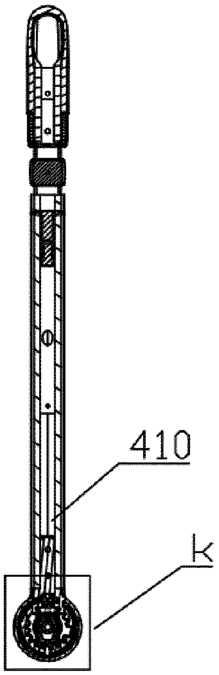
FIG. 55 is a schematic structural view of the handlebar shown in FIG. 51 from another perspective.
Figure 56:
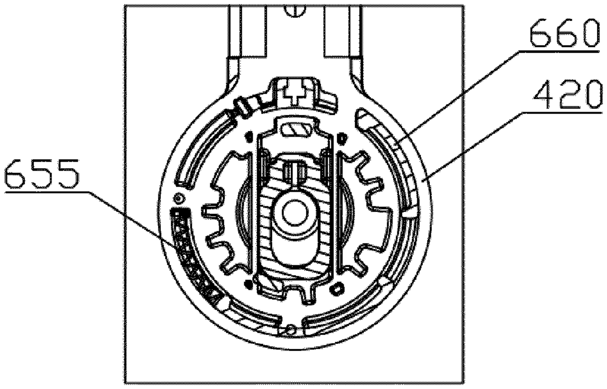
FIG. 56 is an enlarged view of an area K in FIG. 55.

Secondly, as shown in FIG. 46 and FIG. 47, the handlebar 14 is rotated to the same side as the first travel assembly 300, the second driving rib 632 pushes against the second driving block 622 along the first direction D1, so that the second orientation mechanism 430 is in an unlocked state, and at the same time, the first driving block 621 is not pushed against by the first driving rib 631, so that the first orientation mechanism 330 is in a locked state. As shown in FIG. 48 and FIG. 49, the handlebar 14 is rotated to the same side as the second travel assembly 400, the first driving rib 631 pushes against the first driving block 621 along the first direction D1, so that the first orientation mechanism 330 is in the unlocked state, and at the same time, the second driving block 622 is not pushed against by the second driving rib 632, so that the second orientation mechanism 430 is in the locked state.

In addition, as shown in FIG. 46 to FIG. 49, in this embodiment, since the moving direction of the first orientation pin 331 is opposite to that of the first driving block 621, when the first driving rib 631 does not push against the first driving block 621, the first driving block 621 is movable along the fifth direction D5 under the elastic force of the first reset member 651. In this case, the first traction member 641 is loosened, and at the same time, the first orientation pin 331 moves along the third direction D3 under the elastic force of the third reset member 653, so as to lock the first orientation mechanism 330. Therefore, in this embodiment, the elastic coefficient of the third reset member 653 is not required to be less than that of the first reset member 651.

Similarly, as shown in FIG. 46 to FIG. 49, in this embodiment, since the movement direction of the second orientation pin 431 is opposite to that of the second driving block 622, when the second driving rib 632 does not push against the second driving block 622, the second driving block 622 is movable along the fifth direction D5 under the elastic force of the second reset member 652. In this case, the second traction member 642 is loosened, and at the same time, the second orientation pin 431 moves along the third direction D3 under the elastic force of the fourth reset member 654, so as to lock the first orientation mechanism 330. Therefore, in this embodiment, the elastic coefficient of the fourth reset member 654 is not required to be less than that of the second reset member 652.

A specific operating principle of the orientation adjustment mechanism 600 according to this embodiment is as follows:

When the handlebar 14 is rotated to the same side as the first travel assembly 300, as shown in FIG. 46 and FIG. 47, the second driving rib 632 pushes against the second driving block 622, and the second driving block 622 overcomes the elastic force of the second reset member 652 and is located at a position close to the first pivot point M (i.e., a lower position). In this case, the second traction member 642 is tensioned, and at the same time, the second traction member 642 pulls the second orientation pin 431 to overcome the elastic force of the fourth reset member 654 and to moves along the fourth direction D4, so that the second orientation pin 431 is detached from the second orientation groove 432 to unlock the second orientation mechanism 430. At the same time, the first driving block 621 not pushed against is located at a position far away from the first pivot point M (i.e., a upper position) under the elastic force of the first reset member 651. In this case, the first traction member 641 is loosened, and the first orientation pin 331 moves along the third direction D3 under the elastic force of the third reset member 653, so that the first orientation pin 331 is inserted into the first orientation groove 332 to lock the first orientation mechanism 330.

Similarly, as shown in FIG. 48 and FIG. 49, when the handlebar 14 is rotated to the same side as the second travel assembly 400, the first driving rib 631 pushes against the first driving block 621, and the first driving block 621 overcomes the elastic force of the first reset member 651 and is located at a position close to the first pivot point M (i.e., a lower position). In this case, the first traction member 641 is tensioned, and at the same time, the first traction member 641 pulls the first orientation pin 331 to overcome the elastic force of the third reset member 653 to moves along the fourth direction D4, so that the first orientation pin 331 is detached from the first orientation groove 332 to unlock the first orientation mechanism 330. At the same time, the second driving block 622 not pushed against is located at a position far away from the first pivot point M (i.e., a upper position) under the elastic force of the second reset member 652. In this case, the second traction member 642 is loosened, and the second orientation pin 431 moves along the third direction D3 under the elastic force of the fourth reset member 654, so that the second orientation pin 431 is inserted into the second orientation groove 432 to lock the second orientation mechanism 430.

In yet another embodiment, for example, the embodiment corresponding to FIG. 46 to FIG. 49, referring to FIG. 50 to FIG. 56 together, the orientation adjustment mechanism 600 further includes a third driving member 660 and a fifth reset member 655. The third driving member 660 has a roughly ring-shaped structure. The third driving member 660 is annularly provided with a first driving rib 631 and a second driving rib 632. The third driving member 660 is pivotally connected to the handlebar 14. The first driving rib 631 and the second driving rib 632 are movable on the track **10002*d*. The first driving rib 631 is capable of being abutted against the first driving block 621, and the second driving rib 632 is capable of being abutted against the second driving block 622. When the handlebar 14 is reversed, the third driving member 660 is fixed relative to the handlebar 14. Two ends of the fifth reset member 655 are abutted against the third driving member 660 and the handlebar 14, respectively, and the fifth reset member 655 constantly causes the third driving member 660 to be fixed relative to the handlebar 14. The fifth reset member 655** may be a spring, an elastic rubber column, or the like.

Specifically, as shown in FIG. 50 to FIG. 54, the drift driving mechanism 700 includes a third traction member 710 and a drift operating member 720. Two ends of the third traction member 710 are connected to the drift operating member 720 and the third driving member 660, respectively. In this embodiment, the third traction member 710 is a steel wire. Certainly, in other embodiments, the third traction member 710 may also be made of other materials. The drift operating member 720 is operable to drive, through the third traction member 710, the third driving member 660 to overcome the force of the fifth reset member 655 and to be rotated relative to the handlebar 14 until the first driving rib 631 and the second driving rib 632 simultaneously push against the first driving block 621 and the second driving block 622, respectively. In this way, the first driving block 621 and the second driving block 622 are both located at positions close to the first pivot point M (i.e., lower positions). In this case, the first traction member 641 and the second traction member 642 are both tensioned. At the same time, the first traction member 641 pulls the first orientation pin 331 to overcome the elastic force of the third reset member 653 and to move along the fourth direction D4, and the second traction member 642 pulls the second orientation pin 431 to overcome the elastic force of the fourth reset member 654 and to move along the fourth direction D4, so as to unlock both the first orientation mechanism 330 and the second orientation mechanism 430, so that the passenger device can realize a drift function.

In a further embodiment, for example, the embodiment corresponding to FIG. 33 to FIG. 45, the drift driving mechanism 700 and the fifth reset member 655 may also be added. The user operates the drift operating member 720 to cause the third driving member 660 to overcome the force of the fifth reset member 655 and to be rotated relative to the handlebar 14 until the first driving rib 631 and the second driving rib 632 do not push against the first driving block 621 and the second driving block 622. In this way, the first driving block 621 and the second driving block 622 are both located at positions far away from the first pivot point M (i.e., upper positions). In this case, the first traction member 641 and the second traction member 642 are tensioned upwards, so as to unlock both the first orientation mechanism 330 and the second orientation mechanism 430, so that the passenger device can realize a drift function.

The passenger device has at least the following technical effects:

The handlebar 14 is rotatable relative to the first travel assembly 300 or the second travel assembly 400 to realize a reversing function. When the handlebar 14 is rotated to the same side as the first travel assembly 300, orientation of the first wheel member 320 and disorientation of the second wheel member 419 can be realized through the orientation adjustment mechanism 600. When the handlebar 14 is rotated to the same side as the second travel assembly 400, orientation of the second wheel member 419 and disorientation of the first wheel member 320 can be realized through the orientation adjustment mechanism 600. That is, during the reversal of the handlebar 14, the orientation adjustment function can be achieved by the orientation adjustment mechanism 600 among the first travel assembly 300, the second travel assembly 400, and the handlebar 14, which facilitate the push of the passenger device after the reversal. The orientation adjustment function of the orientation adjustment mechanism 600 is mainly realized through the first driving block 621 and the second driving block 622, which is simple in structure and easy to implement. The passenger device can realize the function of adjusting orientation of the wheels while reversing the handlebar 14 with a simple structure, so as to reduce the manufacturing costs of the passenger device.

The above are only preferred embodiments of the present disclosure and are not intended to limit the present disclosure. For those skilled in the art, the present disclosure may have various modifications and variations. Any modifications, equivalent substitutions, improvements and the like made within the spirit and principle of the present disclosure should fall within the protection scope of the present disclosure.

The technical features in the above embodiments may be randomly combined. For concise description, not all possible combinations of the technical features in the above embodiments are described. However, all the combinations of the technical features are to be considered as falling within the scope described in this specification provided that they do not conflict with each other.

The above embodiments only describe several implementations of the present disclosure, and their description is specific and detailed, but cannot therefore be understood as a limitation on the patent scope of the disclosure. It should be noted that those of ordinary skill in the art may further make variations and improvements without departing from the conception of the present disclosure, and these all fall within the protection scope of the present disclosure. Therefore, the patent protection scope of the present disclosure should be subject to the appended claims.

The invention claimed is:

1. A passenger device, comprising:

a frame comprising a first support member and a second support member, the first support member is pivotally connected to the second support member;

a handlebar pivotally connected to the first support member;

a wheel member pivotally connected to the frame, a second locking member arranged between the first support member and the handlebar and configured to lock or unlock the handlebar;

a fixed seat pivotally connected to the first support member;

a third locking member arranged between the first support member and the fixed seat and configured to lock or unlock the fixed seat; and wherein the frame is configured to switch between a folded state and an unfolded state, and when the second locking member unlocks the handlebar, the second locking member drives the third locking member to unlock the fixed seat.

2. The passenger device according to claim 1, wherein the passenger device further comprises:

a first locking member arranged between the first support member and the second support member and configured to lock the first support member and the second support member; and a linkage member pivotally connected to the second support member and the fixed seat;

when the third locking member unlocks the fixed seat and the first locking member unlocks the first support member and the second support member, the first support member and the second support member are foldable relative to each other, so that the second support member drives the linkage member to drive the fixed seat to be rotated relative to the frame and folded.

3. The passenger device according to claim 2, wherein the first support member is provided with a first slot, the second support member is provided with a second slot, the first locking member is provided with a first clamping portion, and the first clamping portion is clamped in the first slot and the second slot to lock the first support member and the second support member.

4. The passenger device according to claim 2, wherein the second support member is provided with a first driving structure, and the passenger device further comprises:

a first driving member abutted against the first locking member and the first driving structure; and a pulling member connected to the first driving member;

when the pulling member is pulled, the pulling member drives the first driving member, the first driving structure pushes the first driving member towards the first locking member, and the first driving member pushes the first locking member towards the first support member, so that the first locking member unlocks the first support member and the second support member.

5. The passenger device according to claim 4, wherein the passenger device further comprises a first elastic member abutted against the first support member and the first locking member.

6. The passenger device according to claim 4, wherein the first driving member and the first driving structure have inclined planes abutted against each other.

7. The passenger device according to claim 2, wherein the first support member is provided with a third slot, the handlebar is provided with a fourth slot, the second locking member is provided with a second clamping portion, and the second clamping portion is clamped in the third slot and the fourth slot to lock the handlebar.

8. The passenger device according to claim 2, wherein the handlebar is provided with a second driving structure, and the passenger device further comprises:

a second driving member abutted against the second locking member and the second driving structure; and a drawing member connected to the second driving member;

when the drawing member is pulled, the drawing member drives the second driving member, the second driving structure pushes the second driving member towards the second locking member, and the second driving member pushes the second locking member towards the first support member, so that the second locking member unlocks the handlebar.

9. The passenger device according to claim 8, wherein the passenger device further comprises a second elastic member abutted against the first support member and the second locking member.

10. The passenger device according to claim 8, wherein the second driving member and the second driving structure have inclined planes abutted against each other.

11. The passenger device according to claim 8, wherein the passenger device further comprises an operating member movably arranged on the handlebar, the drawing member is connected to the operating member, and when the operating member is pressed, the operating member pulls the drawing member.

12. The passenger device according to claim 8, wherein the passenger device further comprises an operating member, a pushing member, and a rotating member, the handlebar comprises an upper handlebar and a lower handlebar, a lower end of the upper handlebar is telescopically inserted in the lower handlebar, the pushing member is arranged at the lower end of the upper handlebar, the operating member is slidably arranged on the upper handlebar, the rotating member is rotatably arranged in the lower handlebar, the drawing member is connected to the rotating member, the lower handlebar is pivotally connected to the first support member, the operating member is operable to drive the upper handlebar to slide relative to the lower handlebar, and when the upper handlebar slides to a lowest position relative to the lower handlebar, the pushing member pushes the rotating member to rotate, so that the rotating member pulls the drawing member.

13. The passenger device according to claim 12, wherein the passenger device further comprises a connecting member and a clamping member, the lower handlebar has a plurality of clamping holes, two ends of the connecting member are respectively connected to the operating member and the clamping member, the clamping member is clamped in one of the plurality of clamping holes to lock the upper handlebar, and the operating member is operable to drive, through the connecting member, the clamping member to be detached from the clamping hole, so that the upper handlebar is slidable relative to the lower handlebar.

14. The passenger device according to claim 8, wherein the second locking member and the third locking member are located on two sides of the first support member, the first support member has a through hole, and the second locking member has a push rod, the push rod is inserted into the through hole, and when the second driving member pushes the second locking member towards the first support member, the push rod pushes the third locking member towards the fixed seat to unlock the fixed seat.

15. The passenger device according to claim 2, wherein the first support member is provided with a fifth slot, the fixed seat is provided with a sixth slot, the third locking member is provided with a third clamping portion, and the third clamping portion is clamped in the fifth slot and the sixth slot to lock the fixed seat.

16. The passenger device according to claim 2, wherein the passenger device further comprises a third elastic member abutted against the third locking member and the fixed seat.

17. The passenger device according to claim 2, wherein the passenger device further comprises a seat, the seat is arranged on the fixed seat, and when the fixed seat is rotated relative to the frame and folded, the seat is rotated with the fixed seat and folded.

18. The passenger device according to claim 2, wherein the passenger device further comprises an adapter, the adapter comprises a first seat body, a second seat body, a first unlocking member, and a locking member, the first seat body is connected to the second seat body, the first seat body is configured to connect a vehicle, the locking member is rotatably arranged in the second seat body, the first unlocking member is movably arranged on the second seat body, the first unlocking member is provided with a guide portion, the locking member is provided with a skewed slot and a hook, the guide portion is arranged in the skewed slot, when the second seat body is arranged on the fixed seat, the hook is engaged with the fixed seat, and when the first unlocking member is pressed, the guide portion pushes the skewed slot to drive the locking member to rotate, so that the hook is disengaged from the fixed seat.

19. The passenger device according to claim 18, wherein the vehicle is a safety seat or a carrycot.

* * * * *